United States Patent
Sasaki

(10) Patent No.: US 12,092,911 B2
(45) Date of Patent: Sep. 17, 2024

(54) METHOD FOR PRODUCING LIQUID CRYSTAL MATERIAL, METHOD FOR EVALUATING LIQUID CRYSTAL MATERIAL, MEASUREMENT APPARATUS THEREFOR, AND LIQUID CRYSTAL MATERIAL

(71) Applicant: DIC Corporation, Tokyo (JP)

(72) Inventor: Tsuyoshi Sasaki, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 18/036,334

(22) PCT Filed: Dec. 16, 2021

(86) PCT No.: PCT/JP2021/046417
§ 371 (c)(1),
(2) Date: May 10, 2023

(87) PCT Pub. No.: WO2022/145248
PCT Pub. Date: Jul. 7, 2022

(65) Prior Publication Data
US 2023/0400721 A1  Dec. 14, 2023

(30) Foreign Application Priority Data
Dec. 28, 2020 (JP) ................. 2020-219499

(51) Int. Cl.
*G02F 1/13* (2006.01)
*C09K 19/38* (2006.01)

(52) U.S. Cl.
CPC ............ *G02F 1/1309* (2013.01); *C09K 19/38* (2013.01)

(58) Field of Classification Search
CPC .............................. G02F 1/1309; C09K 19/38
(Continued)

(56) References Cited

U.S. PATENT DOCUMENTS

2017/0031186 A1* 2/2017 Moriwaki ............. G02F 1/1337

FOREIGN PATENT DOCUMENTS

EP       0 625 711 A1   11/1994
JP         7-35797 A     2/1995
(Continued)

OTHER PUBLICATIONS

International Search Report dated Mar. 15, 2022, issued in counterpart International Application No. PCT/JP2021/046417 (2 pages).

*Primary Examiner* — Michael H Caley
*Assistant Examiner* — William D Peterson
(74) *Attorney, Agent, or Firm* — WHDA, LLP

(57) ABSTRACT

The present disclosure provides a method for producing a liquid crystal material. The method includes a step (I) of preparing a liquid crystal material and a step (II) of measuring the liquid crystal material with a delta delay measurement mechanism that measures a delta delay value of the liquid crystal material. The delta delay measurement mechanism includes a single coaxial tube and a mechanism that calculates the delta delay value of the liquid crystal material. The single coaxial tube includes a linear inner conductor and an outer conductor having a space through which the inner conductor extends. The delta delay value is a difference between a transmission delay time $t_0$ and a transmission delay time $t_v$.

6 Claims, 2 Drawing Sheets

(58) Field of Classification Search
USPC .......................................................... 349/33
See application file for complete search history.

(56) References Cited

FOREIGN PATENT DOCUMENTS

| | | | |
|---|---|---|---|
| JP | 2006-220646 A | | 8/2006 |
| JP | 2006220646 A | * | 8/2006 |

* cited by examiner

METHOD FOR PRODUCING LIQUID CRYSTAL MATERIAL, METHOD FOR EVALUATING LIQUID CRYSTAL MATERIAL, MEASUREMENT APPARATUS THEREFOR, AND LIQUID CRYSTAL MATERIAL

TECHNICAL FIELD

The present disclosure relates to a method for producing a liquid crystal material, to a method for measuring a delta delay, to a measurement apparatus therefor, and to a liquid crystal material.

BACKGROUND ART

Liquid crystal materials are attracting attention, not only regarding display applications, such as applications in television sets, monitors, cell phones, smartphones, and tablet computers, but also regarding antenna applications associated with the development of autonomous driving technologies for automobiles; specifically, the antenna applications relate to the transmission and reception of microwave-band electromagnetic waves between mobile systems, such as automobiles, and communications satellites. Antennas that utilize a liquid crystal material can flexibly change the direction in which electromagnetic waves are transmitted and received, because, as in displays and the like, the liquid crystal operates in accordance with the application of an external electric field.

Accordingly, whether a liquid crystal material is used in display applications or in antenna applications, a dielectric anisotropy ($\Delta\varepsilon=\varepsilon\|-\varepsilon\bot$) of the liquid crystal is an important physical quantity, because the change in the alignment of the liquid crystal molecules due to the applied electric field is induced by dielectric torque, which is based on the dielectric anisotropy of the liquid crystal. Typically, the dielectric anisotropy ($\Delta\varepsilon$) is a quantity defined by the difference between a dielectric constant ($\varepsilon\|$) in a direction parallel to a long axis direction of the liquid crystal molecules and a dielectric constant ($\varepsilon\bot$) in a direction perpendicular to the long axis direction of the liquid crystal molecules and is calculated from the dielectric constants (complex dielectric constants) of the liquid crystal material.

Since the frequency necessary for the operation of liquid crystals is several Hz to several kHz, the dielectric anisotropy ($\Delta\varepsilon$) is typically determined by measuring the dielectric constant at 1 kHz. On the other hand, regarding liquid crystal materials for antenna applications, there is a need for accurately measuring not only the magnitude of the dielectric anisotropy at 1 kHz but also the dielectric anisotropy associated with the microwave band in which the liquid crystal materials are used.

In the related art, there are various methods for measuring the dielectric constant (complex dielectric constant) of dielectric materials associated with a microwave band, typical examples of which are the liquid crystal materials for antenna applications. Examples of the methods include (1) a cavity resonator method, which calculates the dielectric constant (complex dielectric constant) from an amount of change in a resonance frequency and a Q value that occurs when a dielectric material is inserted into a resonator; (2) a coaxial tube method, which calculates the dielectric constant (complex dielectric constant) from amplitudes and phase differences of reflected waves associated with a dielectric material loaded within a coaxial tube; and (3) a lumped constant capacitance method, which measures a capacitance between two electrodes associated with a sample loaded between the electrodes. In particular, the coaxial tube method of (2) can easily measure liquid materials and the like and, therefore, is typically employed in the measurement of the dielectric constant (complex dielectric constant) of liquid crystal materials, many of which exhibit fluidity.

However, it is known that the measurement of the dielectric constant (complex dielectric constant) performed using the coaxial tube method requires using multiple coaxial tubes having different lengths and performing the measurement for each of them per measurement sample (PTL 1).

CITATION LIST

Patent Literature

PTL 1: Japanese Unexamined Patent Application Publication No. 2006-220646

SUMMARY OF INVENTION

Technical Problem

Furthermore, in the case of liquid crystal materials, their unique dielectric anisotropy ($\Delta\varepsilon=\varepsilon\|-\varepsilon\bot$) makes it necessary to perform the measurement additional times, that is, to perform the measurement in a state in which the liquid crystal molecules in a measurement sample are not aligned in a particular direction and in a state in which they are aligned in a particular direction, with these states being achieved by application and non-application of a voltage. Consequently, at present, the measurement of the dielectric constant (complex dielectric constant) of liquid crystal materials performed using the coaxial tube method suffers from a problem of an accumulation of measurement errors due to the attachment and detachment of coaxial tubes (errors in loss of reflection of electromagnetic waves or an intensity of electromagnetic waves) and a problem of a reduction in reproducibility of the measurement.

To solve the problems, the present disclosure introduces a new physical quantity (nsec) referred to as a "delta delay", to replace the dielectric constant, which, in the related-art measurement methods, has been calculated as one of the electrical properties. It was confirmed that using the "delta delay" to determine an electrical property of a liquid crystal material enables the production of a liquid crystal material having uniform electrical properties.

Accordingly, an object of the present disclosure is to provide a liquid crystal material having uniform electrical properties, a production method therefor, a method for measuring a liquid crystal material having uniform electrical properties, and a measurement apparatus therefor.

Solution to Problem

The present inventors diligently conducted studies regarding the problems described above and, consequently, discovered that using the physical quantity (delta delay (unit: nsec)) to determine the electrical properties of liquid crystal materials enables the production or evaluation of liquid crystal materials having uniform electrical properties, compared with the use of the dielectric constant. Accordingly, the present invention was completed.

Features of the present invention for solving the above-described problems are as follows.

[1] The present disclosure provides a method for producing a liquid crystal material. The method includes a step (I)

of preparing a liquid crystal material and a step (II) of measuring the liquid crystal material with a delta delay measurement mechanism that measures a delta delay value of the liquid crystal material.

The delta delay measurement mechanism includes a single coaxial tube and a mechanism that calculates the delta delay value of the liquid crystal material. The single coaxial tube includes a linear inner conductor and an outer conductor having a space through which the inner conductor extends. The delta delay value is a difference between a transmission delay time $t_0$ and a transmission delay time $t_v$. The transmission delay time $t_0$ is measured by propagating electromagnetic waves through the liquid crystal material in a state in which a reference voltage $V_0$ is applied between the inner conductor and the outer conductor, the electromagnetic waves having successively varying frequencies, the liquid crystal material being loaded in the space between the inner conductor and the outer conductor. The transmission delay time $t_v$ is measured by propagating the electromagnetic waves through the liquid crystal material in a state in which an effective voltage V, which is greater than the reference voltage $V_0$, is applied between the inner conductor and the outer conductor.

[2] In an embodiment, it is preferable that the electromagnetic waves have successively varying frequencies ranging from 0.1 to 26.5 GHz.

[3] In an embodiment, it is preferable that the transmission delay time $t_0$ be measured by propagating electromagnetic waves through the liquid crystal material between the inner conductor and the outer conductor in an unbiased state, the electromagnetic waves having successively varying frequencies.

[4] In an embodiment, it is preferable that the liquid crystal material include a liquid crystal compound having an isothiocyanate group (—NCS).

[5] The present disclosure provides a method for measuring a delta delay. The method includes using a single coaxial tube that includes a linear inner conductor and an outer conductor having a space through which the inner conductor extends. The delta delay is an amount of change in a transmission delay time associated with electromagnetic waves propagating through a liquid crystal material loaded in the space. The method includes:

a step of providing the liquid crystal material;

a step of loading the liquid crystal material between the inner conductor and the outer conductor; and a step of calculating a delta delay value of the liquid crystal material, the delta delay value being a difference between a transmission delay time $t_0$ and a transmission delay time $t_v$, in which the transmission delay time $t_0$ is measured by propagating electromagnetic waves through the liquid crystal material in a state in which a reference voltage $V_0$ is applied between the inner conductor and the outer conductor, the electromagnetic waves having successively varying frequencies; and the transmission delay time $t_v$ is measured by propagating the electromagnetic waves through the liquid crystal material in a state in which an effective voltage V, which is greater than the reference voltage $V_0$, is applied between the inner conductor and the outer conductor.

[6] The present disclosure provides an apparatus for measuring a delta delay value. The apparatus includes:

a single coaxial tube including a linear inner conductor, an outer conductor through which the inner conductor internally extends, and a space that is located between the inner conductor and the outer conductor and in which a liquid crystal material is loadable;

an electrical signal transmitting and receiving unit that inputs electrical signals that are electromagnetic waves to the single coaxial tube and receives output signals that are electromagnetic waves output in response to the electrical signals; and an analysis and processing unit that analyzes and processes the electrical signals and the output signals transmitted or received by the electrical signal transmitting and receiving unit.

The analysis and processing unit calculates the delta delay value of the liquid crystal material; the delta delay value is a difference between a transmission delay time $t_0$ and a transmission delay time $t_v$; the transmission delay time $t_0$ is a time measured by propagating electromagnetic waves through the liquid crystal material in a state in which a reference voltage $V_0$ is applied between the inner conductor and the outer conductor, the electromagnetic waves having successively varying frequencies; and the transmission delay time $t_v$ is a time measured by propagating the electromagnetic waves through the liquid crystal material in a state in which an effective voltage V, which is greater than the reference voltage $V_0$, is applied between the inner conductor and the outer conductor.

[7] The present disclosure provides a liquid crystal material having a delta delay value of 0.01 or greater.

Advantageous Effects of Invention

The present invention can provide a liquid crystal material having uniform electrical properties, a production method therefor, a method for measuring a liquid crystal material having uniform electrical properties, and a measurement apparatus therefor.

BRIEF DESCRIPTION OF DRAWINGS

FIGS. 2(a) and 2(b) are schematic diagrams illustrating a cross section taken along line I-I of FIG. 1.

DESCRIPTION OF EMBODIMENTS

Figure 1:
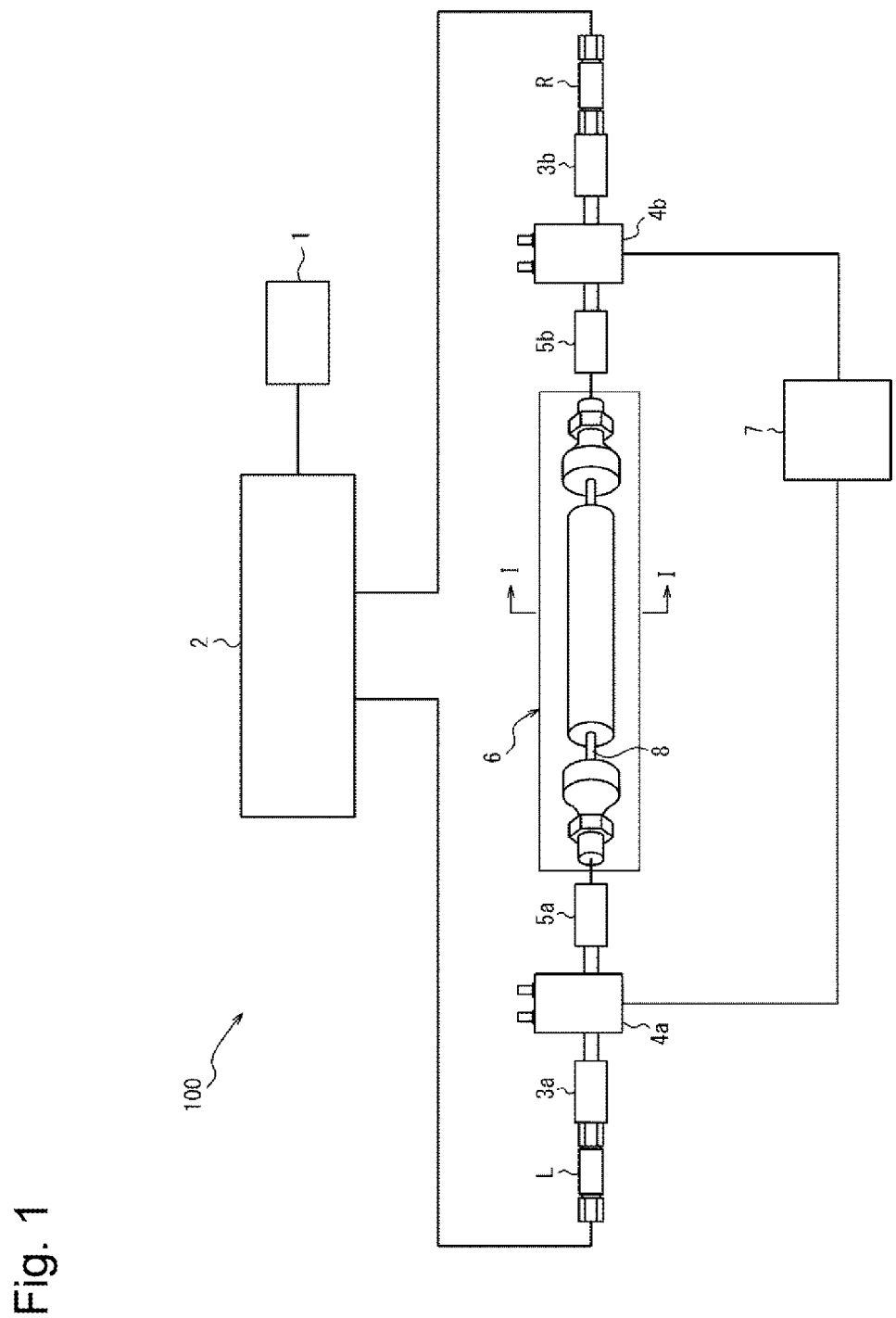
FIG. 1 is a schematic diagram illustrating an exemplary configuration of a delta delay measurement system according to the present embodiment.

Embodiments of the present invention (hereinafter each referred to as "the present embodiment") will be described in detail below. The present disclosure is not limited to the descriptions below and can be modified and practiced in various ways within the purview of the present disclosure.

[Method for Producing Liquid Crystal Material]

According to the present embodiment, a method for producing a liquid crystal material includes a step (I) of preparing a liquid crystal material and a step (II) of measuring the liquid crystal material with a delta delay measurement mechanism that measures a delta delay value of the liquid crystal material. The delta delay measurement mechanism includes a single coaxial tube and a mechanism that calculates the delta delay value of the liquid crystal material. The single coaxial tube includes a linear inner conductor and an outer conductor having a space through which the inner conductor extends. The delta delay value is a difference between a transmission delay time $t_0$ and a transmission delay time $t_v$. The transmission delay time $t_0$ is measured by propagating electromagnetic waves through the liquid crystal material in a state in which a reference voltage $V_0$ is applied between the inner conductor and the outer conductor, the electromagnetic waves having successively varying frequencies, the liquid crystal material being loaded in the space between the inner conductor and the outer conductor. The transmission delay time $t_v$ is measured by propagating the electromagnetic waves through the liquid crystal material in a state in which an effective voltage V, which is greater than the reference voltage $V_0$, is applied between the inner conductor and the outer conductor.

Accordingly, a liquid crystal material having uniform electrical properties and a production method therefor can be provided.

The steps will be described below.

(Step (I))

According to the present embodiment, the method for producing a liquid crystal material includes the step (I) of preparing a liquid crystal material.

According to the present embodiment, the liquid crystal material can be any material that exhibits fluidity and liquid crystallinity, that is, the liquid crystal material can be a liquid that exhibits the so-called liquid crystallinity (e.g., a solution or a suspension). Accordingly, the liquid crystal material may be a material formed of a single compound that exhibits liquid crystallinity and fluidity or may be a material formed of a composition containing different compounds mixed together, with the entirety of the composition exhibiting liquid crystallinity and fluidity.

As referred to in this specification, the expression "exhibit liquid crystallinity" means "have rigid moieties called mesogens and exhibit an alignment property". The type of the liquid crystallinity that is exhibited is not particularly limited and may be any of the following types: a nematic phase, a smectic A phase, a (chiral) smectic C phase, a cholesteric phase, and a discotic phase. A nematic phase is preferable.

As referred to in this specification, the expression "exhibit liquid crystallinity" relates to a state at room temperature (25° C.).

In the present embodiment, when the liquid crystal material is a single compound, the liquid crystal material can be prepared by performing synthesis in accordance with a known synthesis method. When the liquid crystal material is a liquid crystal composition containing two or more compounds, the method that can be used to prepare the liquid crystal composition may be a commonly used method for producing liquid crystal compositions. Specifically, the method may be a method in which all the compounds that are the constituent elements of the liquid crystal composition are added to a mixing vessel, melted with heat conducted from an external high-temperature medium through a wall of the mixing vessel, and then mixed together, for instance, with a stirring bar or with rotation of the vessel itself, under reduced pressure or in an inert gas atmosphere. Other methods that can be employed include a method (planetary stirring) in which a vessel containing mixed liquid crystal compounds is rotated and revolved while defoaming takes place, to produce the liquid crystal composition without performing heating; and a method in which liquid crystal compounds are added to a mixing vessel and heated by being irradiated with a microwave. Note that all the compounds that are the constituent elements of the liquid crystal composition may be either of the following compounds: a compound synthesized in accordance with a known method and a commercial compound that is purchased. In addition, in the preparation of the liquid crystal composition, one or more optional components may be mixed with two or more liquid crystal compounds. Examples of the optional components include known polymerizable (liquid crystal) compounds or alignment agents and other additives, such as antioxidants.

When the liquid crystal material of the present disclosure is a liquid crystal composition, the liquid crystal composition can be produced, for example, by mixing a compound represented by general formula (i) below with a compound represented by general formula (ii) below; if necessary, one or more of the optional components mentioned above and one or more of the additives mentioned below may be mixed therewith.

Examples of the additives include stabilizing agents, coloring compounds, and polymerizable compounds.

Examples of the stabilizing agents include hydroquinones, hydroquinone monoalkyl ethers, tert-butylcatechols, pyrogallols, thiophenols, nitro compounds, β-naphthylamines, β-naphthols, nitroso compounds, hindered phenols, and hindered amines.

In instances where one or more stabilizing agents are used, a total content of the stabilizing agents is preferably 0.005 to 1 mass %, 0.02 to 0.5 mass %, or 0.03 to 0.1 mass %, based on a total mass of the liquid crystal composition.

Preferably, the liquid crystal material of the present embodiment is a compound having an isothiocyanate group (—NCS).

The isothiocyanate group has a high electron polarization in an electric field, compared with a fluorine group or a cyano group. Accordingly, in instances where a single compound having an isothiocyanate group (—NCS), or a liquid crystal composition including such a compound is used as the liquid crystal material, the delta delay value tends to increase.

According to the present embodiment, the liquid crystal material preferably includes one or more compounds selected from the group consisting of compounds represented by general formula (i) or general formula (ii) below.

General formula (i) is as follows.

[Chem. 1]

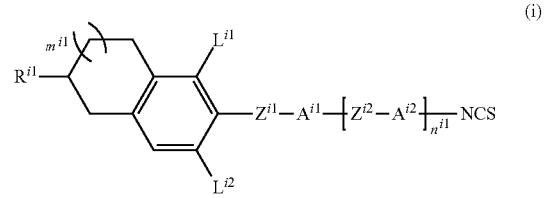

(i)

In general formula (i), $R^{i1}$ represents a hydrogen atom or an alkyl group having 1 to 20 carbon atoms, in the alkyl group, one or more —$CH_2$— groups are each independently optionally substituted with —O—, —S—, —CO—, and/or —CS—, in the alkyl group, one or more —$CH_2$—$CH_2$— groups are each independently optionally substituted with —CO—O—, —O—CO—, —CO—S—, —S—CO—, —CO—NH—, —NH—CO—, —CH=CH—, —CF=CF—, and/or —C≡C—, in the alkyl group, one or more —$CH_2$—$CH_2$—$CH_2$— groups are each independently optionally substituted with —O—CO—O—, in the alkyl group, one or more —$CH_2$—$CH_2$—$CH_2$—$CH_2$— groups are each independently optionally substituted with —CH=CH—CO—O—, —CH=CH—O—CO—, —CO—O—CH=CH—, or —O—CO—CH=CH—, in the alkyl group, one or more hydrogen atoms are each independently optionally substituted with a halogen atom, and oxygen atoms are not directly bonded to each other;

$A^{i1}$ and $A^{i2}$ each independently represent a hydrocarbon ring having 3 to 16 carbon atoms or represent a heterocycle having 3 to 16 carbon atoms, in $A^{i1}$ and $A^{i2}$, one or more hydrogen atoms are each independently optionally substituted with a substituent $S^{i1}$, the substituent $S^{i1}$ is a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, in the alkyl group, one or more —CH$_2$— groups are each independently optionally substituted with —O—, —S—, and/or —CO—, in the alkyl group, one or more —CH$_2$—CH$_2$— groups are each independently optionally substituted with —CH=CH—, —CF=CF—, —C≡C—, —CO—O—, —O—CO—, —CO—S—, —S—CO—, —CO—NH—, and/or —NH—CO—, in the alkyl group, one or more —CH$_2$—CH$_2$—CH$_2$— groups are each independently optionally substituted with —O—CO—O—, in the alkyl group, one or more —CH$_2$—CH$_2$—CH$_2$—CH$_2$— groups are each independently optionally substituted with —CH=CH—CO—O—, —CH=CH—O—CO—, —CO—O—CH=CH—, and/or —O—CO—CH=CH—, in the alkyl group, one or more hydrogen atoms are each independently optionally substituted with a halogen atom, oxygen atoms are not directly bonded to each other, and when the substituent $S^{i1}$ is a plurality of units, the units may be identical to or different from one another;

$L^{i1}$ and $L^{i2}$ each independently represent a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, in the alkyl group, one or more —CH$_2$— groups are each independently optionally substituted with —O—, —S—, —CO—, and/or —CS—, in the alkyl group, one or more —CH$_2$—CH$_2$— groups are each independently optionally substituted with —CH=CH—, —CF=CF—, —C≡C—, —CO—O—, —O—CO—, —CO—S—, —S—CO—, —CO—NH—, and/or —NH—CO—, in the alkyl group, one or more —CH$_2$—CH$_2$—CH$_2$— groups are each independently optionally substituted with —O—CO—O—, in the alkyl group, one or more —CH$_2$—CH$_2$—CH$_2$—CH$_2$— groups are each independently substituted with —CH=CH—CO—O—, —CH=CH—O—CO—, —CO—O—CH=CH—, and/or —O—CO—CH=CH—, in the alkyl group, one or more hydrogen atoms are each independently optionally substituted with a halogen atom, and oxygen atoms are not directly bonded to each other;

$Z^{i1}$ and $Z^{i2}$ each independently represent a single bond or an alkylene group having 1 to 20 carbon atoms, in the alkylene group, one or more —CH$_2$— groups are each independently optionally substituted with —O—, —CF$_2$—, and/or —CO—, in the alkylene group, one or more —CH$_2$—CH$_2$— groups are each independently optionally substituted with —CH$_2$—CH(CH$_3$)—, —CH(CH$_3$)—CH$_2$—, —CH=CH—, —CF=CF—, —CH=C(CH$_3$)—, —C(CH$_3$)=CH—, —CH=N—, —N=CH—, —N=N—, —C≡C—, —CO—O—, and/or —O—CO—, in the alkylene group, one or more —CH$_2$—CH$_2$—CH$_2$—CH$_2$— groups are each independently optionally substituted with —CH=N—N=CH—, and oxygen atoms are not directly bonded to each other;

$m^{i1}$ represents an integer of 0 or 1;

$n^{i1}$ represents an integer of 0 to 3; and when $A^{i2}$ or $Z^{i2}$ is a plurality of units, the units may be identical to or different from one another.

General formula (ii) is as follows.

[Chem. 2]

$$R^{ii1}-\left[A^{ii1}-Z^{ii1}\right]_{n^{ii1}}-A^{ii2}-NCS \qquad (ii)$$

In general formula (ii), $R^{ii1}$ each independently represents an alkyl group having 1 to 20 carbon atoms, in the alkyl group, one or more —CH$_2$— groups are each independently optionally substituted with —O—, —S—, —CO—, and/or —CS—, in the alkyl group, one or more —CH$_2$—CH$_2$— groups are each independently optionally substituted with —CH=CH—, —CO—O—, —O—CO—, —CO—S—, —S—CO—, —CO—NH—, —NH—CO—, —CH=CH—, —CF=CF—, and/or —C≡C—, in the alkyl group, one or more —CH$_2$—CH$_2$—CH$_2$— groups are each independently optionally substituted with —O—CO—O—, in the alkyl group, one or more hydrogen atoms are each independently optionally substituted with a halogen atom, and oxygen atoms are not directly bonded to each other;

$A^{ii1}$ and $A^{ii2}$ each independently represent a group selected from the group consisting of group (a), group (b), group (c), and group (d), described below:

(a) a 1,4-cyclohexylene group (in this group, one —CH$_2$— group or two or more non-adjacent —CH$_2$— groups are optionally substituted with —O— and/or —S—), (b) a 1,4-phenylene group (in this group, one —CH= group or two or more non-adjacent —CH= groups are optionally substituted with —N=), (c) a naphthalene-2,6-diyl group or a decahydronaphthalene-2,6-diyl group (in the naphthalene-2,6-diyl group, one —CH═ group or two or more non-adjacent —CH═ groups are optionally substituted with —N═), and (d) a thiophen-2,5-diyl group, a benzothiophene-2,5-diyl group, a benzothiophene-2,6-diyl group, a dibenzothiophene-3,7-diyl group, a dibenzothiophene-2,6-diyl group, or a thieno[3,2-b]thiophene-2,5-diyl group (in these groups, one —CH═ group or two or more non-adjacent —CH═ groups are optionally substituted with —N═), in $A^{ii1}$ and $A^{ii2}$, one or more hydrogen atoms are each independently optionally substituted with a substituent $S^{ii1}$, the substituent $S^{ii1}$ is a halogen atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, in the alkyl group, one or more —CH$_2$— groups are each independently optionally substituted with —O—, —S—, —CO—, and/or —CS—, in the alkyl group, one or more —CH$_2$—CH$_2$— groups are each independently optionally substituted with —CO—O—, —O—CO—, —CO—S—, —S—CO—, —CO—NH—, —NH—CO—, —CH═CH—, —CF═CF—, and/or —C≡C—, in the alkyl group, one or more —CH$_2$—CH$_2$—CH$_2$— groups are each independently optionally substituted with —O—CO—O—, in the alkyl group, one or more —CH$_2$—CH$_2$—CH$_2$—CH$_2$— groups are each independently optionally substituted with —CH═CH—CO—O—, —CH═CH—O—CO—, —CO—O—CH═CH—, or —O—CO—CH═CH—, in the alkyl group, one or more hydrogen atoms are each independently optionally substituted with a halogen atom, oxygen atoms are not directly bonded to each other, and when the substituent $S^{ii1}$ is a plurality of units, the units may be identical to or different from one another;

$Z^{ii1}$ represents a single bond or an alkylene group having 1 to 20 carbon atoms, in the alkylene group, one or more —CH$_2$— groups are each independently optionally substituted with —O—, in the alkylene group, one or more —CH$_2$—CH$_2$— groups are each independently optionally substituted with —CH$_2$—CH(CH$_3$)—, —CH(CH$_3$)—CH$_2$—, —CH═CH—, —CF═CF—, —CH═C(CH$_3$)—, —C(CH$_3$)═CH—, —CH═N—, —N═CH—, —N═N—, —C≡C—, —CO—O—, and/or —O—CO—, in the alkylene group, one or more —CH$_2$—CH$_2$—CH$_2$— groups are each independently optionally substituted with —O—CO—O—, in the alkylene group, one or more —CH$_2$—CH$_2$—CH$_2$—CH$_2$— groups are each independently optionally substituted with —C(R$^{ia}$)═N—N═C(R$^{ib}$)—, and oxygen atoms are not directly bonded to each other, R$^{ia}$ and R$^{ib}$ each independently represent a hydrogen atom, a halogen atom, or an alkyl group having 1 to 10 carbon atoms, in the alkyl group, one or more —CH$_2$— groups are each independently optionally substituted with —O—, —CO—, and/or —S—, in the alkyl group, one or more —CH$_2$—CH$_2$— groups are optionally substituted with —CH═CH—, —CO—O—, —O—CO—, and/or —C≡C—, and oxygen atoms are not directly bonded to each other;

$n^{ii1}$ represents an integer of 1 to 4; and when $A^{ii1}$ and $Z^{ii1}$ are a plurality of units, the units may be identical to or different from one another.

According to the present embodiment, the liquid crystal material may be one liquid crystal compound selected from the group consisting of the compounds represented by general formula (i) or general formula (ii) or may be a liquid crystal composition formed of a mixture of two or more liquid crystal compounds selected from the group.

(Step (II))

According to the present embodiment, the method for producing a liquid crystal material includes the step (II) of measuring the liquid crystal material with a delta delay measurement mechanism that measures the delta delay value of the liquid crystal material.

Accordingly, the step (II) is a step of measuring the delta delay value of the liquid crystal material prepared in the step (I).

Regulating the delta delay value enables a liquid crystal material having reduced measurement errors to be provided. Accordingly, a liquid crystal material having uniform electrical properties and a production method therefor can be provided.

In the step (II), at least a partial amount of the liquid crystal material prepared in the step (I) may be extracted to be evaluated by the delta delay measurement mechanism that measures the delta delay value.

In this specification, the "delta delay value", which is also referred to as an amount (Δt) of change in an amount of group delay, is an absolute value of a difference between a delay time that elapses before the generation of an electric flux density in an instance in which electrical signals (electromagnetic waves) having successively varying frequencies are provided to a liquid crystal under a reference voltage V$_0$ and a delay time that elapses before the generation of an electric flux density in an instance in which electrical signals (electromagnetic waves) having successively varying frequencies are provided to a liquid crystal under an effective voltage V; in other words, the delta delay value is an absolute value of a difference between the amount of group delay of the measurement object under the effective voltage V and the amount of group delay of the measurement object under the reference voltage V$_0$. Furthermore, according to the present embodiment, the measurement of the delta delay value is carried out with a so-called FDR method, and, as will be described later, the delta delay value is calculated from S-parameters of a network analyzer, for example, a vector network analyzer, that includes a signal source, a signal splitter (power splitter), a directional coupler, and at least three receivers (in this case, three receivers, namely, a reference receiver (R), a reflection receiver (A), and a transmission receiver (B)). More specifically, the transmission delay time t (=amount of group delay) can be defined with an S21 phase, according to equation (I) below.

[Math. 1]

$$t = -\frac{\partial}{\partial \omega} \arg S21 \qquad (I)$$

In equation (I), ω is an angular frequency, and S21 is a parameter representing input/output characteristics of a measurement object having two ports and represents a transmission coefficient from port 1 to port 2.

Furthermore, in instances where the delta delay value (Δt) is calculated by applying a high-frequency electric field to the liquid crystal material loaded in a coaxial tube having a transmission line length l and by using an FDR method, the delta delay value (Δt) can be defined according to equation (II) below.

[Math. 2]

$$\Delta t = \frac{l}{c} \sqrt{\varepsilon(v)} - \sqrt{\varepsilon(0)} \qquad (II)$$

In equation (II), l is the transmission line length, c is a velocity of light, ε (v) is a real part of a complex dielectric constant of the liquid crystal material under the effective voltage, and ε(0) is a real part of a complex dielectric constant of the liquid crystal material under the reference voltage.

An overview of the delta delay measurement system 100 will be described below with reference to FIGS. 1 to 2(*b*). The delta delay measurement system 100 includes the delta delay measurement mechanism of the present embodiment and measures the delta delay value of a measurement object (liquid crystal material).

FIG. 1 is a schematic diagram illustrating an exemplary configuration of the delta delay measurement system 100, according to the present embodiment. A coaxial tube 6, loaded with a liquid crystal material, is connected between a signal transmitting terminal L and a signal receiving terminal R, via DC blocking capacitors 3*a* and 3*b*, coaxial components 4*a* and 4*b*, and adapters 5*a* and 5*b*. The signal transmitting terminal L and the signal receiving terminal R are connected to a vector network analyzer 2. Furthermore, a DC power supply 7 is electrically connected via the coaxial components 4*a* and 4*b*. Furthermore, a processing device 1 is connected to the vector network analyzer 2.

Accordingly, the results of the measurements performed by the delta delay measurement system 100 are displayed on a display of the vector network analyzer 2 and sent to the processing device 1, which is connected to the vector network analyzer 2. Devices, such as a plotter and a calculator (personal computer), can be connected to the processing device 1 in a simultaneous parallel manner or in a manner such that the connection is to be switched as needed. The transmission characteristics of the liquid crystal material loaded in the coaxial tube 6 are calculated from the results of the measurements of the transmission characteristics displayed on the display or the results of the processing performed by the processing device 1.

For the measurements of the transmission characteristics, a range of an oscillation frequency of a sweep frequency oscillator of the network analyzer 2 may be set such that the range includes a cutoff frequency associated with the instance in which the liquid crystal material that is the measurement object is loaded in the coaxial tube 6. The delta delay value may be displayed on the display of the vector network analyzer 2. Alternatively, the delta delay value may be calculated by directly reading the frequency characteristics of the transmission coefficient recorded by the plotter. Alternatively, the delta delay value may be calculated by determining, with the processing device 1, differential values of the transmission coefficient with respect to the frequencies and using the frequency that gives the maximum value.

Typically, the signal transmitting terminal L and the signal receiving terminal R may be coaxial cable connectors or waveguides. FIG. 1 illustrates an example in which coaxial cable connectors are used. The sweep frequency oscillator (not illustrated), a level detector (not illustrated), a calibration circuit (not illustrated), and the like are included within the network analyzer 2.

FIG. 1 illustrates an example of a configuration of the coaxial tube 6, in which a linear member that serves as an inner conductor 8 extends through the interior of a cylindrical outer conductor 9. A space (space portion) exists between the inner conductor 8 and the inner wall of the cylindrical outer conductor. The space is where a measurement object, such as the liquid crystal material, is loaded. The state in which the liquid crystal material is loaded in the space of the coaxial tube 6 will be described below with reference to FIGS. 2(*a*) and 2(*b*).

FIGS. 2(*a*) and 2(*b*) are both cross-sectional views of the coaxial tube 6 of FIG. 1 taken along line I-I. More specifically, FIG. 2(*a*) is a schematic diagram illustrating an alignment of liquid crystal molecules 10 that are in a state (unbiased state) in which a reference voltage $V_0$ (e.g., a voltage of 0 V) is applied between the inner conductor 8 and an outer conductor 9; this state is achieved by not passing a current or by passing a small current through the inner conductor 8 from the DC power supply 7 via the coaxial components 4*a* and 4*b*. FIG. 2(*b*) is a schematic diagram illustrating an alignment of liquid crystal molecules 10 that are in a state in which the effective voltage V (e.g., greater than 0 V) is applied between the inner conductor 8 and the outer conductor 9; this state is achieved by passing a current through the inner conductor 8 from the DC power supply 7 via the coaxial components 4*a* and 4*b*.

When the voltage between the inner conductor 8 and the outer conductor 9 is less than or equal to the reference voltage $V_0$, a long axis direction of the liquid crystal molecules 10 are randomly oriented with respect to a direction of an electric field $E_0$ as illustrated in FIG. 2(*a*), and thus, the liquid crystal molecules 10 are in a so-called random alignment state. When the voltage between the inner conductor 8 and the outer conductor 9 is greater than or equal to the effective voltage V, the liquid crystal molecules 10 come into a state in which the long axis directions of the liquid crystal molecules 10 are aligned parallel to a direction of an electric field $E_v$, as illustrated in FIG. 2(*b*).

Now, each of the constituent elements of the delta delay measurement system 100, according to the present embodiment, will be described.

<Delta Delay Measurement Mechanism>

According to the present embodiment, the delta delay measurement mechanism includes the single coaxial tube 6 and a mechanism that calculates the delta delay value of the liquid crystal material. The single coaxial tube 6 includes the linear inner conductor 8 and the outer conductor 9, which has a space through which the inner conductor 8 extends. The delta delay value is a difference between a transmission delay time $t_0$ and a transmission delay time $t_v$. The transmission delay time $t_0$ is measured by propagating electromagnetic waves through the liquid crystal material in a state in which a reference voltage $V_0$ is applied between the inner conductor 8 and the outer conductor 9, the electromagnetic waves having successively varying frequencies, the liquid crystal material being loaded in the space between the inner conductor 8 and the outer conductor 9. The transmission delay time $t_0$ is measured by propagating the electromagnetic waves through the liquid crystal material in a state in which an effective voltage V, which is greater than the reference voltage $V_0$, is applied between the inner conductor 8 and the outer conductor 9.

That is, according to the present embodiment, the delta delay measurement mechanism includes the single coaxial tube 6 in which a liquid crystal material that is a measurement sample is loadable; and the mechanism that calculates the delta delay value of the liquid crystal material, where the delta delay value is a difference between the transmission delay time $t_0$, which is measured by the propagation through the liquid crystal material under the reference voltage $V_0$, and the transmission delay time $t_v$, which is measured by the propagation through the liquid crystal material under the effective voltage V. The difference in the transmission delay time corresponds to the difference in the amount of group delay.

As described, the delta delay measurement mechanism uses only one coaxial tube 6 and, therefore, can resolve the problem of an accumulation of measurement errors due to the attachment and detachment of coaxial tubes 6 (errors in loss of reflection of electromagnetic waves or an intensity of electromagnetic waves) and the problem of a reduction in reproducibility of the measurement.

—Coaxial Tube—

As illustrated in FIGS. 1 to 2(*b*), according to the present embodiment, the coaxial tube 6 includes the outer conductor 9, which is tubular and has an opening at both ends, and the inner conductor 8, which is a solid linear member and extends through the outer conductor 9 without being in contact with an inner wall thereof. Accordingly, since the inner conductor 8 is spaced a predetermined distance from the inner wall of the outer conductor 8, the coaxial tube 6 has a space that enables a liquid crystal material to be loaded within the coaxial tube 6.

The coaxial tube 6 is formed of a coaxial tube main body and coaxial tube connectors that are provided at both ends of the coaxial tube main body to support the inner conductor 8 that is to extend through the coaxial tube main body. A material that forms the coaxial tube 6 is not particularly limited and is preferably a metal having excellent workability and corrosion resistance. For example, preferably, the material that forms the coaxial tube 6 is brass.

In addition, a shape of the coaxial tube 6 may be a cylindrical shape, a prismatic shape, or the like. Preferably, the shape is a cylindrical shape.

Note that, for convenience of description, FIG. 1 illustrates a state in which the pair of coaxial tube connectors are spaced from the coaxial tube main body; in the actual coaxial tube 6, however, the coaxial tube connectors are joined to the coaxial tube main body. Furthermore, the solid line surrounding the coaxial tube main body and the coaxial tube connectors indicates that the coaxial tube main body and the coaxial tube connectors are constituent elements of the coaxial tube 6.

In the present embodiment, the inner conductor 8 is a solid linear member and is also referred to as a central conducting wire. Preferably, a material that forms the inner conductor 8 is a conducting wire having excellent conductivity and high rigidity. For example, preferably, the material is a hard-drawn steel wire or a piano wire. Desirably, the inner conductor 8 is internally disposed in a central portion in cross section within the coaxial tube 6. Preferably, the inner conductor 8 is linear in a longitudinal direction thereof.

In the present embodiment, it is necessary to ensure the space between the outer conductor 9 and the inner conductor 8 in which the measurement object (liquid crystal material) is to be loaded, and, accordingly, it is necessary that a cross-sectional outside diameter of the inner conductor 8 be smaller than a cross-sectional inside diameter of the coaxial tube 6 (a cross-sectional inside diameter of the outer conductor 9). A width of the space to be ensured to load the measurement object therein, that is, a minimum spacing distance between the outer conductor 9 and the inner conductor 8 (cross-sectional inside diameter of outer conductor 9—cross-sectional outside diameter of inner conductor 8) is preferably approximately 1 mm and, more specifically, preferably 0.5 to 1.5 mm. Furthermore, it is sufficient that the cross-sectional inside diameter of the outer conductor 9, which is also the inside diameter of the coaxial tube 6, be approximately 3 mm. More specifically, the cross-sectional inside diameter is preferably approximately 2.5 to 3.5 mm. In addition, the cross-sectional outside diameter of the inner conductor 8 is preferably approximately 1 mm and, more specifically, preferably 0.5 to 1.5 mm.

In the present embodiment, it is preferable that a length of the inner conductor 8 in the longitudinal direction be equal to a total length of the coaxial tube main body and the coaxial tube connectors provided at both ends thereof. A length of the liquid-crystal-material-loading section of the coaxial tube main body in the longitudinal direction is preferably 10 to 100 mm and more preferably 10 to 50 mm. Furthermore, it is preferable that the number of inner conductors 8 to be internally disposed be one.

In the present embodiment, it is necessary that the outer conductor 9 and the inner conductor 8 be electrically isolated from each other and that the measurement object that has fluidity be prevented from leaking from the space. Accordingly, it is preferable that the coaxial tube connectors that support the inner conductor 8 include an internally disposed sealing material, which may be made of a Teflon (registered trademark) resin or the like.

—Transmission Delay Time—

In the present embodiment, the mechanism that calculates the delta delay value of the liquid crystal material, which is a difference between the transmission delay time $t_0$ and the transmission delay time $t_v$, may be a network analyzer, which may be, for example, the vector network analyzer 2. Typically, the vector network analyzer 2 is one that has been developed as a device for analyzing electronic networks and, basically, is a device that measures impedances and an amount of attenuation. The vector network analyzer 2 can measure amplitudes and phases, which makes it possible to measure high-frequency characteristics of various samples.

Note that the measurements of the transmission delay time $t_0$ and the transmission delay time $t_v$ are to be performed under conditions in which the liquid crystal material is at room temperature (25° C.).

The measurement of S21 that is performed with the measurement mechanism of the vector network analyzer 2 will be described below; S21 is used for the calculation of the amount of group delay that corresponds to the transmission delay time. Furthermore, since the S parameters vary depending on the definition of the port, the following description describes an instance in which the ports of a measurement object having two ports are designated as port 1 and port 2, for convenience of description. Note that port 1 and port 2 can be regarded as two ports of the vector network analyzer 2.

The vector network analyzer 2 includes a signal source, a signal splitter (power splitter), a directional coupler, and at least three receivers (in this case, three receivers, namely, a reference receiver (R), a reflection receiver (A), and a transmission receiver (B)). A signal that is an electromagnetic wave is output from the signal source and split into two signals by the signal splitter (power splitter). One of the signals that are electromagnetic waves is input into the reference receiver (R). The other signal is output as an incident signal from port 1, and the incident signal is input (for example, from the signal transmitting terminal L-side) into the liquid crystal material that is a measurement object loaded in the coaxial tube 6. The reflected signal reflected from the coaxial tube 6 (liquid crystal material) is received by the reflection receiver (A). The transmitted signal that has passed through the coaxial tube 6 (liquid crystal material) (=the incident signal that has propagated and passed through the liquid crystal material) is received by the transmission receiving unit (B). Accordingly, the transmitted signal received by the transmission receiving unit (B) and the reflected signal received by the reflection receiver (A) are each compared with the reference signal received by the reference receiver (R) to detect phases. Furthermore, a reflection coefficient (S11) and the transmission coefficient (S21) of the liquid crystal material loaded in the coaxial tube 6 are calculated from the differences from the reference signal. These described steps constitute one cycle of a forward transmission, and this cycle is repeated while the frequency is varied over the range of set values (0.1 to 26.5 GHz). This cycle is also referred to as a forward transmission output from port 1.

In the present embodiment, it is preferable that the successively varying frequencies of the electromagnetic waves (incident signals) that are propagated through the liquid crystal material from the vector network analyzer 2 range from 0.1 to 26.5 GHz, for example, as will be described later. Furthermore, in the present embodiment, it is necessary to apply a direct current (DC) to the inner conductor 8 from the DC power supply 7 through the coaxial components 4a and 4b while repeating the frequencies ranging from 0.1 to 26.5 GHz multiple times (successively increasing the frequency from 0.1 to 26.5 GHz, then, when the 26.5 GHz is reached, successively increasing again the frequency from 0.1 to 26.5 GHz, and repeating this process), thereby superimposing electromagnetic waves (incident signals) having the frequencies on the inner conductor 8.

Figure 2A:
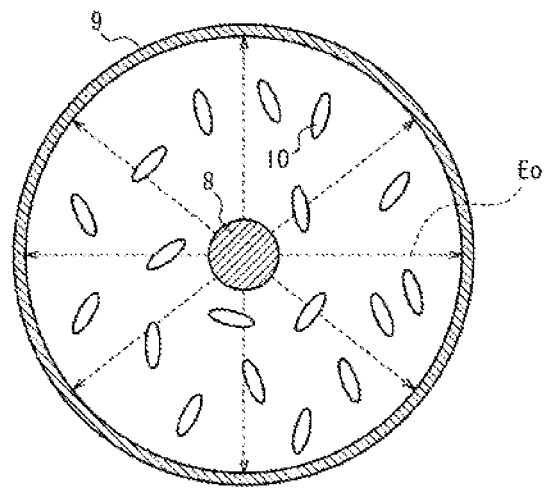
[FIGS. 2(a) and 2(b)]
Figure 2B:
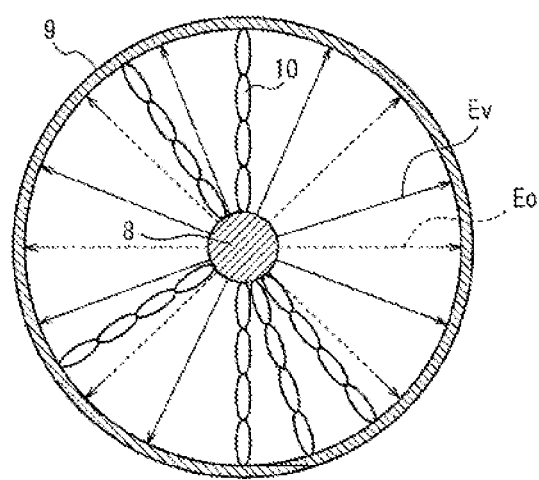

Furthermore, in the present embodiment, the above-described cycle is to be performed on the liquid crystal molecules 10 that are in a random alignment state (the condition of the reference voltage $V_0$ or less) as illustrated in FIG. 2(a) and on the liquid crystal molecules 10 that are in a state in which the long axis directions thereof are aligned in a particular direction (the condition of the effective voltage V or more) as illustrated in FIG. 2(b). Accordingly, it is possible to measure the transmission coefficient (S21) associated with each of the instances having different alignment states of the liquid crystal molecules 10 present in the liquid crystal material.

Accordingly, with general equation (I) shown above, it is possible to measure the transmission delay time $t_0$, which is associated with the condition of the reference voltage $V_0$ or less, and the transmission delay time $t_v$, which is associated with the condition of the effective voltage V or more, where the voltages are those applied between the inner conductor S and the outer conductor 9. The delta delay value is measured from the absolute value of the difference between the transmission delay times.

As referred to herein, the reflection coefficient (S11) and the transmission coefficient (S21) are called "S-parameters". For example, S11 (reflection coefficient) represents an amount of change in a magnitude and the phase of the reflected signal with respect to the incident signal, and S21 (transmission coefficient) represents an amount of change in a magnitude and the phase of the transmitted signal with respect to the incident signal.

When the switch is switched to a reverse direction, a reverse transmission is output from port 2, as with the above-described forward transmission, and, accordingly, an incident signal is input (for example, from the signal receiving terminal R-side) into the liquid crystal material that is a measurement object loaded in the coaxial tube 6, to measure reverse-direction characteristics. Accordingly, a reverse reflection coefficient (S22) and a reverse transmission coefficient (S12) are calculated.

In the present embodiment, the effective voltage V to be applied between the inner conductor 8 and the outer conductor 9 is preferably greater than or equal to 5 V and preferably 50 to 150 V. The transmission delay characteristics are measured after the applied voltage has reached a specific value (application value).

In the present embodiment, the frequency of the electromagnetic waves (incident signals) to be propagated from the vector network analyzer 2 through the liquid crystal material is successively varied, preferably over the range of 0.1 to 26.5 GHz, and the propagation over the range of 0.1 to 26.5 GHz is repeated multiple times to superimpose the electromagnetic waves on the inner conductor 8. The frequency range is determined depending on the properties of the vector network analyzer 2 that is used for the measurement. Accordingly, it is necessary to select a vector network analyzer 2 that can be used with the frequency band over which the characteristics are desired to be determined.

<Other Constituent Elements of Delta Delay Measurement System 100>

In the present embodiment, the DC blocking capacitors 3a and 3b are not particularly limited as long as they can block the flow of the direct current to the vector network analyzer 2 in instances in which a signal on which a direct voltage is superimposed is measured. Furthermore, the adapters 5a and 5b are not particularly limited as long as they can be used to electrically connect the coaxial components 4a and 4b to the coaxial tube 6. Likewise, the DC power supply 7 is not particularly specified; however, since a direct voltage (DC) needs to be applied via the coaxial components 4a and 4b, it is necessary to select a DC power supply 7 that is in accordance with the voltage that is applied to the inner conductor 8.

[Method for Measuring Delta Delay]

The present disclosure provides a method for measuring a delta delay. The method includes using a single coaxial tube 6 that includes a linear inner conductor 8 and an outer conductor 9, the outer conductor 9 having a space through which the inner conductor 8 extends. The delta delay is an amount of change in a transmission delay time associated with electromagnetic waves propagating through a liquid crystal material loaded in the space. Furthermore, the method for measuring a delta delay includes a step of providing a liquid crystal material; a step of loading the liquid crystal material between the inner conductor 8 and the outer conductor 9; and a step of calculating a delta delay value of the liquid crystal material. The delta delay value is a difference between a transmission delay time $t_0$ and a transmission delay time $t_v$. The transmission delay time $t_0$ is measured by propagating electromagnetic waves (incident signals) through the liquid crystal material in a state in which a reference voltage $V_0$ is applied between the inner conductor 8 and the outer conductor 9, the electromagnetic waves having successively varying frequencies. The transmission delay time $t_v$ is measured by propagating (incident signals) through the liquid crystal material in a state in which an effective voltage V, which is greater than the reference voltage $V_0$, is applied between the inner conductor 8 and the outer conductor 9.

In the method for measuring a delta delay, according to the present embodiment, after the liquid crystal material is provided, the liquid crystal material can be loaded in the space of the coaxial tube 6 in any manner that prevents the introduction of gas bubbles into the region between the inner conductor 8 and the outer conductor 9, which is the space of the coaxial tube 6. The liquid crystal material is a material such as those described above in the "Step (I)" section. In the method for measuring a delta delay of the present embodiment, the liquid crystal material may be a commercial compound or a synthesized compound.

According to the present embodiment, a procedure of the method for measuring a delta delay is as follows. First, a voltage less than or equal to the reference voltage $V_0$ is applied (e.g., no voltage is applied (no bias)) between the inner conductor 8 and the outer conductor 9, then, S21 is calculated with the delta delay measurement system 100 described above, and subsequently, the transmission delay time $t_0$ is determined according to equation (I), shown above. Subsequently, a voltage greater than or equal to the effective voltage V is applied, then, S21 is calculated with the delta delay measurement system 100 described above, and subsequently, the transmission delay time $t_v$ is determined according to equation (I), shown above. Subsequently, the delta delay value is measured by calculating the absolute value of the difference between the transmission delay time to and the transmission delay time $t_v$.

[Apparatus for Measuring Delta Delay Value]

The present disclosure provides an apparatus for measuring a delta delay value. The apparatus includes a single coaxial tube 6, an electrical signal transmitting and receiving unit (=a reflection receiver (A) and a transmission receiver (B)), and an analysis and processing unit (=a vector network analyzer 2 and a processing device). The coaxial tube 6 includes a linear inner conductor 8, an outer conductor 9, through which the inner conductor 8 internally extends, and a space that is located between the inner conductor 8 and the outer conductor 9 and in which a liquid crystal material is loadable. The electrical signal transmitting and receiving unit inputs electrical signals (=incident signals) that are electromagnetic waves to the coaxial tube 6 and receives output signals (=transmitted signals) that are electromagnetic waves output in response to the electrical signals. The analysis and processing unit analyzes and processes the electrical signals and the output signals transmitted or received by the electrical signal transmitting and receiving unit.

The analysis and processing unit calculates a delta delay value of the liquid crystal material. The delta delay value is a difference between a transmission delay time $t_0$ and a transmission delay time $t_v$. The transmission delay time $t_0$ is a time measured by propagating electromagnetic waves (=incident signals) through the liquid crystal material in a state in which a reference voltage $V_0$ is applied between the inner conductor 8 and the outer conductor 9, the electromagnetic waves having successively varying frequencies. The transmission delay time $t_0$ is a time measured by propagating electromagnetic waves (=incident signals) through the liquid crystal material in a state in which an effective voltage V, which is greater than the reference voltage $V_0$, is applied between the inner conductor S and the outer conductor 9.

As such, the apparatus for measuring a delta delay value corresponds to the above-described delta delay measurement system 100, and, therefore, a description thereof is not provided here.

[Physical Property Values of Liquid Crystal Material and Compounds Used in Liquid Crystal Material]

A liquid crystal phase upper-limit temperature ($T_{ni}$) is a temperature at which the liquid crystal composition undergoes a phase change from a nematic phase to an isotropic phase.

The $T_{ni}$ is measured by preparing a preparation in which the liquid crystal composition is held between a glass slide and a glass cover and performing observation with a polarizing microscope while heating the preparation on a hot stage.

Alternatively, differential scanning calorimetry (DSC) may be used for the measurement.

The unit to be used is "° C.".

The higher the $T_{ni}$, the greater the possibility that the nematic phase can be maintained at high temperatures, and, therefore, the wider the operational temperature range that can be set.

According to the present embodiment, the liquid crystal phase upper-limit temperature ($T_{ni}$) of the liquid crystal material can be set flexibly depending on instances, which include instances in which the liquid crystal material is used in an indoor environment, an automobile, or the like in which an external temperature of a liquid crystal display device is controllable and instances in which the liquid crystal material is used in an outdoor environment. The liquid crystal phase upper-limit temperature ($T_{ni}$) may be 50° C. or greater, 100 to 200° C., or 110° C. to 180° C.; these are preferable from the standpoint of the operational temperature range.

A liquid crystal phase lower-limit temperature ($T_{-n}$) is a temperature at which the liquid crystal composition undergoes a phase change from a different phase (glass, a smectic phase, or a crystal phase) to a nematic phase.

The $T_{-n}$ is measured by loading the liquid crystal composition into a glass capillary and immersing the glass capillary in a coolant at −70° C., to induce a phase change in the liquid crystal composition to form a different phase, and then performing observation while increasing a temperature.

Alternatively, differential scanning calorimetry (DSC) may be used for the measurement.

The unit to be used is "° C.".

The lower the $T_{-n}$, the greater the possibility that the nematic phase can be maintained at low temperatures, and, therefore, the wider the operational temperature range that can be set.

According to the present embodiment, the liquid crystal phase lower-limit temperature ($T_{-n}$) of the liquid crystal material may be 10° C. or less, −70 to 0° C., or −45 to −5° C.; these are preferable from the standpoint of the operational temperature.

A refractive index anisotropy (Δn) is an index associated with a phase modulation ability with respect to light of a target wavelength.

The Δn at 25° C. and 589 nm is determined from a difference ($n_e-n_o$) between an extraordinary refractive index ($n_e$) of the liquid crystal composition and an ordinary refractive index ($n_o$) thereof by using an Abbe refractometer.

Alternatively, a retardation measuring device may be used to determine the Δn.

A retardation Re, a thickness d of a liquid crystal layer, and the Δn have a relationship of Δn=Re/d.

An in-plane Re is measured as follows: the liquid crystal composition is introduced into a glass cell having a cell gap (d) of approximately 3.0 μm and including an anti-parallel rubbed polyimide alignment film; and a retardation film and optical material inspection device RETS-100 (manufactured by Otsuka Electronics Co., Ltd.) is used.

The measurement is performed under conditions including a temperature of 25° C. and 589 nm, and there is no unit.

According to the present embodiment, the Δn of the liquid crystal material at 25° C. and 589 nm may be 0.20 or greater, 0.25 to 0.60, 0.30 to 0.55, or 0.35 to 0.50; these are preferable from the standpoint of the phase modulation ability with respect to light of a wavelength.

A rotational viscosity ($\gamma_1$) is a viscosity coefficient associated with the rotation of the liquid crystal molecules.

The $\gamma_1$ can be measured by loading the liquid crystal composition into a glass cell having a cell gap of approximately 10 μm and by using an LCM-2 (manufactured by TOYO Corporation).

In instances where the liquid crystal composition has a positive dielectric anisotropy, a homogeneous cell is used. In instances where the liquid crystal composition has a negative dielectric anisotropy, a homeotropic cell is used.

The measurement is performed at a temperature of 25° C., and the unit to be used is mPa·s.

The lower the $\gamma_1$, the higher a response speed of the liquid crystal composition, and, therefore, a low $\gamma_1$ is preferable in any liquid crystal display device.

According to the present embodiment, the rotational viscosity ($\gamma_1$) of the liquid crystal material at 25° C. may be 150 to 2000 mPa·s, 200 to 1500 mPa·s, or 250 to 1000 mPa·s; these are preferable from the standpoint of the response speed.

A threshold voltage ($V_{th}$) is correlated with a driving voltage of the liquid crystal composition.

The $V_{th}$ can be determined by loading the liquid crystal composition into a TN cell having a gap of 8.3 μm and by using a transmittance obtained by applying a voltage thereto.

The measurement is performed at a temperature of 25° C., and the unit to be used is V.

The lower the $V_{th}$, the lower the voltage necessary for enabling driving.

According to the present embodiment, the $V_F$ of the liquid crystal material at 25° C. may be 3.0 V or less, 0.3 to 3.0 V, 0.5 to 2.7 V, 0.7 to 2.5 V, 0.9 to 2.3 V, 1.1 to 2.1 V, or 1.3 to 2.1 V; these are preferable from the standpoint of the driving voltage.

The Δε (1 kHz (kilohertz)) is expressed as Δε (1 kHz) =ε∥−ε⊥.

That is, the Δε (1 kHz) is the difference between the dielectric constant ε∥ and the dielectric constant ε⊥. The dielectric constants are indices indicating a tendency for polarization.

The Δε (1 kHz) can be measured in the manner described below.

First, a liquid crystal material to be measured is sealed into a homeotropically treated cell to measure the dielectric constant ε∥ of the long axis direction of the liquid crystal molecules, and subsequently, the liquid crystal material to be measured is sealed into a homogeneously treated cell to measure the dielectric constant ε⊥ in the short axis direction of the liquid crystal molecules.

The dielectric anisotropy Δε (1 kHz) can be determined by the difference between the measured values.

Note that the dielectric constant can be measured with a dielectric constant measuring device called an LCR meter by using a measurement frequency of 1 kHz.

The measurement is performed at a temperature of 25° C., and there is no unit.

According to the present embodiment, the Δε (1 kHz) of the liquid crystal material at 25° C. may be 1 to 25, 3 to 20, or 5 to 15; these are preferable from the standpoint of the driving voltage.

According to the present embodiment, the liquid crystal material has a delta delay value of 0.01 or greater. Preferably, the delta delay value is 0.01 to 0.05, 0.015 to 0.045, 0.015 to 0.040, 0.020 to 0.035, or 0.025 to 0.325. When the delta delay value is greater than or equal to 0.01, the liquid crystal material tends to have excellent electrical properties.

Achieving the delta delay value of 0.01 or greater requires combining a compound having a group that has an electron polarization in an electric field greater than that of a fluorine group or a cyano group. Accordingly, it is preferable that the liquid crystal material have an isothiocyanate group (—NCS).

Preferably, the liquid crystal material having the delta delay value of 0.01 or greater includes one or more compounds selected from the group consisting of the compounds represented by general formula (i) or general formula (ii) below.

Furthermore, according to the present embodiment, the liquid crystal material may be one liquid crystal compound selected from the group consisting of the compounds represented by general formula (i) or general formula (ii) or may be a liquid crystal composition formed of a mixture of two or more liquid crystal compounds selected from the group.

Preferably, the liquid crystal material of the present disclosure includes one or more of the compounds having an indan structure or a tetralin structure and having an isothiocyanate group (—NCS) represented by general formula (i) below.

[Chem. 3]

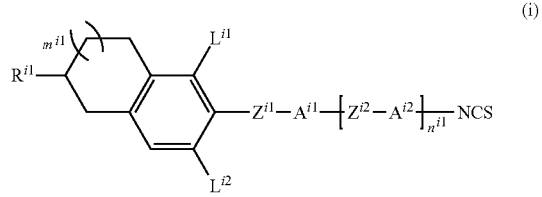

(i)

In general formula (i), $R^{i1}$ represents a hydrogen atom or an alkyl group having 1 to 20 carbon atoms.

The alkyl group having 1 to 20 carbon atoms is a linear, branched, or cyclic alkyl group and is preferably a linear alkyl group.

The number of carbon atoms of the alkyl group having 1 to 20 carbon atoms is preferably 2 to 10 or 2 to 6.

In the alkyl group, one or more —CH$_2$— groups are each independently optionally substituted with —O—, —S—, —CO—, and/or —CS—.

In the alkyl group, one or more —CH$_2$—CH$_2$— groups are each independently optionally substituted with —CO—O—, —O—CO—, —CO—S—, —S—CO—, —CO—NH—, —NH—CO—, —CH═CH—, —CF═CF—, and/or —C≡C—.

In the alkyl group, one or more —CH$_2$—CH$_2$—CH$_2$— groups are each independently optionally substituted with —O—CO—O—.

In the alkyl group, one or more —CH$_2$—CH$_2$—CH$_2$—CH$_2$— groups are each independently optionally substituted with —CH=CH—CO—O—, —CH=CH—O—CO—, —CO—O—CH=CH—, or —O—CO—CH=CH—.

In the alkyl group, one or more hydrogen atoms are each independently optionally substituted with a halogen atom.

The halogen atom may be a fluorine atom, a chlorine atom, or a bromine atom.

Note that in instances where the alkyl group is substituted with a specific substituent, oxygen atoms are not directly bonded to each other.

Furthermore, from the standpoint of a stability of the compound, it is preferable that sulfur atoms not be directly bonded to each other and/or that an oxygen atom and a sulfur atom not be directly bonded to each other.

For example, in instances where one —CH$_2$— group in the alkyl group is substituted with —O—, $R^{i1}$ can represent an alkoxy group having 1 to 19 carbon atoms.

The alkoxy group is a linear, branched, or cyclic alkoxy group and is preferably a linear alkoxy group.

The number of carbon atoms of the alkoxy group is preferably 2 to 10 or 2 to 6.

In instances where one —CH$_2$— group in the alkyl group is substituted with —S—, $R^{i1}$ can represent a thioalkoxy group (alkylthio group or alkylsulfanyl group) having 1 to 19 carbon atoms.

The thioalkoxy group is a linear, branched, or cyclic thioalkoxy group and is preferably a linear thioalkoxy group.

The number of carbon atoms of the thioalkoxy group is preferably 2 to 10 or 2 to 6.

In instances where one or more —CH$_2$—CH$_2$— groups in the alkyl group are substituted with —CH=CH—, $R^{i1}$ can represent an alkenyl group having 2 to 20 carbon atoms.

The alkenyl group is a linear, branched, or cyclic alkenyl group and is preferably a linear alkenyl group.

The number of carbon atoms of the alkenyl group is preferably 2 to 10 or 2 to 6.

In instances where one or more —CH$_2$—CH$_2$— groups in the alkyl group are substituted with —C≡C—, $R^{i1}$ can represent an alkynyl group having 2 to 20 carbon atoms.

The alkynyl group is a linear, branched, or cyclic alkynyl group and is preferably a linear alkynyl group.

The number of carbon atoms of the alkynyl group is preferably 2 to 10 or 2 to 6.

In instances where, in the alkyl group, one —CH$_2$— group is substituted with —O—, and one or more —CH$_2$—CH$_2$— groups are substituted with —CH=CH—, $R^{i1}$ can represent an alkenyloxy group having 2 to 19 carbon atoms.

The alkenyloxy group is a linear, branched, or cyclic alkenyloxy group and is preferably a linear alkenyloxy group.

The number of carbon atoms of the alkenyloxy group is preferably 2 to 10 or 2 to 6.

In instances where one or more hydrogen atoms in the alkyl group are substituted with a halogen atom, $R^{i1}$ can represent a halogenated alkyl group having 1 to 20 carbon atoms.

The halogenated alkyl group is a linear, branched, or cyclic halogenated alkyl group and is preferably a linear halogenated alkyl group.

The number of carbon atoms of the halogenated alkyl group is preferably 2 to 10 or 2 to 6.

In instances where, in the alkyl group, one —CH$_2$— group is substituted with —O—, and one or more hydrogen atoms in the alkyl group are substituted with a halogen atom, $R^{i1}$ can represent a halogenated alkoxy group having 1 to 19 carbon atoms.

The halogenated alkoxy group is a linear, branched, or cyclic halogenated alkoxy group and is preferably a linear halogenated alkoxy group.

The number of carbon atoms of the halogenated alkoxy group is preferably 2 to 10 or 2 to 6.

Specific examples of the alkyl group (which may be substituted) having 1 to 20 carbon atoms of $R^{i1}$ include groups represented by formulae ($R^{i1}$-1) to ($R^{i1}$-36).

[Chem. 4]

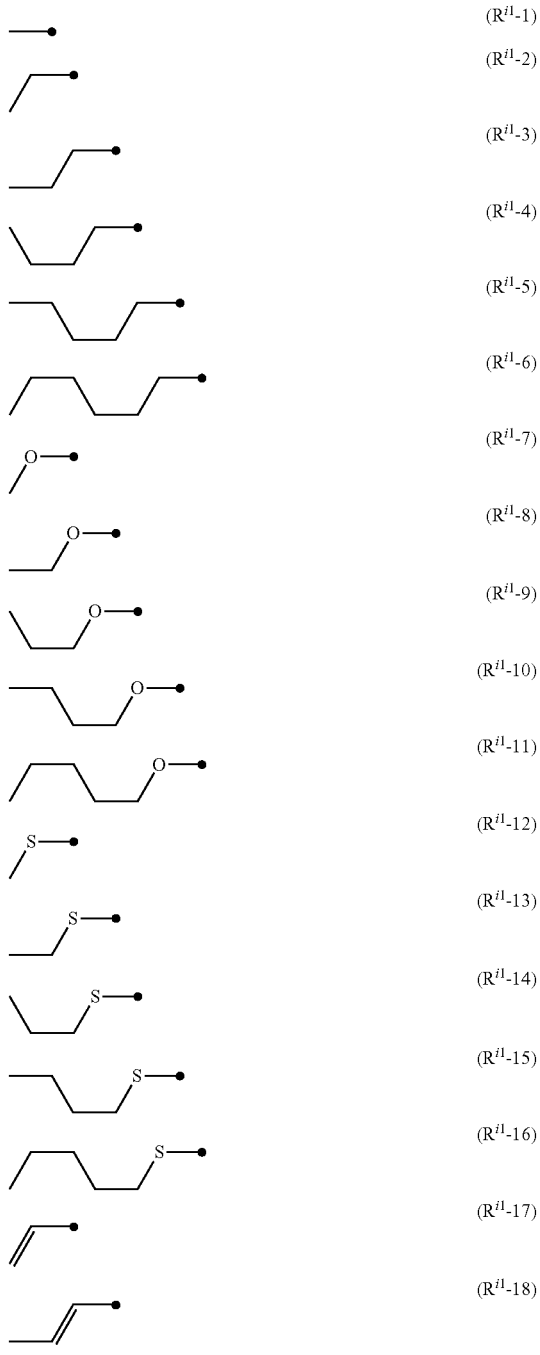

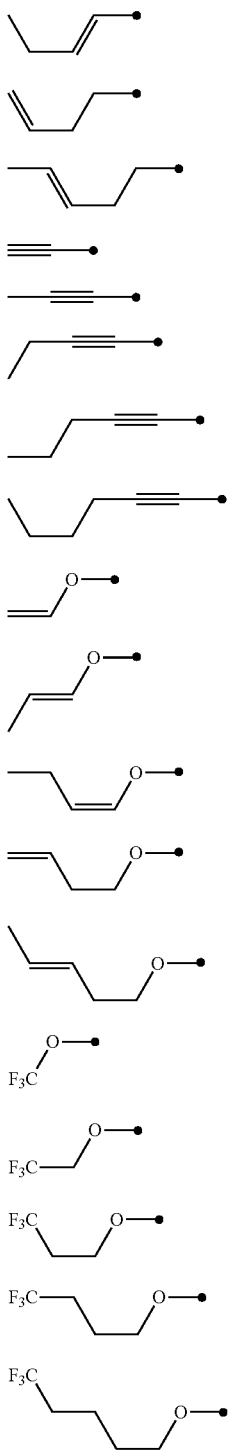

(R$^{i1}$-19)
(R$^{i1}$-20)
(R$^{i1}$-21)
(R$^{i1}$-22)
(R$^{i1}$-23)
(R$^{i1}$-24)
(R$^{i1}$-25)
(R$^{i1}$-26)
(R$^{i1}$-27)
(R$^{i1}$-28)
(R$^{i1}$-29)
(R$^{i1}$-30)
(R$^{i1}$-31)
(R$^{i1}$-32)
(R$^{i1}$-33)
(R$^{i1}$-34)
(R$^{i1}$-35)
(R$^{i1}$-36)

In formulae (R$^{i1}$-1) to (R$^{i1}$-36), the black dot represents a bond to an indan structure or a tetralin structure.

Note that R$^{i1}$ may be a linear alkyl group having 2 to 6 carbon atoms, which is preferable from the standpoint of compatibility with other liquid crystal compounds.

In general formula (i), A$^{i1}$ and A$^{i2}$ each independently represent a hydrocarbon ring having 3 to 16 carbon atoms or represent a heterocycle having 3 to 16 carbon atoms.

More specifically, it is preferable that the hydrocarbon ring having 3 to 16 carbon atoms or the heterocycle having 3 to 16 carbon atoms be a group selected from the group consisting of group (a), group (b), group (c), and group (d), described below:

(a) a 1,4-cyclohexylene group (in this group, one —CH$_2$— group or two or more non-adjacent —CH$_2$— groups are optionally substituted with —O— or —S—);

(b) a 1,4-phenylene group (in this group, one —CH= group or two or more non-adjacent —CH= groups are optionally substituted with —N=);

(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, or a phenanthrene-2,7-diyl group (in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group, one —CH= group or two or more —CH= groups are optionally substituted with —N=); and (d) a thiophen-2,5-diyl group, a benzothiophene-2,5-diyl group, a benzothiophene-2,6-diyl group, a dibenzothiophene-3,7-diyl group, a dibenzothiophene-2,6-diyl group, or a thieno[3,2-b]thiophene-2,5-diyl group (in these groups, one —CH= group or two or more non-adjacent —CH= groups are optionally substituted with —N=).

In A$^{i1}$ and A$^{i2}$, one or more hydrogen atoms are each independently optionally substituted with a substituent S$^{i1}$.

The substituent S$^{i1}$ is a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms.

The alkyl group is a linear, branched, or cyclic alkyl group and is preferably a linear alkyl group.

The number of carbon atoms of the alkyl group is preferably 2 to 10 or 3 to 6.

In the alkyl group, one or more —CH$_2$— groups are each independently optionally substituted with —O—, —S—, and/or —CO—.

In the alkyl group, one or more —CH$_2$—CH$_2$— groups are each independently optionally substituted with —CH=CH—, —CF=CF—, —C≡C—, —CO—O—, —O—CO—, —CO—S—, —S—CO—, —CO—NH—, and/or —NH—CO—.

In the alkyl group, one or more —CH$_2$—CH$_2$—CH$_2$— groups are optionally substituted with —O—CO—O—.

In the alkyl group, one or more —CH$_2$—CH$_2$—CH$_2$—CH$_2$— groups are each independently optionally substituted with —CH=CH—CO—O—, —CH=CH—O—CO—, —CO—O—CH=CH—, and/or —O—CO—CH=CH—.

In the alkyl group, one or more hydrogen atoms are each independently optionally substituted with a halogen atom.

The halogen atom may be a fluorine atom, a chlorine atom, a bromine atom, or an iodine atom.

Note that in instances where the alkyl group is substituted with a specific substituent, oxygen atoms are not directly bonded to each other.

Furthermore, from the standpoint of a stability of the compound, it is preferable that sulfur atoms not be directly bonded to each other and/or that an oxygen atom and a sulfur atom not be directly bonded to each other.

Preferably, the substituent $S^{i1}$ is a fluorine atom or a linear alkyl group having 1 to 3 carbon atoms.

Furthermore, preferably, at least one of $A^{i1}$ and $A^{i2}$ is substituted with at least one substituent $S^{i1}$.

Furthermore, preferably, $A^{i2}$ is substituted with at least one substituent $S^{i1}$.

When the substituent $S^{i1}$ is a plurality of units, the units may be identical to or different from one another.

In $A^{i1}$, the replacement position of the substituent $S^{i1}$ is preferably one of those shown in formulae ($A^{i1}$-SP-1) and ($A^{i1}$-SP-2) below.

[Chem. 5]

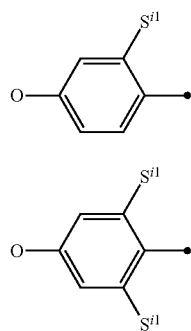

($A^{i1}$-SP-1)

($A^{i1}$-SP-2)

In formulae ($A^{i1}$-SP-1) and ($A^{i1}$-SP-2), the white dot represents a bond to $Z^{i1}$, and the black dot represents a bond to $Z^{i2}$ or an isothiocyanate group (—NCS).

In $A^{i2}$, the replacement position of the substituent $S^{i1}$ is preferably one of those shown in formulae ($A^{i2}$-SP-1) and ($A^{i2}$-SP-2) below.

[Chem. 6]

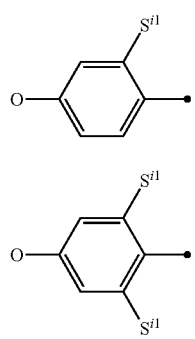

($A^{i2}$-SP-1)

($A^{i2}$-SP-2)

In formulae ($A^{i2}$-SP-1) and ($A^{i2}$-SP-2), the white dot represents a bond to $Z^{i2}$, and the black dot represents a bond to $Z^{i2}$ or an isothiocyanate group (—NCS).

More specifically, it is preferable that $A^{i1}$ represent one of those shown in formulae ($A^{i1}$-1) to ($A^{i1}$-4) below.

[Chem. 7]

($A^{i1}$-1)

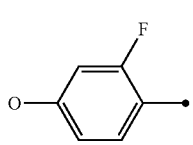

($A^{i1}$-2)

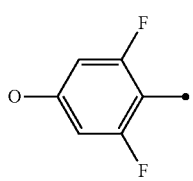

($A^{i1}$-3)

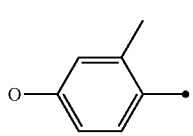

($A^{i1}$-4)

In formulae ($A^{i1}$-1) and ($A^{i1}$-4), the white dot represents a bond to $Z^{i1}$, and the black dot represents a bond to $Z^{i2}$ or an isothiocyanate group (—NCS).

More specifically, it is preferable that $A^{i2}$ represent one of those shown in formulae ($A^{i2}$-1) to ($A^{i2}$-3) below.

[Chem. 8]

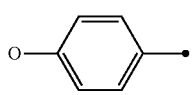

($A^{i2}$-1)

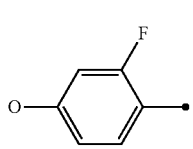

($A^{i2}$-2)

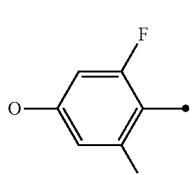

($A^{i2}$-3)

In formulae ($A^{i2}$-1) and ($A^{i2}$-3), the white dot represents a bond to $Z^{i2}$, and the black dot represents a bond to $Z^{i2}$ or an isothiocyanate group (—NCS).

In general formula (i), $L^{i1}$ and $L^{i2}$ each independently represent a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms.

The alkyl group having 1 to 20 carbon atoms is a linear, branched, or cyclic alkyl group and is preferably a linear alkyl group.

The number of carbon atoms of the alkyl group having 1 to 20 carbon atoms is preferably 2 to 10 or 2 to 6.

In the alkyl group, one or more —CH$_2$— groups are each independently optionally substituted with —O—, —S—, —CO—, and/or —CS—.

In the alkyl group, one or more —CH$_2$—CH$_2$— groups are each independently optionally substituted with —CH=CH—, —CF=CF—, —C≡C—, —CO—O—, —O—CO—, —CO—S—, —S—CO—, —CO—NH—, and/or —NH—CO—.

In the alkyl group, one or more —CH$_2$—CH$_2$—CH$_2$— groups are optionally substituted with —O—CO—O—.

In the alkyl group, one or more —CH$_2$—CH$_2$—CH$_2$—CH$_2$— groups are each independently optionally substituted with —CH=CH—CO—O—, —CH=CH—O—CO—, —CO—O—CH=CH—, and/or —O—CO—CH=CH—.

In the alkyl group, one or more hydrogen atoms are each independently optionally substituted with a halogen atom.

The halogen atom may be a fluorine atom, a chlorine atom, or a bromine atom.

Note that in instances where the alkyl group is substituted with a specific substituent, oxygen atoms are not directly bonded to each other.

Furthermore, from the standpoint of a stability of the compound, it is preferable that sulfur atoms not be directly bonded to each other and/or that an oxygen atom and a sulfur atom not be directly bonded to each other.

For example, in instances where one —CH$_2$— group in the alkyl group is substituted with —O—, $L^{i1}$ and $L^{i2}$ can represent an alkoxy group having 1 to 19 carbon atoms. The alkoxy group is a linear, branched, or cyclic alkoxy group and is preferably a linear alkoxy group.

The number of carbon atoms of the alkoxy group is preferably 2 to 10 or 2 to 6.

In instances where one —CH$_2$— group in the alkyl group is substituted with —S—, $L^{i1}$ and $L^{i2}$ can represent a thioalkoxy group (alkylthio group or alkylsulfanyl group) having 1 to 19 carbon atoms.

The thioalkoxy group is a linear, branched, or cyclic thioalkoxy group and is preferably a linear thioalkoxy group.

The number of carbon atoms of the thioalkoxy group is preferably 2 to 10 or 2 to 6.

In instances where one or more —CH$_2$—CH$_2$— groups in the alkyl group are substituted with —CH=CH—, $L^{i1}$ and $L^{i2}$ can represent an alkenyl group having 2 to 20 carbon atoms.

The alkenyl group is a linear, branched, or cyclic alkenyl group and is preferably a linear alkenyl group.

The number of carbon atoms of the alkenyl group is preferably 2 to 10 or 2 to 6.

In instances where one or more —CH$_2$—CH$_2$— groups in the alkyl group are substituted with —C≡C—, $L^{i1}$ and $L^{i2}$ can represent an alkynyl group having 2 to 20 carbon atoms.

The alkynyl group is a linear, branched, or cyclic alkynyl group and is preferably a linear alkynyl group.

The number of carbon atoms of the alkynyl group is preferably 2 to 10 or 2 to 6.

In instances where, in the alkyl group, one —CH$_2$— group is substituted with —O—, and one or more —CH$_2$—CH$_2$— groups are substituted with —CH=CH—, $L^{i1}$ and $L^{i2}$ can represent an alkenyloxy group having 2 to 19 carbon atoms.

The alkenyloxy group is a linear, branched, or cyclic alkenyloxy group and is preferably a linear alkenyloxy group.

The number of carbon atoms of the alkenyloxy group is preferably 2 to 10 or 2 to 6.

In instances where one or more hydrogen atoms in the alkyl group are substituted with a halogen atom, $L^{i1}$ and $L^{i2}$ can represent a halogenated alkyl group having 1 to 20 carbon atoms.

The halogenated alkyl group is a linear, branched, or cyclic halogenated alkyl group and is preferably a linear halogenated alkyl group.

The number of carbon atoms of the halogenated alkyl group is preferably 2 to 10 or 2 to 6.

In instances where, in the alkyl group, one —CH$_2$— group is substituted with —O—, and one or more hydrogen atoms in the alkyl group are substituted with a halogen atom, $L^{i1}$ and $L^{i2}$ can represent a halogenated alkoxy group having 1 to 19 carbon atoms.

The halogenated alkoxy group is a linear, branched, or cyclic halogenated alkoxy group and is preferably a linear halogenated alkoxy group.

The number of carbon atoms of the halogenated alkoxy group is preferably 2 to 10 or 2 to 6.

Specific examples of the alkyl group (which may be substituted) having 1 to 20 carbon atoms of $L^{i1}$ and $L^{i2}$ include groups represented by formulae ($L^{i1/2}$-1) to ($L^{i1/2}$-36).

[Chem. 9]

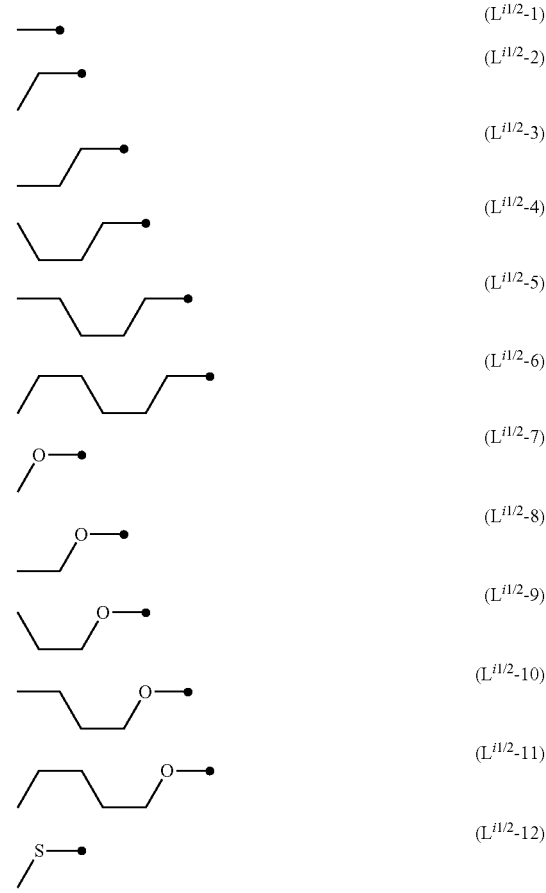

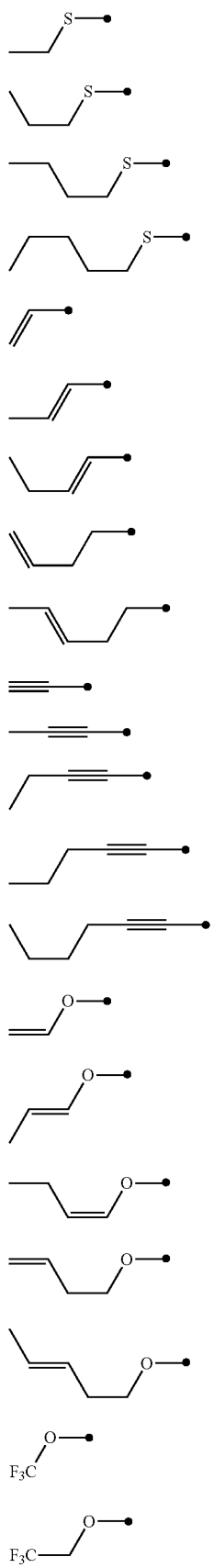
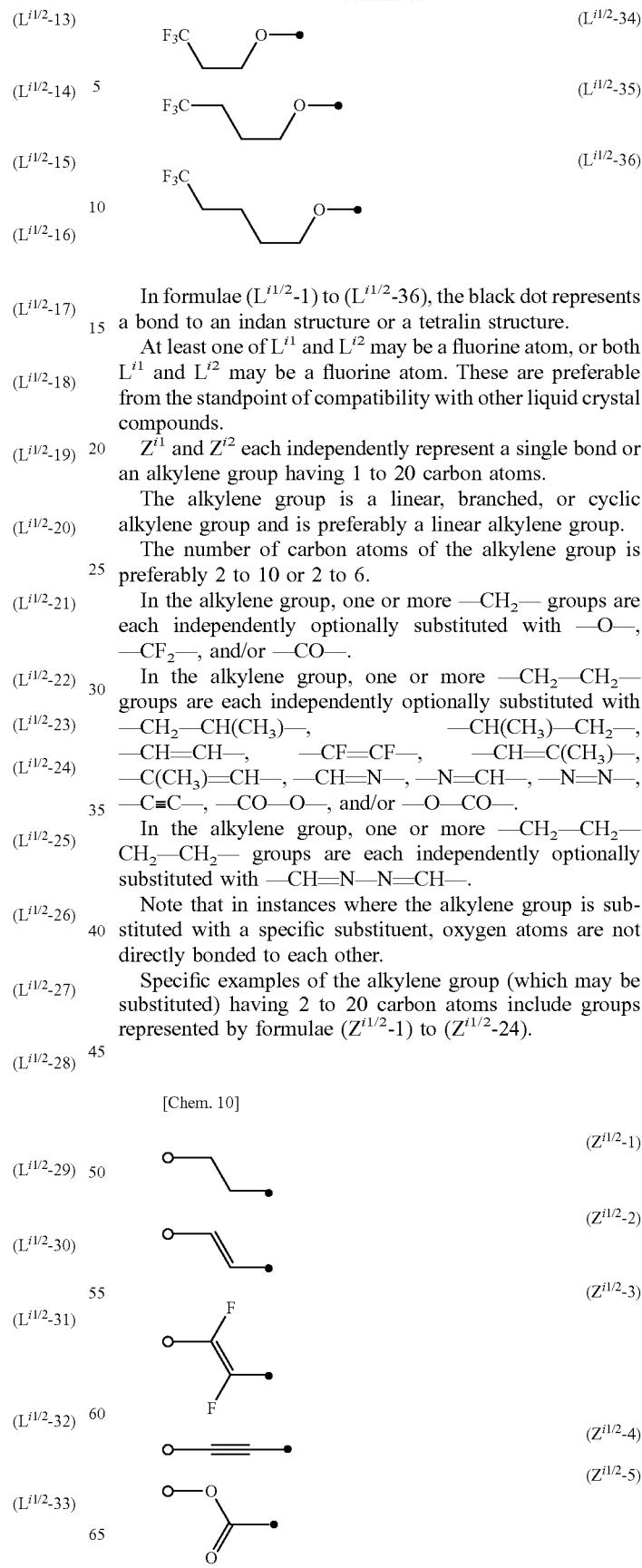

In formulae ($L^{i1/2}$-1) to ($L^{i1/2}$-36), the black dot represents a bond to an indan structure or a tetralin structure.

At least one of $L^{i1}$ and $L^{i2}$ may be a fluorine atom, or both $L^{i1}$ and $L^{i2}$ may be a fluorine atom. These are preferable from the standpoint of compatibility with other liquid crystal compounds.

$Z^{i1}$ and $Z^{i2}$ each independently represent a single bond or an alkylene group having 1 to 20 carbon atoms.

The alkylene group is a linear, branched, or cyclic alkylene group and is preferably a linear alkylene group.

The number of carbon atoms of the alkylene group is preferably 2 to 10 or 2 to 6.

In the alkylene group, one or more —$CH_2$— groups are each independently optionally substituted with —O—, —$CF_2$—, and/or —CO—.

In the alkylene group, one or more —$CH_2$—$CH_2$— groups are each independently optionally substituted with —$CH_2$—CH($CH_3$)—, —CH($CH_3$)—$CH_2$—, —CH═CH—, —CF═CF—, —CH═C($CH_3$)—, —C($CH_3$)═CH—, —CH═N—, —N═CH—, —N═N—, —C≡C—, —CO—O—, and/or —O—CO—.

In the alkylene group, one or more —$CH_2$—$CH_2$—$CH_2$—$CH_2$— groups are each independently optionally substituted with —CH═N—N═CH—.

Note that in instances where the alkylene group is substituted with a specific substituent, oxygen atoms are not directly bonded to each other.

Specific examples of the alkylene group (which may be substituted) having 2 to 20 carbon atoms include groups represented by formulae ($Z^{i1/2}$-1) to ($Z^{i1/2}$-24).

[Chem. 10]

-continued

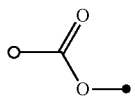 (Z$^{i1/2}$-6)

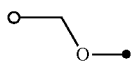 (Z$^{i1/2}$-7)

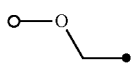 (Z$^{i1/2}$-8)

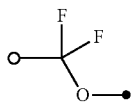 (Z$^{i1/2}$-9)

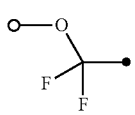 (Z$^{i1/2}$-10)

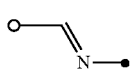 (Z$^{i1/2}$-11)

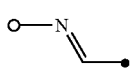 (Z$^{i1/2}$-12)

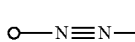 (Z$^{i1/2}$-13)

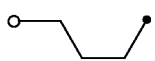 (Z$^{i1/2}$-14)

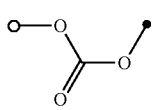 (Z$^{i1/2}$-15)

 (Z$^{i1/2}$-16)

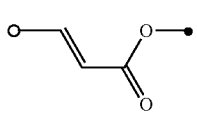 (Z$^{i1/2}$-17)

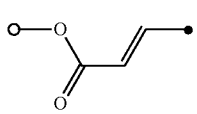 (Z$^{i1/2}$-18)

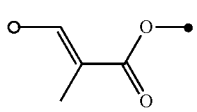 (Z$^{i1/2}$-19)

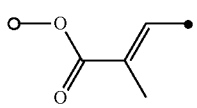 (Z$^{i1/2}$-20)

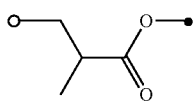 (Z$^{i1/2}$-21)

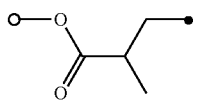 (Z$^{i1/2}$-22)

 (Z$^{i1/2}$-23)

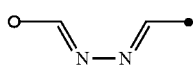 (Z$^{i1/2}$-24)

In formulae (Z$^{i1/2}$-1) to (Z$^{i1/2}$-24), the white dot represents an indan structure, a tetralin structure, or a bond to A$^{i1}$ or A$^{i2}$, and the black dot represents a bond to A$^{i1}$ or A$^{i2}$.

Preferably, at least one of Z$^{i1}$ and Z$^{i2}$ is as represented by formula (Z$^{i1/2}$-4) (—C≡C—). Preferably, both Z$^{i1}$ and Z$^{i2}$ are as represented by formula (Z$^{i1/2}$-4) (—C≡C—).

In general formula (i), mi1 represents an integer of 0 or 1.

From the standpoint of compatibility with other liquid crystal compounds, ease of synthesis, and availability of raw materials, it is preferable that m$^{i1}$ represent 1.

In general formula (i), n$^{i1}$ represents an integer of 0 to 3.

From the standpoint of compatibility with other liquid crystal compounds, ease of synthesis, and availability of raw materials, it is preferable that n$^{i1}$ be 1 or 2.

When A$^{i2}$ or Z$^{i2}$ is a plurality of units, the units may be identical to or different from one another.

Preferably, the compound represented by general formula (i) is any of the compounds represented by general formulae (i-1) to (i-3) below.

[Chem. 11]

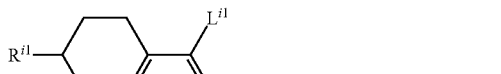 (i-1)

 (i-2)

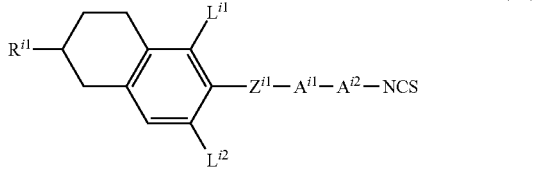 (i-3)

In general formulae (i-1) to (i-3), R$^{i1}$, A$^{i1}$, A$^{i2}$, Z$^{i1}$, L$^{i1}$, and L$^{i2}$ have the same meanings as R$^{i1}$, A$^{i1}$, A$^{i2}$, Z$^{i1}$, L$^{i1}$, and L$^{i2}$, respectively, of general formula (i), shown above, and preferred groups thereof are also the same.

Preferably, the compound represented by general formula (i-1) is any of the compounds represented by general formulae (i-1-a) to (i-1-f) below.

[Chem. 12]

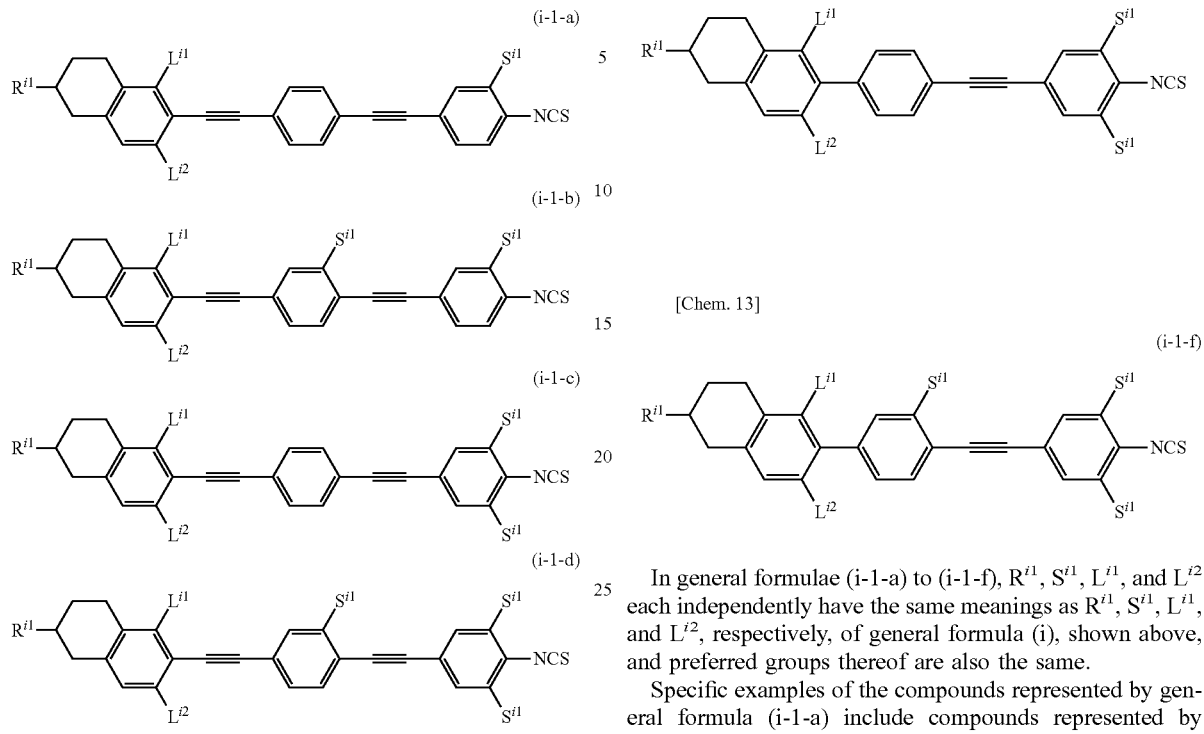

In general formulae (i-1-a) to (i-1-f), $R^{i1}$, $S^{i1}$, $L^{i1}$, and $L^{i2}$ each independently have the same meanings as $R^{i1}$, $S^{i1}$, $L^{i1}$, and $L^{i2}$, respectively, of general formula (i), shown above, and preferred groups thereof are also the same.

Specific examples of the compounds represented by general formula (i-1-a) include compounds represented by structural formulae (i-1-a.1) to (i-1-a.3) below.

[Chem. 14]

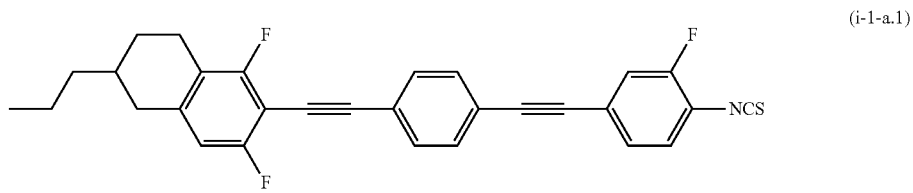

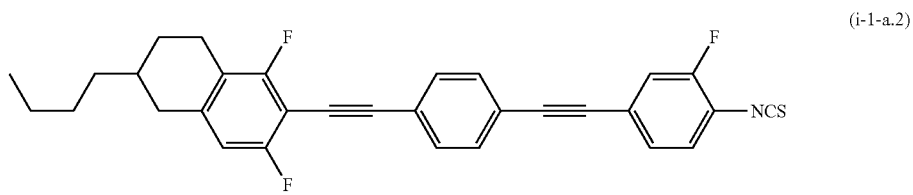

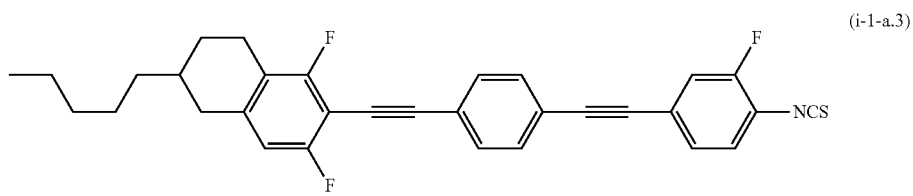

Specific examples of the compounds represented by general formula (i-1-b) include compounds represented by structural formulae (i-1-b.1) to (i-1-b.3) below.

[Chem. 15]

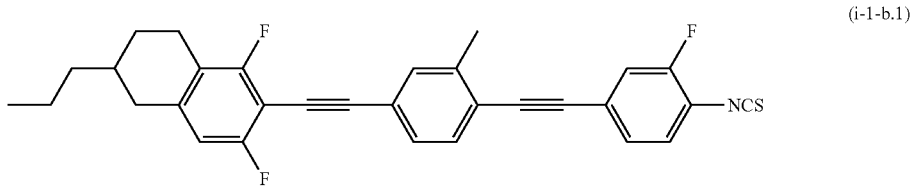
(i-1-b.1)

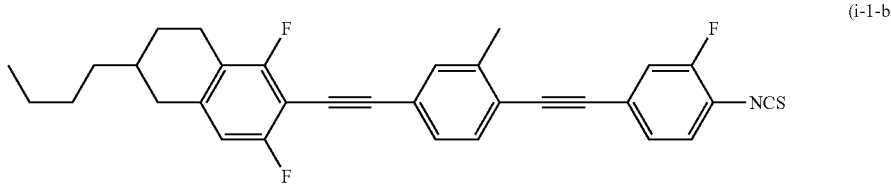
(i-1-b.2)

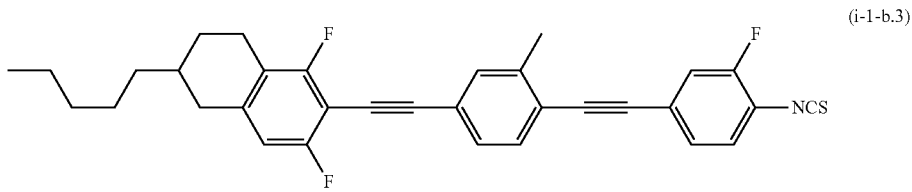
(i-1-b.3)

Specific examples of the compounds represented by general formula (i-1-c) include compounds represented by structural formulae (i-1-c.1) to (i-1-c.3) below.

[Chem. 16]

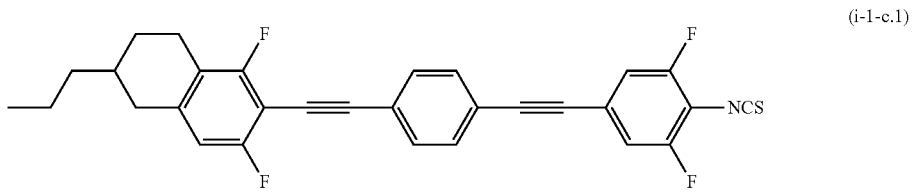
(i-1-c.1)

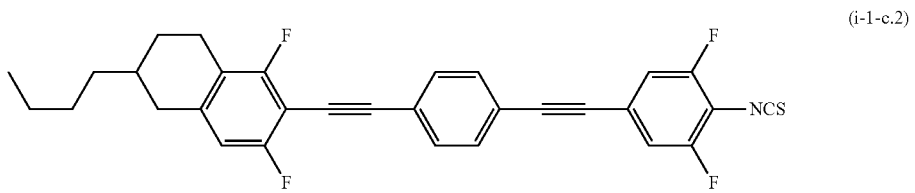
(i-1-c.2)

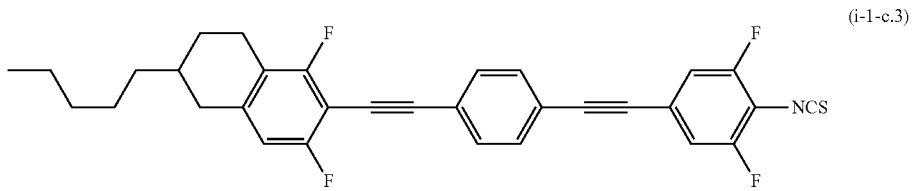
(i-1-c.3)

Specific examples of the compounds represented by general formula (i-1-d) include compounds represented by structural formulae (i-1-d.1) to (i-1-d.3) below.

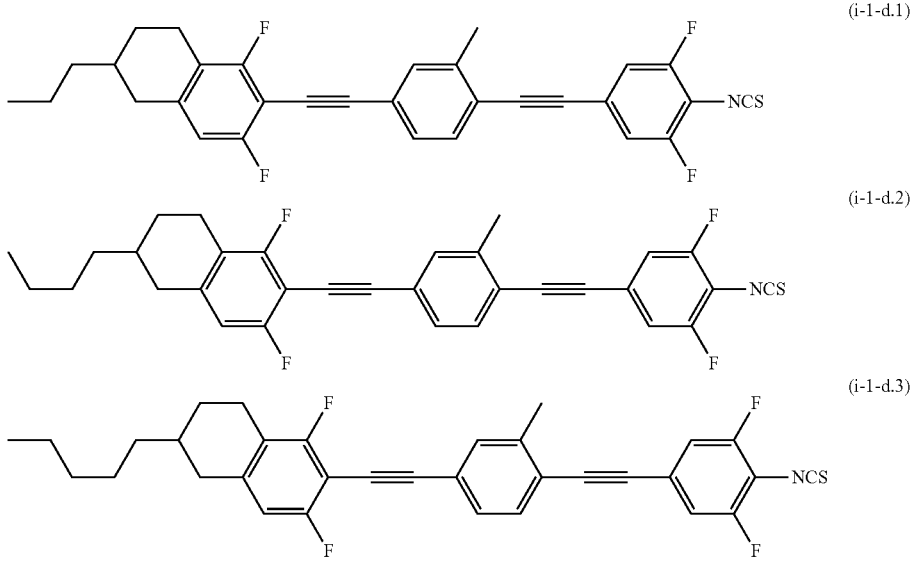

(i-1-d.1)

(i-1-d.2)

(i-1-d.3)

Specific examples of the compounds represented by general formula (i-1-e) include compounds represented by structural formulae (i-1-e.1) to (i-1-e.3) below.

[Chem. 18]

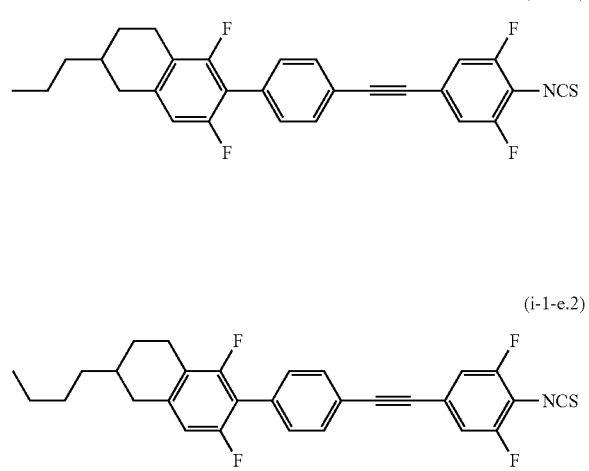

(i-1-e.1)

(i-1-e.2)

(i-1-e.3)

Specific examples of the compounds represented by general formula (i-1-f) include compounds represented by structural formulae (i-1-f.1) to (i-1-f.3) below.

[Chem. 19]

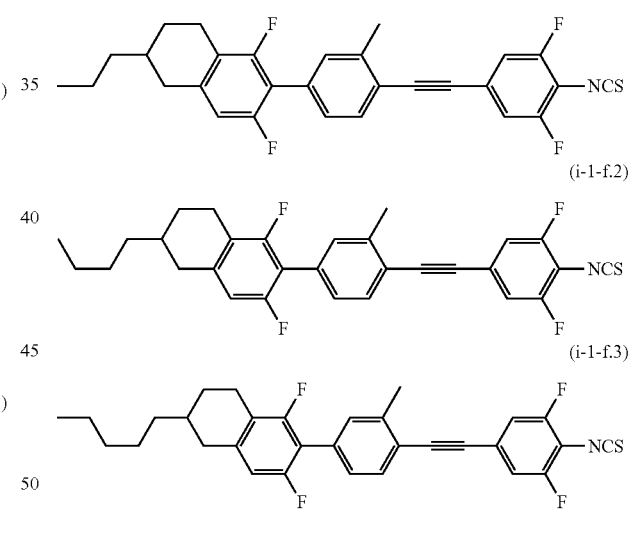

(i-1-f.1)

(i-1-f.2)

(i-1-f.3)

Preferably, the compound represented by general formula (i-2) is any of the compounds represented by general formulae (i-2-a) to (i-2-d) below.

[Chem. 20]

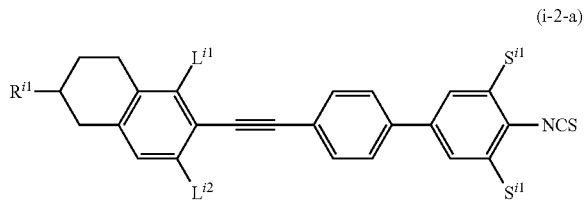

(i-2-a)

-continued

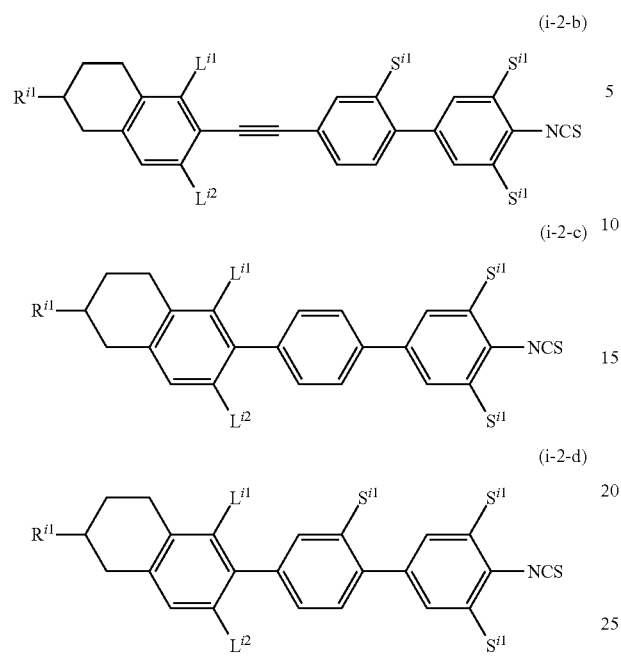

In general formulae (i-2-a) to (i-2-d), $R^{i1}$, $S^{i1}$, $L^{i1}$, and $L^{i2}$ each independently have the same meanings as $R^{i1}$, $S^{i1}$, $L^{i1}$, and $L^{i2}$, respectively, of general formula (i), shown above, and preferred groups thereof are also the same.

Specific examples of the compounds represented by general formula (i-2-a) include compounds represented by structural formulae (i-2-a.1) to (i-2-a.3) below.

[Chem. 21]

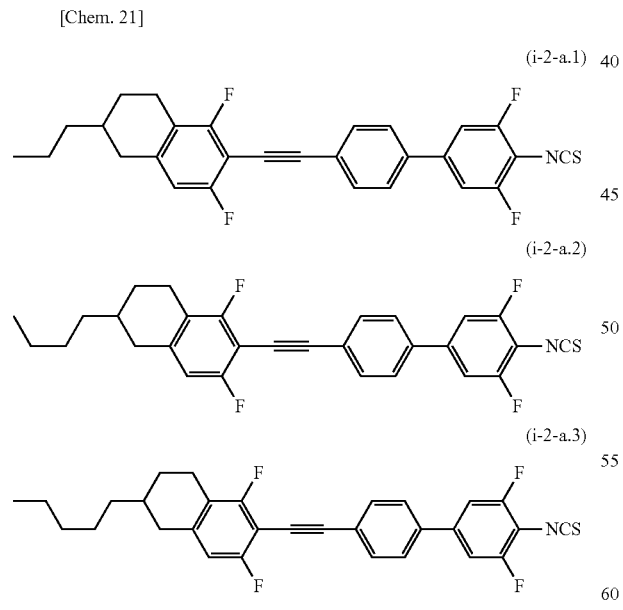

Specific examples of the compounds represented by general formula (i-2-b) include compounds represented by structural formulae (i-2-b.1) to (i-2-b.3) below.

[Chem. 22]

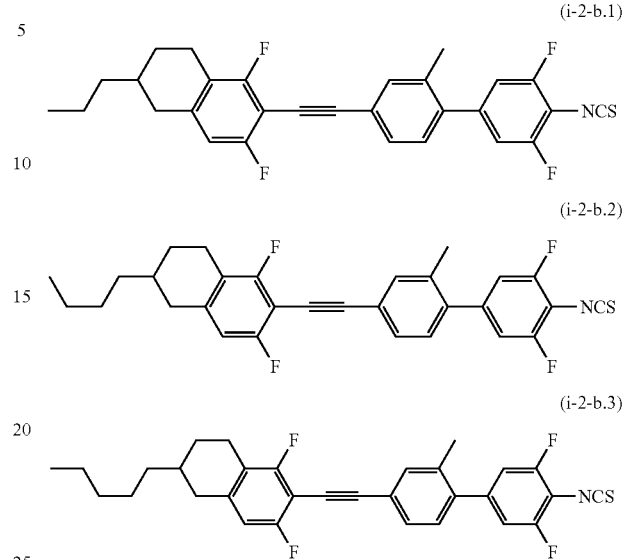

Specific examples of the compounds represented by general formula (i-2-c) include compounds represented by structural formulae (i-2-c.1) to (i-2-c.3) below.

[Chem. 23]

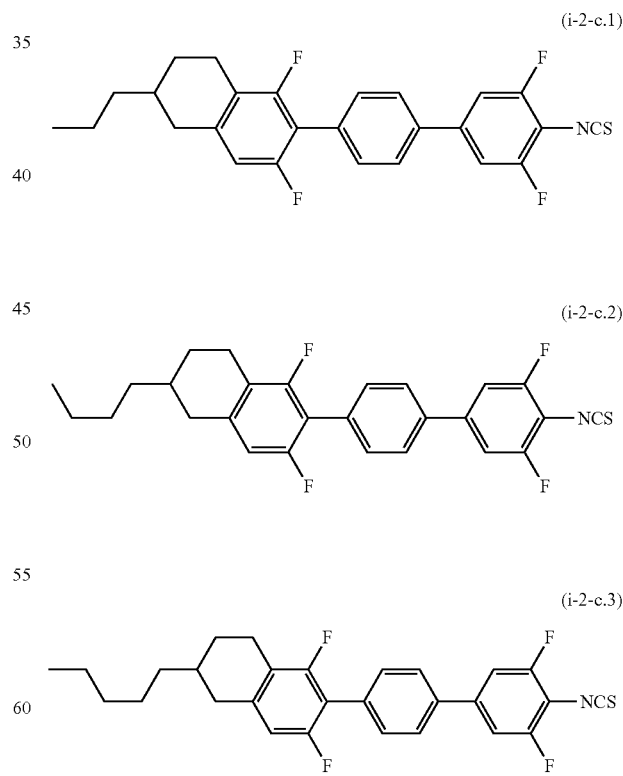

Specific examples of the compounds represented by general formula (i-2-d) include compounds represented by structural formulae (i-2-d.1) to (i-2-d.3) below.

[Chem. 24]

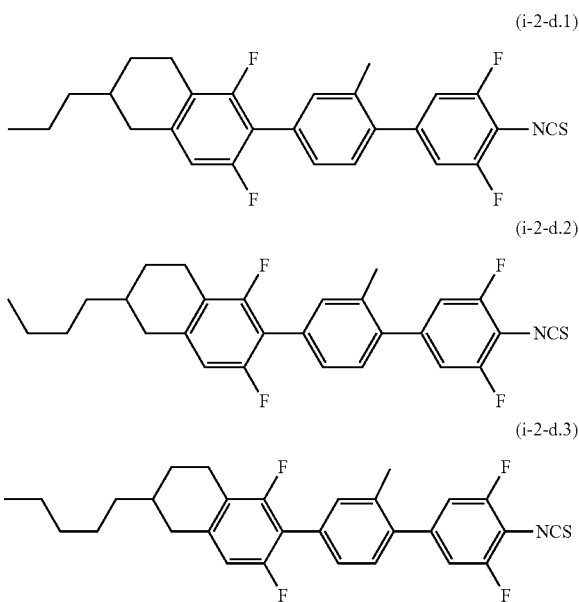

(i-2-d.1)
(i-2-d.2)
(i-2-d.3)

Preferably, the compound represented by general formula (i-3) is any of the compounds represented by general formulae (i-3-a) to (i-3-b) below.

[Chem. 25]

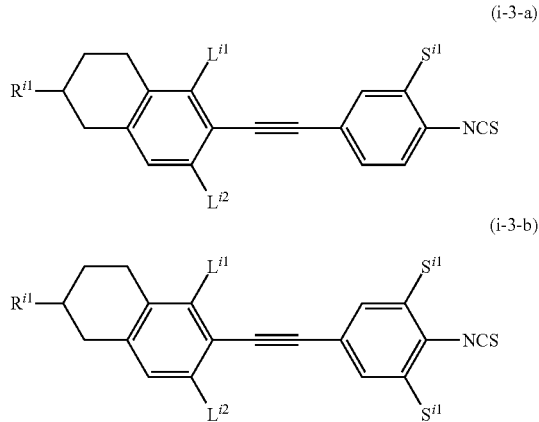

(i-3-a)
(i-3-b)

Specific examples of the compounds represented by general formula (i-3-a) include compounds represented by structural formulae (i-3-a.1) to (i-3-a.3) below.

[Chem. 26]

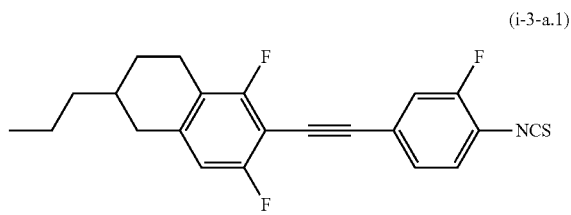

(i-3-a.1)

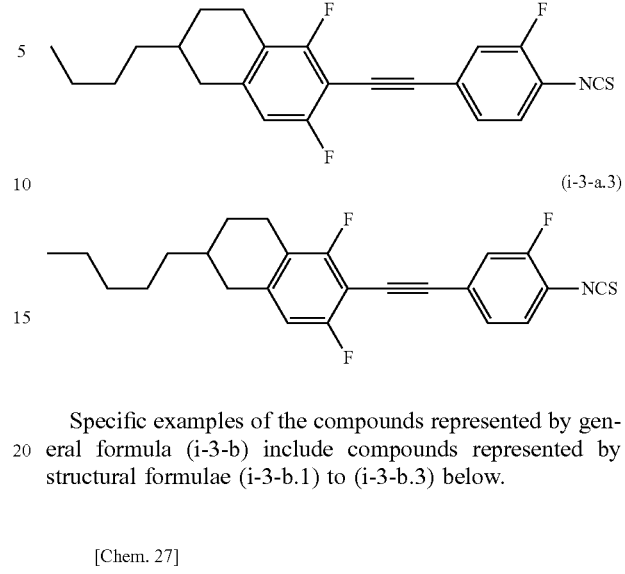

(i-3-a.2)
(i-3-a.3)

Specific examples of the compounds represented by general formula (i-3-b) include compounds represented by structural formulae (i-3-b.1) to (i-3-b.3) below.

[Chem. 27]

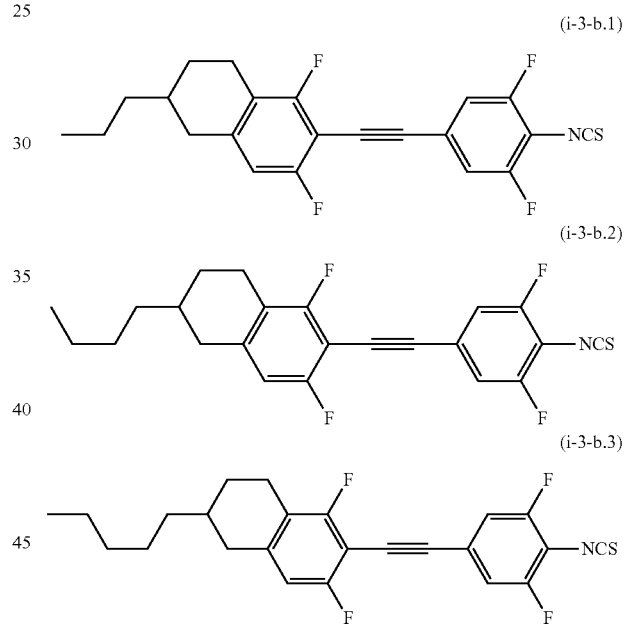

(i-3-b.1)
(i-3-b.2)
(i-3-b.3)

Regarding the compounds represented by general formula (i), general formulae (i-1) to (i-3), general formulae (i-1-a) to (i-1-f), general formulae (i-2-a) to (i-2-d), general formulae (i-3-a) and (i-3-b), structural formulae (i-1-a.1) to (i-1-a.3), structural formulae (i-1-b.1) to (i-1-b.3), structural formulae (i-1-c.1) to (i-1-c.3), structural formulae (i-1-d.1) to (i-1-d.3), structural formulae (i-1-e.1) to (i-1-e.3), structural formulae (i-1-f.1) to (i-1-f.3), structural formulae (i-2-a.1) to (i-2-a.3), structural formulae (i-2-b.1) to (i-2-b.3), structural formulae (i-2-c.1) to (i-2-c.3), structural formulae (i-2-d.1) to (i-2-d.3), structural formulae (i-3-a.1) to (i-3-a.3), or structural formulae (i-3-b.1) to (i-3-b.3), one or more of the compounds is used in the liquid crystal composition. Preferably, one to five, one to four, one to three, one or two, or one of the compounds is used.

Regarding the compounds represented by general formula (i), general formulae (i-1) to (i-3), general formulae (i-1-a)

to (i-1-f), general formulae (i-2-a) to (i-2-d), general formulae (i-3-a) and (i-3-b), structural formulae (i-1-a.1) to (i-1-a.3), structural formulae (i-1-b.1) to (i-1-b.3), structural formulae (i-1-c.1) to (i-1-c.3), structural formulae (i-1-d.1) to (i-1-d.3), structural formulae (i-1-e.1) to (i-1-e.3), structural formulae (i-1-f.1) to (i-1-f.3), structural formulae (i-2-a.1) to (i-2-a.3), structural formulae (i-2-b.1) to (i-2-b.3), structural formulae (i-2-c.1) to (i-2-c.3), structural formulae (i-2-d.1) to (i-2-d.3), structural formulae (i-3-a.1) to (i-3-a.3), or structural formulae (i-3-b.1) to (i-3-b.3), the total content of one or more of the compounds in the liquid crystal composition based on the total mass thereof is preferably 0.5 to 100 mass %, 1 to 50 mass %, or 1.5 to 25 mass %.

Regarding the compounds represented by general formula (i), general formulae (i-1) to (i-3), general formulae (i-1-a) to (i-1-f), general formulae (i-2-a) to (i-2-d), general formulae (i-3-a) and (i-3-b), structural formulae (i-1-a.1) to (i-1-a.3), structural formulae (i-1-b.1) to (i-1-b.3), structural formulae (i-1-c.1) to (i-1-c.3), structural formulae (i-1-d.1) to (i-1-d.3), structural formulae (i-1-e.1) to (i-1-e.3), structural formulae (i-1-f.1) to (i-1-f.3), structural formulae (i-2-a.1) to (i-2-a.3), structural formulae (i-2-b.1) to (i-2-b.3), structural formulae (i-2-c.1) to (i-2-c.3), structural formulae (i-2-d.1) to (i-2-d.3), structural formulae (i-3-a.1) to (i-3-a.3), or structural formulae (i-3-b.1) to (i-3-b.3), these compounds can be synthesized with a known synthesis method.

(Compounds Represented by General Formula (ii))

Preferably, the liquid crystal material of the present disclosure includes one or more of the compounds having an isothiocyanate group (—NCS) represented by general formula (ii) below.

[Chem. 28]

(ii)

In general formula (ii), $R^{ii1}$ represents an alkyl group having 1 to 20 carbon atoms.

The alkyl group is a linear, branched, or cyclic alkyl group and is preferably a linear alkyl group.

The number of carbon atoms of the alkyl group is preferably 2 to 10 or 2 to 6.

In the alkyl group, one or more —CH$_2$— groups are each independently optionally substituted with —O—, —S—, —CO—, and/or —CS—.

In the alkyl group, one or more —CH$_2$—CH$_2$— groups are optionally substituted with —CH=CH—, —CO—O—, —O—CO—, —CO—S—, —S—CO—, —CO—NH—, —NH—CO—, —CH=CH—, —CF=CF—, and/or —C≡C—.

In the alkyl group, one or more —CH$_2$—CH$_2$—CH$_2$— groups are optionally substituted with —O—CO—O—.

In the alkyl group, one or more hydrogen atoms are each independently optionally substituted with a halogen atom.

The halogen atom may be a fluorine atom, a chlorine atom, a bromine atom, or an iodine atom.

Note that in instances where the alkyl group is substituted with a specific substituent, oxygen atoms are not directly bonded to each other.

Furthermore, from the standpoint of a stability of the compound, it is preferable that sulfur atoms not be directly bonded to each other and/or that an oxygen atom and a sulfur atom not be directly bonded to each other.

For example, in instances where one —CH$_2$— group in the alkyl group is substituted with —O—, $R^{ii1}$ can represent an alkoxy group having 1 to 19 carbon atoms.

The alkoxy group is a linear, branched, or cyclic alkoxy group and is preferably a linear alkoxy group.

The number of carbon atoms of the alkoxy group is preferably 2 to 10 or 2 to 6.

In instances where one —CH$_2$— group in the alkyl group is substituted with —S—, $R^{ii1}$ can represent a thioalkoxy group (alkylthio group or alkylsulfanyl group) having 1 to 19 carbon atoms.

The thioalkoxy group is a linear, branched, or cyclic thioalkoxy group and is preferably a linear thioalkoxy group.

The number of carbon atoms of the thioalkoxy group is preferably 2 to 10 or 2 to 6.

In instances where one or more —CH$_2$—CH$_2$— groups in the alkyl group are substituted with —CH=CH—, $R^{ii1}$ can represent an alkenyl group having 2 to 20 carbon atoms.

The alkenyl group is a linear, branched, or cyclic alkenyl group and is preferably a linear alkenyl group.

The number of carbon atoms of the alkenyl group is preferably 2 to 10 or 2 to 6.

In instances where one or more —CH$_2$—CH$_2$— groups in the alkyl group are substituted with —C≡C—, $R^{ii1}$ can represent an alkynyl group having 2 to 20 carbon atoms.

The alkynyl group is a linear, branched, or cyclic alkynyl group and is preferably a linear alkynyl group.

The number of carbon atoms of the alkynyl group is preferably 2 to 10 or 2 to 6.

In instances where, in the alkyl group, one —CH$_2$— group is substituted with —O—, and one or more —CH$_2$—CH$_2$— groups are substituted with —CH=CH—, $R^{ii1}$ can represent an alkenyloxy group having 2 to 19 carbon atoms.

The alkenyloxy group is a linear, branched, or cyclic alkenyloxy group and is preferably a linear alkenyloxy group.

The number of carbon atoms of the alkenyloxy group is preferably 2 to 10 or 2 to 6.

In instances where one or more hydrogen atoms in the alkyl group are substituted with a halogen atom, $R^{ii1}$ can represent a halogenated alkyl group having 1 to 20 carbon atoms.

The halogenated alkyl group is a linear, branched, or cyclic halogenated alkyl group and is preferably a linear halogenated alkyl group.

The number of carbon atoms of the halogenated alkyl group is preferably 2 to 10 or 2 to 6.

In instances where, in the alkyl group, one —CH$_2$— group is substituted with —O—, and one or more hydrogen atoms in the alkyl group are substituted with a halogen atom, $R^{ii1}$ can represent a halogenated alkoxy group having 1 to 19 carbon atoms.

The halogenated alkoxy group is a linear, branched, or cyclic halogenated alkoxy group and is preferably a linear halogenated alkoxy group.

The number of carbon atoms of the halogenated alkoxy group is preferably 2 to 10 or 2 to 6.

Specific examples of the alkyl group (which may be substituted) having 1 to 20 carbon atoms of $R^{ii1}$ include groups represented by formulae ($R^{ii1}$-1) to ($R^{ii1}$-36).

[Chem. 29]

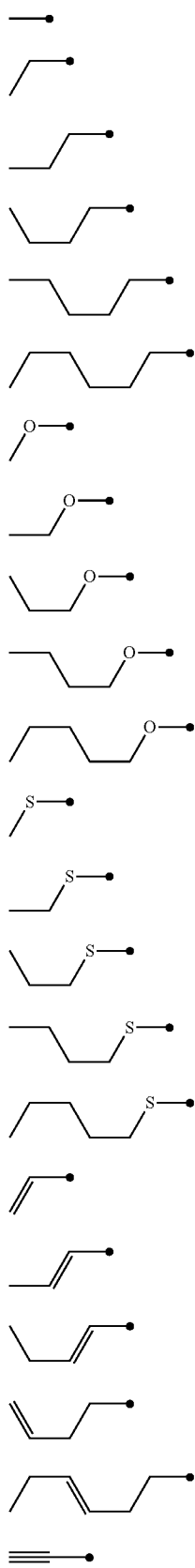
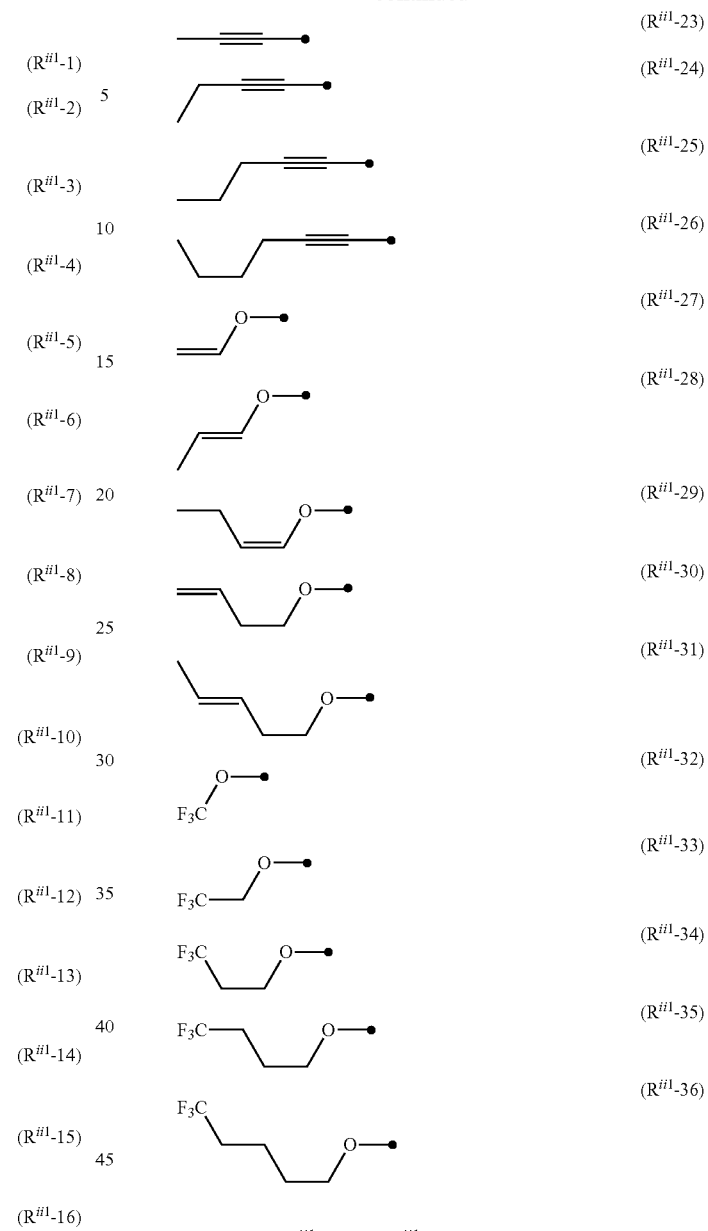

In formulae ($R^{ii1}$-1) to ($R^{ii1}$-36), the black dot represents a bond to $A^{ii1}$.

In instances where the ring structure to which $R^{ii1}$ is attached is a phenyl group (aromatic group), $R^{ii1}$ is preferably a linear alkyl group having 1 to 5 carbon atoms, a linear alkoxy group having 1 to 4 carbon atoms, or an alkenyl group having 4 or 5 carbon atoms. In instances where the ring structure to which $R^{ii1}$ is attached is a saturated ring structure, such as a cyclohexane, a pyran, or a dioxane, $R^{ii1}$ is preferably a linear alkyl group having 1 to 5 carbon atoms, a linear alkoxy group having 1 to 4 carbon atoms, or a linear alkenyl group having 2 to 5 carbon atoms.

Furthermore, in terms of stabilizing the nematic phase, it is preferable that the total number of carbon atoms and, if any, oxygen atoms in $R^{ii1}$ is 5 or less and that $R^{ii1}$ be linear.

From the standpoint of compatibility with other liquid crystal compounds, it is preferable that $R^{ii1}$ be a linear alkyl group having 2 to 8 carbon atoms or a linear alkoxy group having 2 to 8 carbon atoms.

In general formula (ii), $A^{ii1}$ and $A^{ii2}$ each independently represent a group selected from the group consisting of group (a), group (b), group (c), and group (d), described below:
- (a) a 1,4-cyclohexylene group (in this group, one —CH$_2$— group or two or more non-adjacent —CH$_2$— groups are optionally substituted with —O— and/or —S—);
- (b) a 1,4-phenylene group (in this group, one —CH= group or two or more non-adjacent —CH= groups are optionally substituted with —N=);
- (c) a naphthalene-2,6-diyl group or a decahydronaphthalene-2,6-diyl group (in the naphthalene-2,6-diyl group, one —CH= group or two or more non-adjacent —CH= groups are optionally substituted with —N=) and;
- (d) a thiophen-2,5-diyl group, a benzothiophene-2,5-diyl group, a benzothiophene-2,6-diyl group, a dibenzothiophene-3,7-diyl group, a dibenzothiophene-2,6-diyl group, or a thieno[3,2-b]thiophene-2,5-diyl group (in these groups, one —CH= group or two or more non-adjacent —CH= groups are optionally substituted with —N=).

In $A^{ii1}$ and $A^{ii2}$, one or more hydrogen atoms are each independently optionally substituted with a substituent $S^{ii1}$.

The substituent $S^{ii1}$ is a halogen atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms.

The halogen atom may be a fluorine atom, a chlorine atom, a bromine atom, or an iodine atom.

The alkyl group having 1 to 20 carbon atoms is a linear, branched, or cyclic alkyl group and is preferably a linear alkyl group.

The number of carbon atoms of the alkyl group having 1 to 20 carbon atoms is preferably 2 to 10 or 2 to 6.

In the alkyl group, one or more —CH$_2$— groups are each independently optionally substituted with —O—, —S—, —CO—, and/or —CS—.

In the alkyl group, one or more —CH$_2$—CH$_2$— groups are each independently optionally substituted with —CO—O—, —O—CO—, —CO—S—, —S—CO—, —CO—NH—, —NH—CO—, —CH=CH—, —CF=CF—, and/or —C≡C—.

In the alkyl group, one or more —CH$_2$—CH$_2$—CH$_2$— groups are each independently optionally substituted with —O—CO—O—.

In the alkyl group, one or more —CH$_2$—CH$_2$—CH$_2$—CH$_2$— groups are each independently optionally substituted with —CH=CH—CO—O—, —CH=CH—O—CO—, —CO—O—CH=CH—, or —O—CO—CH=CH—.

In the alkyl group, one or more hydrogen atoms are each independently optionally substituted with a halogen atom.

The halogen atom may be a fluorine atom, a chlorine atom, a bromine atom, or an iodine atom.

Note that in instances where the alkyl group is substituted with a specific substituent, oxygen atoms are not directly bonded to each other.

Furthermore, from the standpoint of a stability of the compound, it is preferable that sulfur atoms not be directly bonded to each other and/or that an oxygen atom and a sulfur atom not be directly bonded to each other.

Preferably, the substituent $S^{ii1}$ is a fluorine atom or a chlorine atom.

Furthermore, preferably, at least one $A^{ii1}$, or $A^{ii2}$ is substituted with at least one substituent $S^{ii1}$.

When the substituent $S^{ii1}$ is a plurality of units, the units may be identical to or different from one another.

In $A^{ii1}$, the replacement position of the substituent $S^{ii1}$ is preferably one of those shown in formulae ($A^{ii1}$-SP-1) to ($A^{ii1}$-SP-4) below.

[Chem. 30]

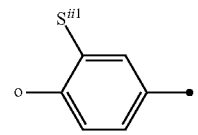

($A^{ii1}$-SP-1)

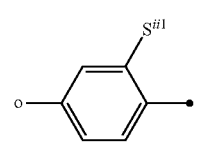

($A^{ii1}$-SP-2)

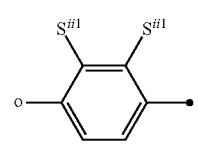

($A^{ii1}$-SP-3)

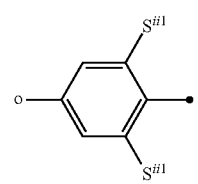

($A^{ii1}$-SP-4)

In formulae ($A^{ii1}$-SP-1) to ($A^{ii1}$-SP-4), the white dot represents a bond to $R^{ii1}$ or $Z^{ii1}$, and the black dot represents a bond to $Z^{ii1}$.

In $A^{ii2}$, the replacement position of the substituent $S^{ii1}$ is preferably one of those shown in formulae ($A^{ii2}$-SP-1) to ($A^{ii2}$-SP-7) below.

[Chem. 31]

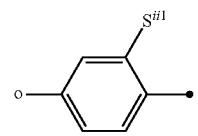

($A^{ii2}$-SP-1)

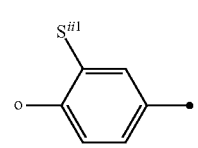

($A^{ii2}$-SP-2)

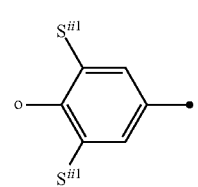

($A^{ii2}$-SP-3)

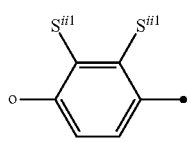 (A$^{ii2}$-SP-4)

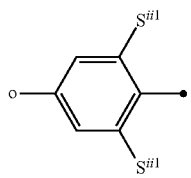 (A$^{ii2}$-SP-5)

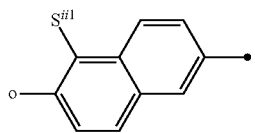 (A$^{ii2}$-SP-6)

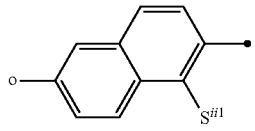 (A$^{ii2}$-SP-7)

In formulae (A$^{ii2}$-SP-1) to (A$^{ii2}$-SP-7), the white dot represents a bond to Z$^{ii1}$, and the black dot represents a bond to an isothiocyanate group (—NCS).

More specifically, it is preferable that A$^{ii1}$ represent one of those shown in formulae (A$^{ii1}$-1) to (A$^{ii1}$-6) below.

[Chem. 32]

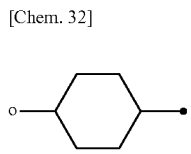 (A$^{iii1}$-1)

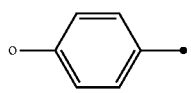 (A$^{iii1}$-2)

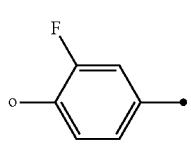 (A$^{iii1}$-3)

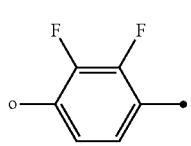 (A$^{iii1}$-4)

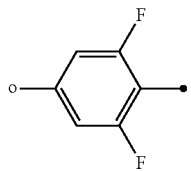 (A$^{iii1}$-5)

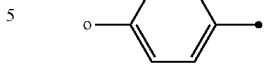 (A$^{iii1}$-6)

In formulae (A$^{ii1}$-1) to (A$^{ii1}$-6), the white dot represents a bond to R$^{ii1}$ or Z$^{ii1}$, and the black dot represents a bond to Z$^{ii1}$.

More specifically, it is preferable that A$^{ii2}$ represent one of those shown in formulae (A$^{ii2}$-1) to (A$^{ii2}$-5) below.

[Chem. 33]

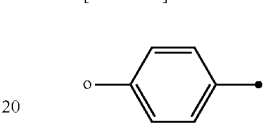 (A$^{ii2}$-1)

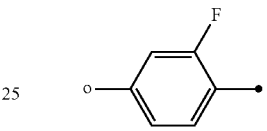 (A$^{ii2}$-2)

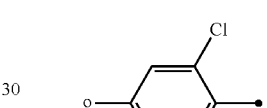 (A$^{ii2}$-3)

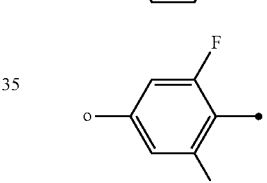 (A$^{ii2}$-4)

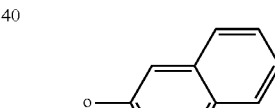 (A$^{ii2}$-5)

In formulae (A$^{ii2}$-1) and (A$^{ii2}$-5), the white dot represents a bond to Z$^{ii1}$, and the black dot represents a bond to an isothiocyanate group (—NCS).

In general formula (ii), Z$^{ii1}$ represents a single bond or an alkylene group having 1 to 20 carbon atoms.

In the alkylene group, one or more —CH$_2$— groups are each independently optionally substituted with —O—.

In the alkylene group, one or more —CH$_2$—CH$_2$— groups are each independently optionally substituted with —CH$_2$—CH(CH$_3$)—, —CH(CH$_3$)—CH$_2$—, —CH=CH—, —CF=CF—, —CH=C(CH$_3$)—, —C(CH$_3$)=CH—, —CH=N—, —N=CH—, —N=N—, —C≡C—, —CO—O—, and/or —O—CO—.

In the alkylene group, one or more —CH$_2$—CH$_2$—CH$_2$— groups are each independently optionally substituted with —O—CO—O—.

In the alkylene group, one or more —CH$_2$—CH$_2$—CH$_2$—CH$_2$— groups are each independently optionally substituted with —C(R$^{ia}$)=N—N=C(R$^{ib}$)—.

Note that in instances where an alkylene group having 1 to 10 carbon atoms is substituted with a specific substituent, oxygen atoms are not directly bonded to each other.

Furthermore, from the standpoint of a stability of the compound, it is preferable that sulfur atoms not be directly bonded to each other and/or that an oxygen atom and a sulfur atom not be directly bonded to each other.

$R^{ia}$ and $R^{ib}$ each independently represent a hydrogen atom, a halogen atom, or an alkyl group having 1 to 10 carbon atoms.

The halogen atom may be a fluorine atom, a chlorine atom, a bromine atom, or an iodine atom.

The alkyl group is a linear, branched, or cyclic alkyl group and is preferably a linear alkyl group.

The number of carbon atoms of the alkyl group is preferably 2 to 8 or 2 to 6.

In the alkyl group, one or more —$CH_2$— groups are each independently optionally substituted with —O—, —CO—, and/or —S—.

In the alkyl group, one or more —$CH_2$—$CH_2$— groups are optionally substituted with —CH=CH—, —CO—O—, —O—CO—, and/or —C≡C—.

Note that in instances where the alkyl group having 1 to 10 carbon atoms is substituted with a specific substituent, oxygen atoms are not directly bonded to each other.

Furthermore, from the standpoint of a stability of the compound, it is preferable that sulfur atoms not be directly bonded to each other and/or that an oxygen atom and a sulfur atom not be directly bonded to each other.

Specific examples of the alkylene group (which may be substituted) having 1 to 20 carbon atoms include groups represented by formulae ($Z^{ii1}$-1) to ($Z^{ii1}$-24)

[Chem. 34]

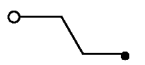
($Z^{ii2}$-1)

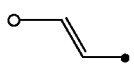
($Z^{ii2}$-2)

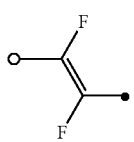
($Z^{ii2}$-3)

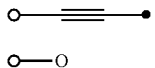
($Z^{ii2}$-4)

($Z^{ii2}$-5)

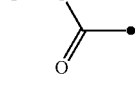
($Z^{ii2}$-6)

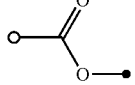
($Z^{ii2}$-7)

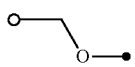
($Z^{ii2}$-8)

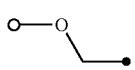
($Z^{ii2}$-9)

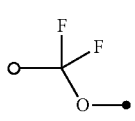

-continued

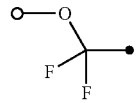
($Z^{ii2}$-10)

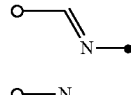
($Z^{ii2}$-11)

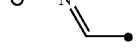
($Z^{ii2}$-12)

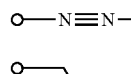
($Z^{ii2}$-13)

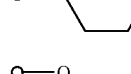
($Z^{ii2}$-14)

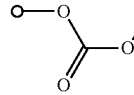
($Z^{ii2}$-15)

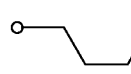
($Z^{ii2}$-16)

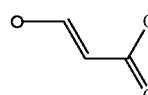
($Z^{ii2}$-17)

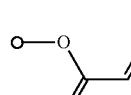
($Z^{ii2}$-18)

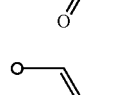
($Z^{ii2}$-19)

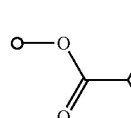
($Z^{ii2}$-20)

($Z^{ii2}$-21)

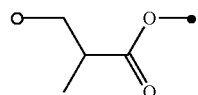
($Z^{ii2}$-22)

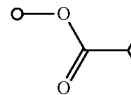
($Z^{ii2}$-23)

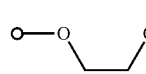
($Z^{ii2}$-24)

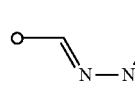

In formulae ($Z^{ii1}$-1) to ($Z^{ii1}$-24), the white dot represents a bond to $A^{ii1}$, and the black dot represents a bond to $A^{ii1}$ or $A^{ii2}$.

In general formula (ii), $n^{ii1}$ represents an integer of 1 to 4 and preferably represents an integer of 1 or 2.

When $n^{ii1}$ is 1, it is preferable that $Z^{ii1}$ represent a single bond or —C≡C—.

When $n^{ii1}$ is 2, it is preferable that at least one $Z^{ii1}$ represent —C≡C—.

In general formula (ii), when $A^{ii1}$ and $Z^{ii1}$ are each a plurality of units, the units may be identical to or different from one another.

Preferably, the compound represented by general formula (ii) is any of the compounds represented by general formulae (ii-1) to (ii-5) below.

[Chem. 35]

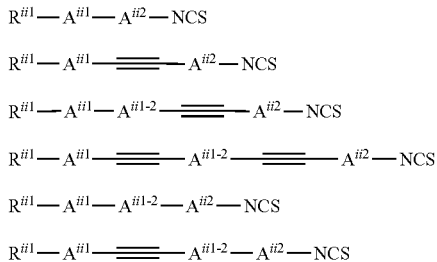

(ii-1)
(ii-2)
(ii-3)
(ii-4)
(ii-5)
(ii-6)

In general formulae (ii-1) to (ii-5), $R^{ii1}$, $A^{ii1}$, and $A^{ii2}$ have the same meaning as $R^{ii1}$, $A^{ii1}$, and $A^{ii2}$, respectively, of general formula (ii), shown above.

In general formulae (ii-3) to (ii-6), $A^{ii1-2}$ has the same definition as $A^{ii1}$ of general formula (ii), shown above.

Preferably, the compound represented by general formula (ii-1) is any of the compounds represented by general formula (ii-1-a) below.

[Chem. 36]

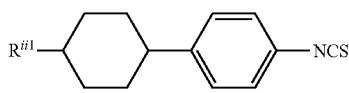

(ii-1-a)

In general formula (ii-1-a), $R^{ii1}$ each independently has the same meaning as $R^{ii1}$, respectively, of general formula (ii), shown above.

Specific examples of the compounds represented by general formula (ii-1-a) include compounds represented by structural formulae (ii-1-a.1) to (ii-1-a.4) below.

[Chem. 37]

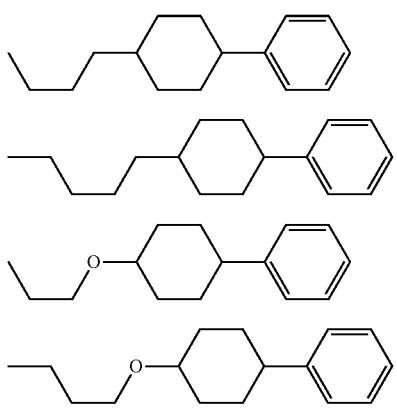

(ii-1-a.1)
(ii-1-a.2)
(ii-1-a.3)
(ii-1-a.4)

Preferably, the compound represented by general formula (ii-2) is any of the compounds represented by general formulae (ii-2-a) to (ii-2-c) below.

[Chem. 38]

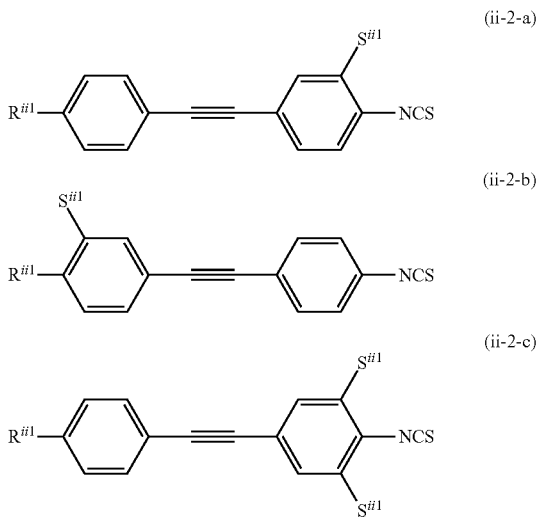

(ii-2-a)
(ii-2-b)
(ii-2-c)

In general formulae (ii-2-a) to (ii-2-c), $R^{ii1}$ and $S^{ii1}$ each independently have the same meaning as $R^{ii1}$ and $S^{ii1}$, respectively, of general formula (i), shown above.

Specific examples of the compounds represented by general formula (ii-2-a) include compounds represented by structural formulae (ii-2-a.1) to (ii-2-a.5) below.

[Chem. 39]

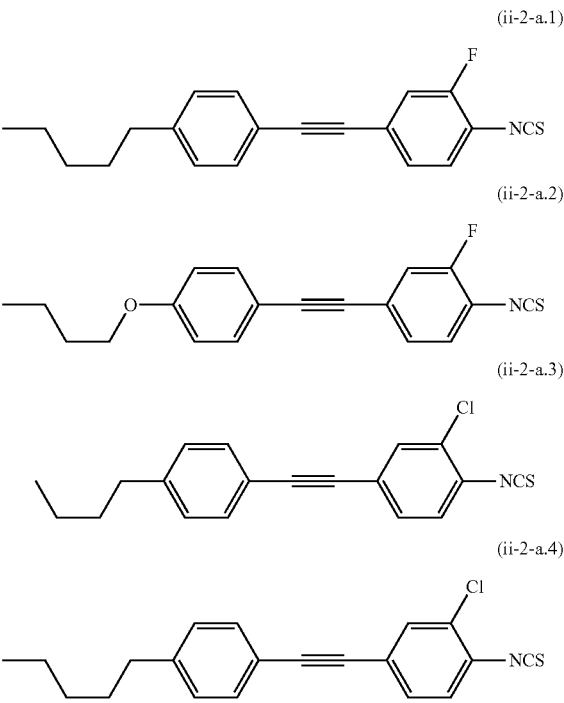

(ii-2-a.1)
(ii-2-a.2)
(ii-2-a.3)
(ii-2-a.4)

(ii-2-a.5)

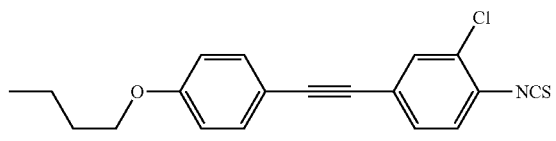

(ii-2-c.3)

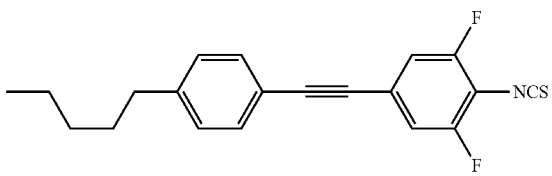

Specific examples of the compounds represented by general formula (ii-2-b) include compounds represented by structural formulae (ii-2-b.1) to (ii-2-b.3) below.

Preferably, the compound represented by general formula (ii-3) is any of the compounds represented by general formulae (ii-3-a) to (ii-3-d) below.

[Chem. 40]

(ii-2-b.1)

[Chem. 42]

(ii-3-a)

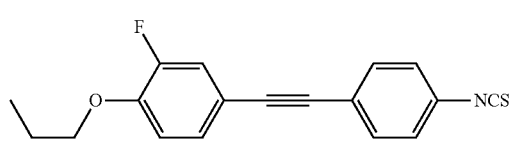

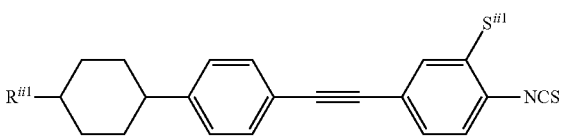

(ii-2-b.2)

(ii-3-b)

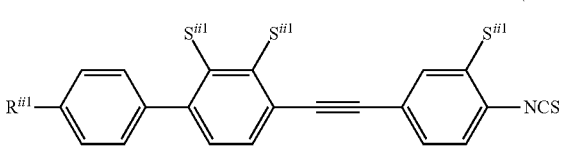

(ii-2-b.3)

(ii-3-c)

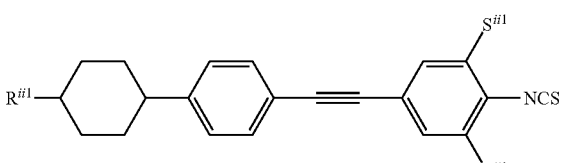

Specific examples of the compounds represented by general formula (ii-2-c) include compounds represented by structural formulae (ii-2-c.1) to (ii-2-c.3) below.

(ii-3-d)

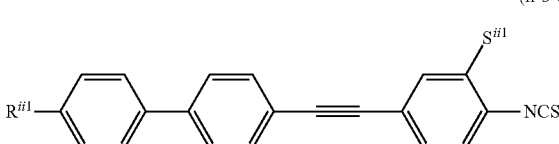

[Chem. 41]

(ii-2-c.1)

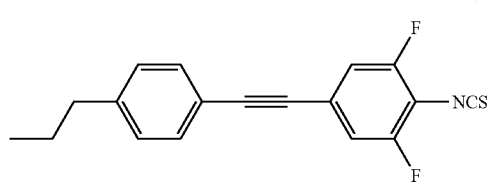

In general formulae (ii-3-a) to (ii-3-d), $R^{ii1}$ and $S^{ii1}$ each independently have the same meaning as $R^{ii1}$ and $S^{ii1}$, respectively, of general formula (ii), shown above.

Specific examples of the compounds represented by general formula (ii-3-a) include compounds represented by structural formulae (ii-3-a.1) to (ii-3-a.4) below.

(ii-2-c.2)

[Chem. 43]

(ii-3-a.1)

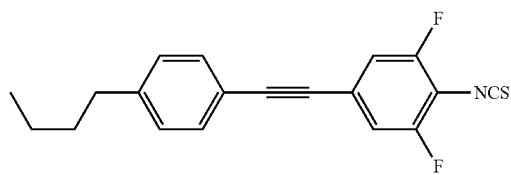

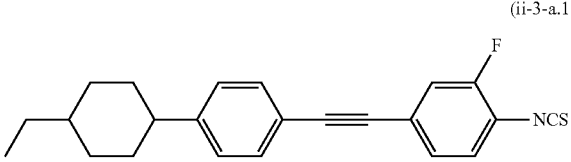

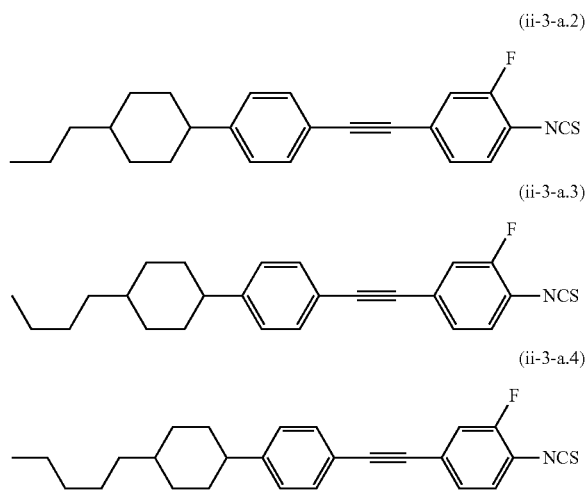

Specific examples of the compounds represented by general formula (ii-3-b) include compounds represented by structural formulae (ii-3-b.1) to (ii-3-b.3) below.

[Chem. 44]

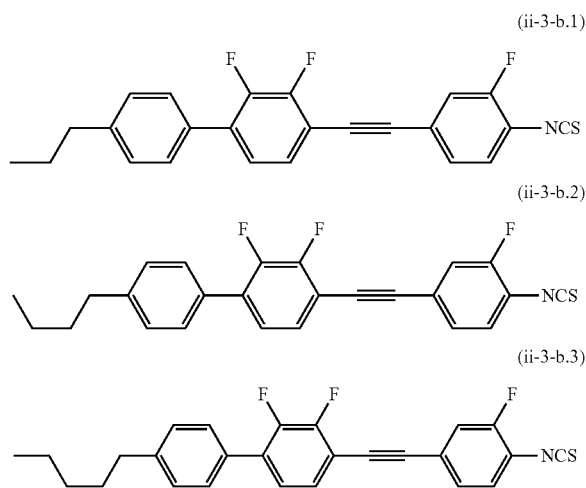

Specific examples of the compounds represented by general formula (ii-3-c) include compounds represented by structural formulae (ii-3-c.1) to (ii-3-c.3) below.

[Chem. 45]

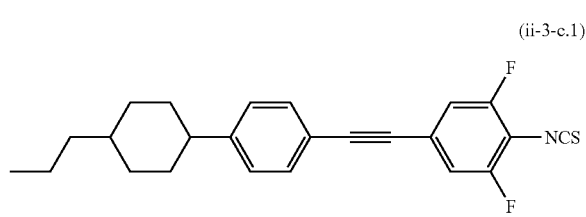

Specific examples of the compounds represented by general formula (ii-3-d) include compounds represented by structural formula (ii-3-d.1) below.

[Chem. 46]

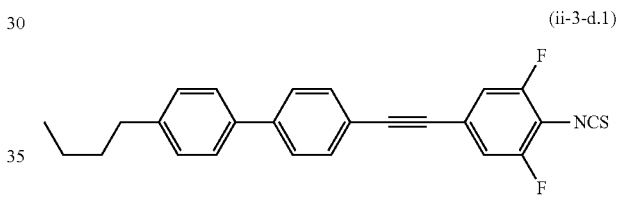

Preferably, the compound represented by general formula (ii-4) is any of the compounds represented by general formulae (ii-4-a) to (ii-4-d) below.

[Chem. 47]

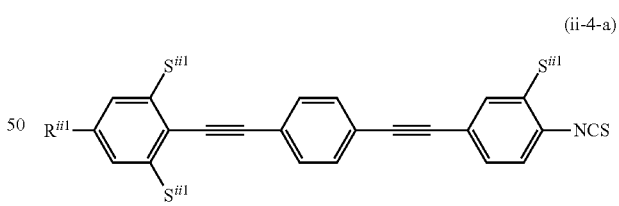

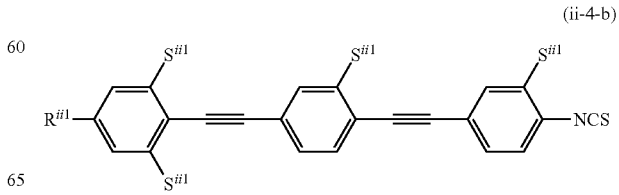

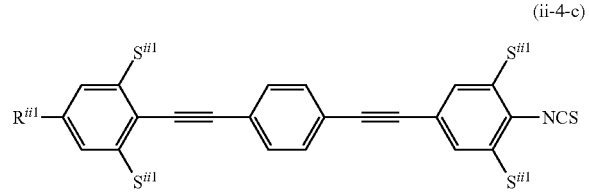
(ii-4-c)

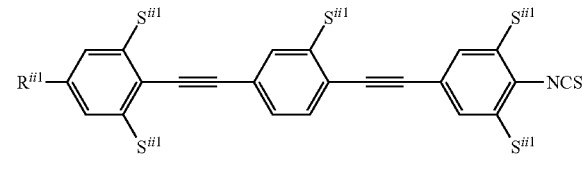
(ii-4-d)

In general formulae (ii-4-a) to (ii-4-d), $R^{ii1}$ and $S^{ii1}$ each independently have the same meaning as $R^{ii1}$ and $S^{ii1}$, respectively, of general formula (ii), shown above.

Specific examples of the compounds represented by general formula (ii-4-a) include compounds represented by structural formulae (ii-4-a.1) to (ii-4-a.3) below.

[Chem. 48]

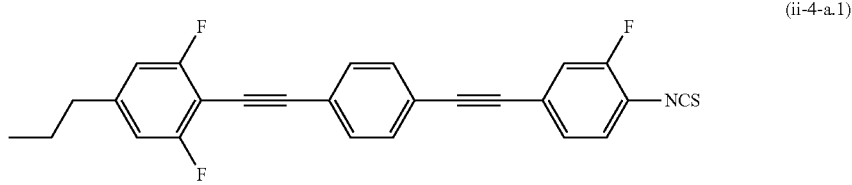
(ii-4-a.1)

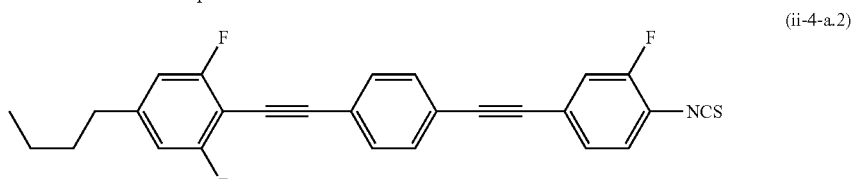
(ii-4-a.2)

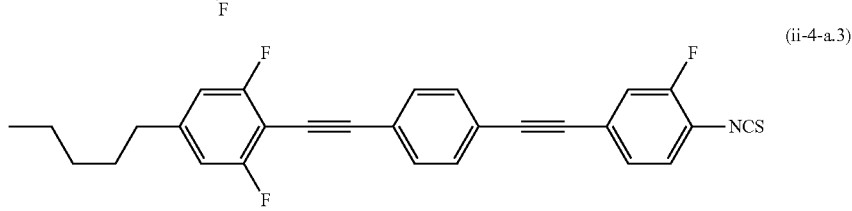
(ii-4-a.3)

Specific examples of the compounds represented by general formula (ii-4-b) include compounds represented by structural formulae (ii-4-b.1) to (ii-4-b.3) below.

[Chem. 49]

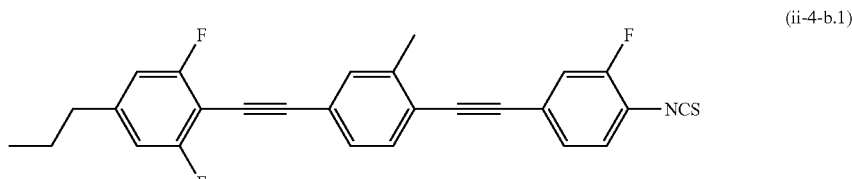
(ii-4-b.1)

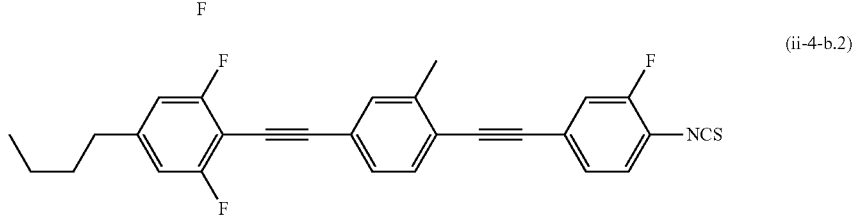
(ii-4-b.2)

(ii-4-b.3)
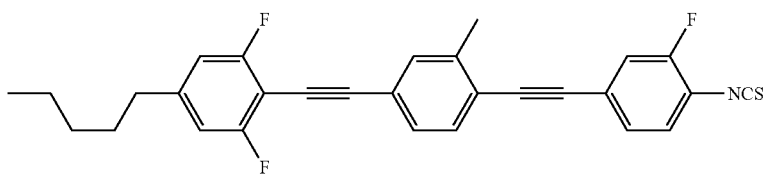
Specific examples of the compounds represented by general formula (ii-4-c) include compounds represented by structural formulae (ii-4-c.1) to (ii-4-c.3) below.
[Chem. 50]
(ii-4-c.1)
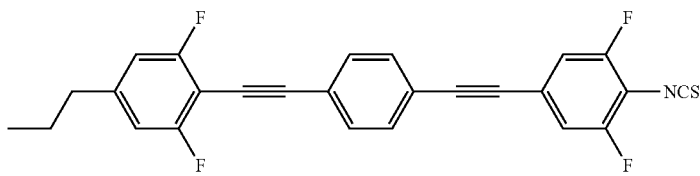
(ii-4-c.2)
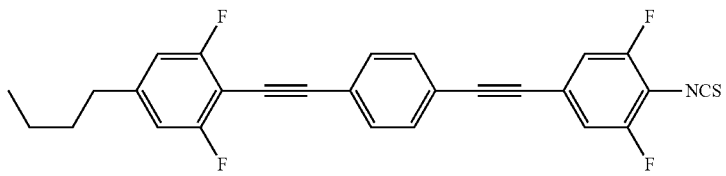
(ii-4-c.3)
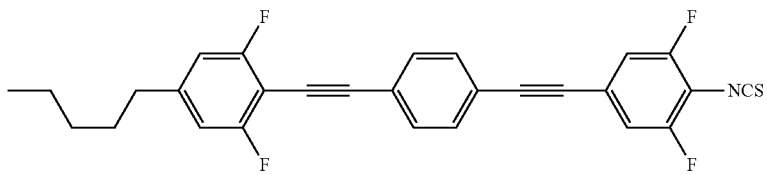
Specific examples of the compounds represented by general formula (ii-4-d) include compounds represented by structural formulae (ii-4-d.1) to (ii-4-d.3) below.
[Chem. 51]
(ii-4-d.1)
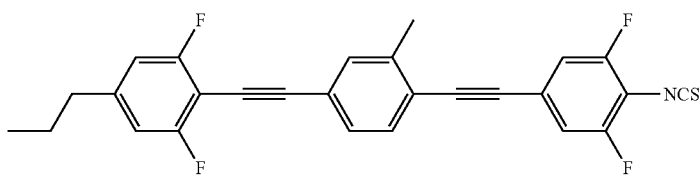
(ii-4-d.2)
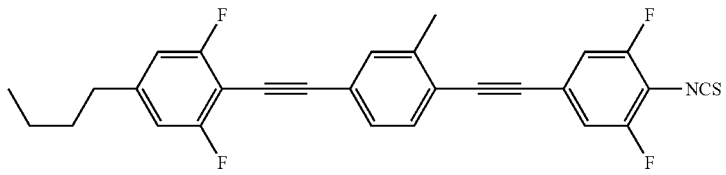

-continued (ii-4-d.3)
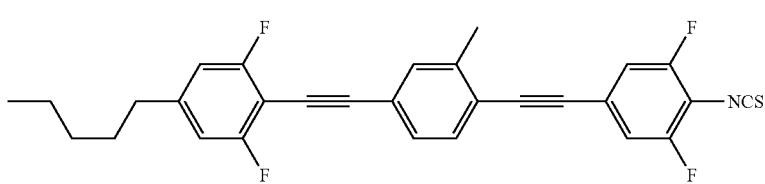

Preferably, the compound represented by general formula (ii-5) is any of the compounds represented by general formulae (ii-5-a) and (ii-5-b) below.

[Chem. 52]

(ii-5-a)
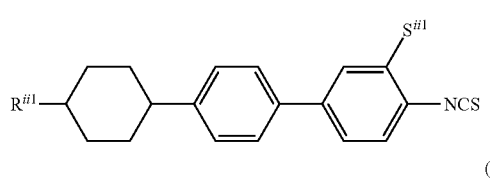

(ii-5-b)
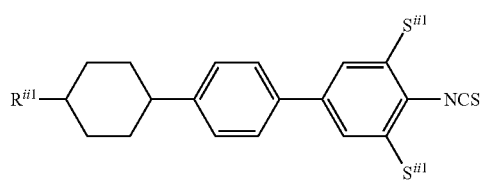

In general formulae (ii-5-a) and (ii-5-b), $R^{ii1}$ and $S^{ii1}$ each independently have the same meaning as $R^{ii1}$ and $S^{ii1}$, respectively, of general formula (ii), shown above.

Specific examples of the compounds represented by general formula (ii-5-a) include compounds represented by structural formulae (ii-5-a.1) to (ii-5-a.4) below.

[Chem. 53]

(ii-5-a.1)
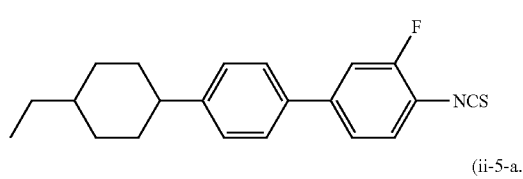

(ii-5-a.2)
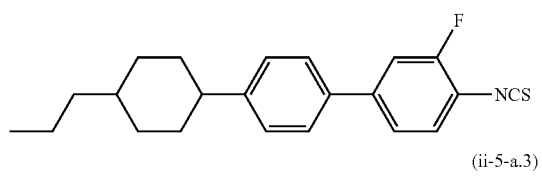

(ii-5-a.3)
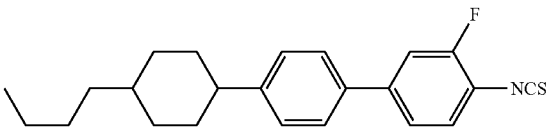

-continued (ii-5-a.4)
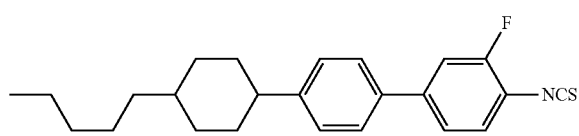

Specific examples of the compounds represented by general formula (ii-5-b) include compounds represented by structural formulae (ii-5-b.1) to (ii-5-b.4) below.

[Chem. 54]

(ii-5-b.1)
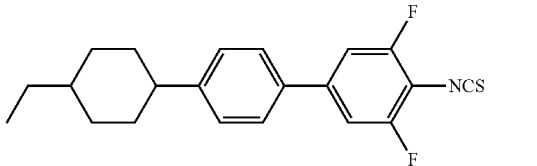

(ii-5-b.2)
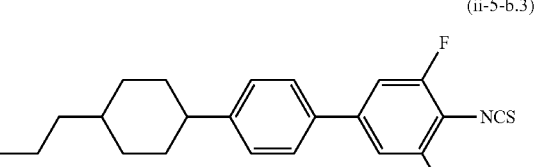

(ii-5-b.3)
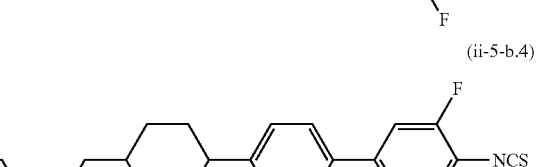

(ii-5-b.4)
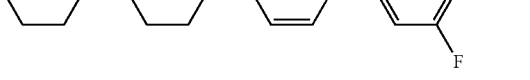

Preferably, the compound represented by general formula (ii-6) is any of the compounds represented by general formulae (ii-6-a) and (ii-6-b) below.

[Chem. 55]

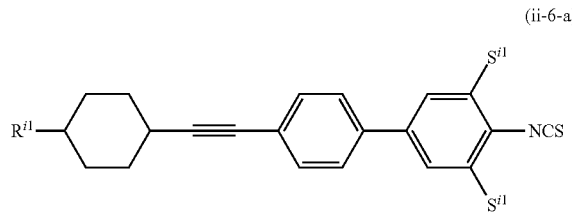 (ii-6-a)

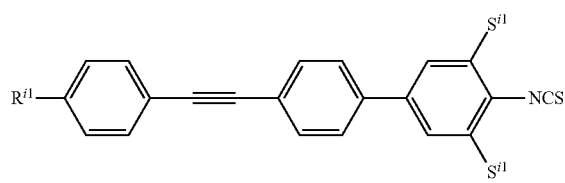 (ii-6-b)

In general formulae (ii-6-a) and (ii-6-b), $R^{ii1}$ and $S^{ii1}$ each independently have the same meaning as $R^{ii1}$ and $S^{ii1}$, respectively, of general formula (ii), shown above.

Specific examples of the compounds represented by general formula (ii-6-a) include compounds represented by structural formulae (ii-6-a.1) to (ii-6-a.4) below.

[Chem. 56]

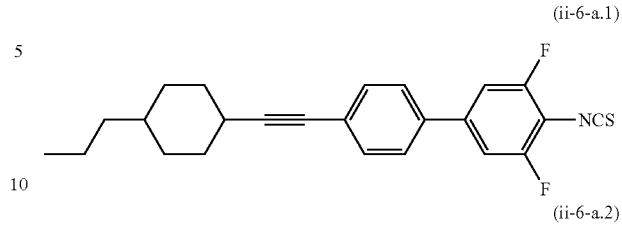 (ii-6-a.1)

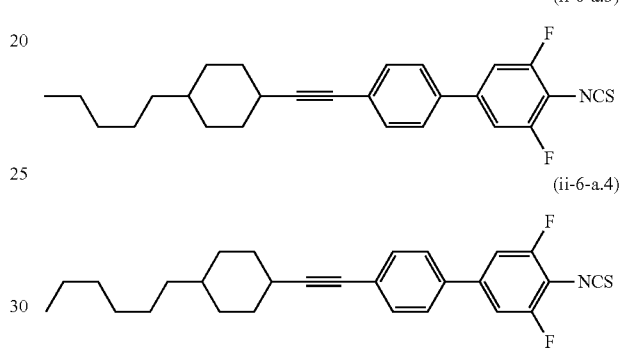 (ii-6-a.2), (ii-6-a.3), (ii-6-a.4)

Specific examples of the compounds represented by general formula (ii-6-b) include compounds represented by structural formulae (ii-6-b.1) to (ii-6-b.4) below.

[Chem. 57]

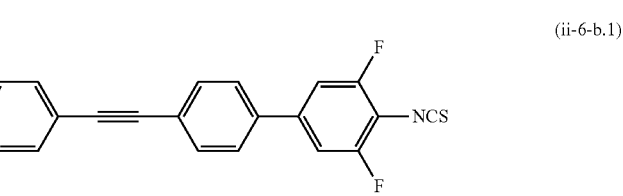 (ii-6-b.1)

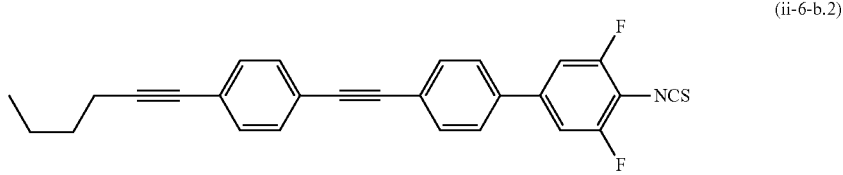 (ii-6-b.2)

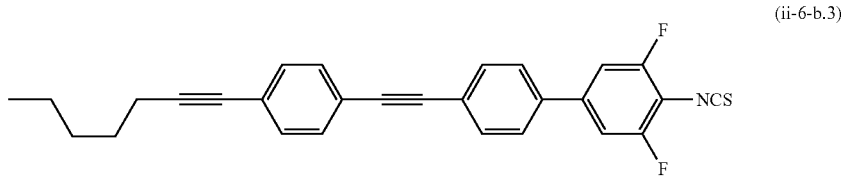 (ii-6-b.3)

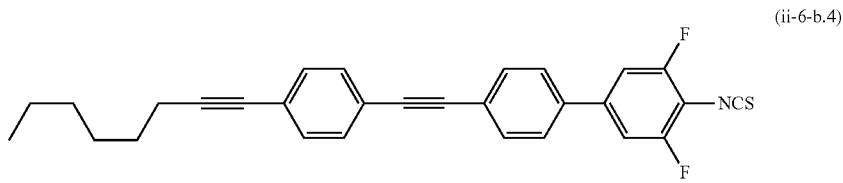 (ii-6-b.4)

Regarding the compounds represented by general formula (ii-1), general formula (ii-1-a), or structural formulae (ii-1-a.1) to (ii-1-a.4), one or more of the compounds is used in the liquid crystal material. Preferably, one to twenty, one to fifteen, one to ten, or one to five of the compounds is used.

Regarding the compounds represented by general formula (ii-1), general formula (ii-1-a), or structural formulae (ii-1-a.1) to (ii-1-a.4), the total content of one or more of the compounds in the liquid crystal material based on the total mass thereof may be 1 to 40 mass %, 2 to 35 mass %, or 3 to 30 mass %. These contents are preferable from the standpoint of compatibility with other liquid crystal compounds.

Regarding the compounds represented by general formula (ii-2), general formulae (ii-2-a) to (ii-2-c), structural formulae (ii-2-a.1) to (ii-2-a.5), structural formulae (ii-2-b.1) to (ii-2-b.3), or structural formulae (ii-2-c.1) to (ii-2-c.3), one or more of the compounds is used in the liquid crystal material. Preferably, one to twenty, one to fifteen, one to ten, or one to five of the compounds is used.

Regarding the compounds represented by general formula (ii-2), general formulae (ii-2-a) to (ii-2-c), structural formulae (ii-2-a.1) to (ii-2-a.5), structural formulae (ii-2-b.1) to (ii-2-b.3), or structural formulae (ii-2-c.1) to (ii-2-c.3), the total content of one or more of the compounds in the liquid crystal material based on the total mass thereof may be 5 to 70 mass %, 10 to 65 mass %, or 15 to 60 mass %. These contents are preferable from the standpoint of compatibility with other liquid crystal compounds.

Regarding the compounds represented by general formula (ii-3), general formulae (ii-3-a) to (ii-3-d), structural formulae (ii-3-a.1) to (ii-3-a.4), structural formulae (ii-3-b.1) to (ii-3-b.3), structural formulae (ii-3-c.1) to (ii-3-c.3), or structural formula (ii-3-d.1), one or more of the compounds is used in the liquid crystal material. Preferably, one to twenty, one to fifteen, one to ten, or one to five of the compounds is used.

Regarding the compounds represented by the compounds represented by general formula (ii-3), general formulae (ii-3-a) to (ii-3-d), structural formulae (ii-3-a.1) to (ii-3-a.4), structural formulae (ii-3-b.1) to (ii-3-b.3), structural formulae (ii-3-c.1) to (ii-3-c.3), or structural formula (ii-3-d.1), the total content of one or more of the compounds in the liquid crystal material based on the total mass thereof may be 20 to 65 mass %, 25 to 60 mass %, or 30 to 55 mass %. These contents are preferable from the standpoint of compatibility with other liquid crystal compounds.

Regarding the compounds represented by general formula (ii-4), general formulae (ii-4-a) to (ii-4-d), structural formulae (ii-4-a.1) to (ii-4-a.3), structural formulae (ii-4-b.1) to (ii-4-b.3), structural formulae (ii-4-c.1) to (ii-4-c.3), or structural formulae (ii-4-d.1) to (ii-4-d.3), one or more of the compounds is used in the liquid crystal material. Preferably, one to twenty, one to fifteen, one to ten, or one to five of the compounds is used.

Regarding the compounds represented by general formula (ii-4), general formulae (ii-4-a) to (ii-4-d), structural formulae (ii-4-a.1) to (ii-4-a.3), structural formulae (ii-4-b.1) to (ii-4-b.3), structural formulae (ii-4-c.1) to (ii-4-c.3), or structural formulae (ii-4-d.1) to (ii-4-d.3), the total content of one or more of the compounds in the liquid crystal material based on the total mass thereof may be 1 to 30 mass %, 3 to 25 mass %, or 5 to 20 mass %. These contents are preferable from the standpoint of compatibility with other liquid crystal compounds.

Regarding the compounds represented by general formula (ii-5), general formulae (ii-5-a) and (ii-5-b), structural formulae (ii-5-a.1) to (ii-5-a.4), or structural formulae (ii-5-b.1) to (ii-5-b.4), one or more of the compounds is used in the liquid crystal material. Preferably, one to twenty, one to fifteen, one to ten, or one to five of the compounds is used.

Regarding the compounds represented by general formula (ii-5), general formulae (ii-5-a) and (ii-5-b), structural formulae (ii-5-a.1) to (ii-5-a.4), or structural formulae (ii-5-b.1) to (ii-5-b.4), the total content of one or more of the compounds in the liquid crystal material based on the total mass thereof may be 5 to 45 mass %, 10 to 40 mass %, or 15 to 35 mass %. These contents are preferable from the standpoint of compatibility with other liquid crystal compounds.

Regarding the compounds represented by general formula (ii-6), general formulae (ii-6-a) and (ii-6-b), structural formulae (ii-6-a.1) to (ii-6-a.4), or structural formulae (ii-6-b.1) to (ii-6-b.4), one or more of the compounds is used in the liquid crystal material. Preferably, one to twenty, one to fifteen, one to ten, or one to five of the compounds is used.

Regarding the compounds represented by general formula (ii-6), general formulae (ii-6-a) and (ii-6-b), structural formulae (ii-6-a.1) to (ii-6-a.4), or structural formulae (ii-6-b.1) to (ii-6-b.4), the total content of one or more of the compounds in the liquid crystal material based on the total mass thereof may be 1 to 25 mass %, 3 to 20 mass %, or 5 to 15 mass %. These contents are preferable from the standpoint of compatibility with other liquid crystal compounds.

Regarding the compounds represented by general formula (ii), general formulae (ii-1) to (ii-6), general formula (ii-1-a), general formulae (ii-2-a) to (ii-2-c), general formulae (ii-3-a) to (ii-3-d), general formulae (ii-4-a) to (ii-4-d), general formulae (ii-5-a) to (ii-5-b), general formulae (ii-6-a) to (ii-6-b), structural formulae (ii-1-a.1) to (ii-1-a.4), structural formulae (ii-2-a.1) to (ii-2-a.5), structural formulae (ii-2-b.1) to (ii-2-b.3), structural formulae (ii-2-c.1) to (ii-2-c.3), structural formulae (ii-3-a.1) to (ii-3-a.4), structural formulae (ii-3-b.1) to (ii-3-b.3), structural formulae (ii-3-c.1) to (ii-3-c.3), structural formula (ii-3-d.1), structural formulae (ii-4-a.1) to (ii-4-a.3), structural formulae (ii-4-b.1) to (ii-4-b.3), structural formulae (ii-4-c.1) to (ii-4-c.3), structural formulae (ii-4-d.1) to (ii-4-d.3), structural formulae (ii-5-a.1) to (ii-5-a.4), structural formulae (ii-5-b.1) to (ii-5-b.4), structural formulae (ii-6-a.1) to (ii-6-a.4), or structural formulae (ii-6-b.1) to (ii-6-b.4), these compounds can be synthesized with a known synthesis method.

Combinations of the compounds to be used in the liquid crystal material of the present disclosure may be as follows: A) a combination of a compound represented by general formula (i) (including the sub-formulae), a compound represented by general formula (ii-1) (including the sub-formulae), a compound represented by general formula (ii-2) (including the sub-formulae), a compound represented by general formula (ii-3) (including the sub-formulae), and a compound represented by general formula (ii-5) (including the sub-formulae); B) a combination of one or more compounds represented by general formula (ii-1) (including the sub-formulae), one or more compounds represented by general formula (ii-2) (including the sub-formulae), one or more compounds represented by general formula (ii-3) (including the sub-formulae), and one or more compounds represented by general formula (ii-5) (including the sub-formulae); C) a combination of one or more compounds represented by general formula (ii-1) (including the sub-formulae), one or more compounds represented by general formula (ii-2) (including the sub-formulae), and one or more compounds represented by general formula (ii-5) (including the sub-formulae); and D) a combination of one or more compounds represented by general formula (ii-1) (including the sub-formulae), one or more compounds represented by general formula (ii-2) (including the sub-formulae), one or more compounds represented by general formula (ii-3) (including the sub-formulae), and one or more compounds represented by general formula (ii-5) (including the sub-formulae) and one or more compounds represented by general formula (ii-6) (including the sub-formulae). These combinations are preferable from the standpoint of the rotational viscosity ($\gamma_1$).

Furthermore, it is preferable that the one or more liquid crystal compounds to be included in the liquid crystal material of the present disclosure be exclusively one or more compounds having an isothiocyanate group (—NCS).

(Liquid Crystal Display Device, Sensor, Liquid Crystal Lens, Optical Communication Device, and Antenna)

Liquid crystal materials produced in accordance with the present invention can be used in liquid crystal display devices, sensors (preferably, distance measuring sensors for light detection and ranging (LiDAR)), liquid crystal lenses, optical communication devices, antennas, and the like. In particular, the liquid crystal materials are suitable for microwave-band antenna applications.

Examples

The present invention will now be described in more detail with reference to examples. The present invention is in no way limited to the examples described below.

Devices Used for Measurements and Evaluations in Examples and Comparative Examples First coaxial tube (the coaxial tube 6 for Examples; Comparative Examples (a reference coaxial tube)):
Constituting kit length (a longitudinal length of the liquid-crystal-material-loading section of the coaxial tube main body): (30 mm), an internal dimension φ (inside diameter): 3 mm, a diameter φ of the central conducting wire: 1 mm, and an internal volume: 0.19 cc Coaxial Tube (Comparative Examples (Comparative Coaxial Tube))

Sample kit length (a longitudinal length of the liquid-crystal-material-loading section of the coaxial tube main body): (80 mm), an internal dimension ((inside diameter): 3 mm, a diameter φ of the central conducting wire: 1 mm, and an internal volume: 0.50 cc Vector network analyzer: a P5005A vector network analyzer, manufactured by Keysight Technologies, Inc., was used.

Power supply: a PMX250 DC (direct current) power supply, manufactured by Kikusui Electronics Corporation, was used.

Processing device: a Dynabook BZ55 personal computer, manufactured by Toshiba Corporation, was used.

DC blocking capacitor: a PE8225 DC block, manufactured by Pasternack, Inc., was used.

Coaxial component: a BT1026-1 bias tee, manufactured by Auriga Microwave, was used.

Materials Used in Examples and Comparative Examples

The compositions of Examples and Comparative Examples, described below, contained each of the compounds in the ratio shown in the table, with the contents being expressed in mass %.

In the description of the compounds below, the following abbreviations are used. Note that regarding compounds having cis and trans isomers, the abbreviation represents the trans isomer unless otherwise specified.

<Ring Structure>

[Chem. 58]

Cy

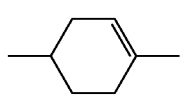
Cy1

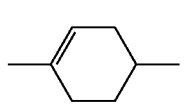
Cy2

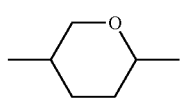
Py

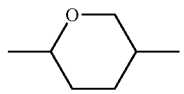
Py'

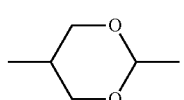
Oc

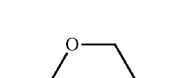
Oc'

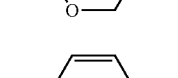
Ph

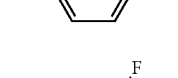
Ph1

Ph2

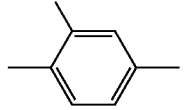
Ph3

-continued
Ph4 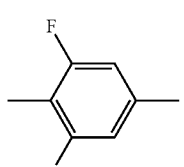
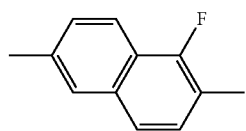 Np1
Ph5 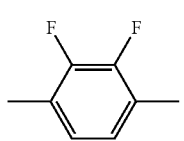
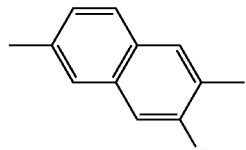 Np2
Pc1 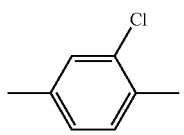
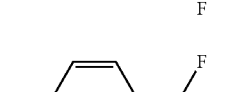 Np3
Pc2 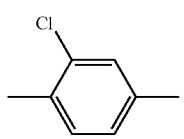
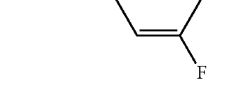 Np4
Pm1 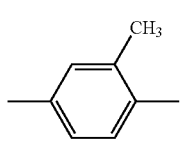
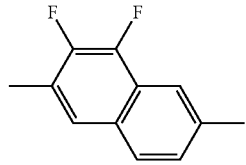 Np5
Pm2 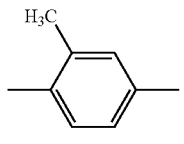
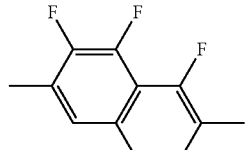 Tet3
Pe1 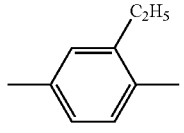
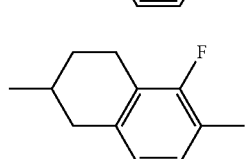
Pe2 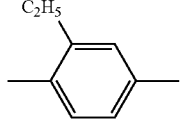
<End Structure>
Th 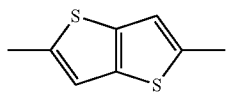
TABLE 1
| Abbreviation | Chemical structure |
|---|---|
| -n | $-C_nH_{2n+1}$ |
| n- | $C_nH_{2n+1}-$ |
| —On | $-O-C_nH_{2n+1}$ |
| nO— | $C_nH_{2n+1}-O-$ |
| —Sn | $-S-C_nH_{2n+1}$ |
| nS— | $C_nH_{2n+1}-S-$ |
| —V | $-CH=CH_2$ |
| V— | $CH_2=CH-$ |
| —V1 | $-CH=CH-CH_3$ |
| 1V— | $CH_3-CH=CH-$ |
| —2V | $-CH_2-CH_2-CH=CH_2$ |
| V2— | $CH_2=CH-CH_2-CH_2-$ |
| —2V1 | $-CH_2-CH_2-CH=CH-CH_3$ |
| 1V2— | $CH_3-CH=CH-CH_2-CH_2-$ |
| —OCF3 | $-O-CF_3$ |
| CF3O— | $CF_3-O-$ |
Ma 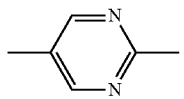
Mb 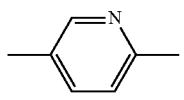
Np 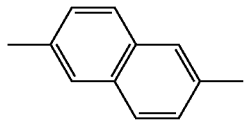

TABLE 1-continued

| Abbreviation | Chemical structure |
| --- | --- |
| —H | —H |
| H— | H— |
| —CN | —CN |
| CN— | CN— |
| —NCS | —NCS |
| NCS— | NCS— |

(In the table, n is a natural number.)

<Bonding Structure>

TABLE 2

| Abbreviation | Chemical structure |
| --- | --- |
| — | single bond |
| -n- | —$C_nH_{2n}$— |
| -nO— | —$C_nH_{2n}$—O— |
| —On- | —O—$C_nH_{2n}$— |
| —COO— | —C(=O)—O— |
| —OCO— | —O—C(=O)— |
| —V— | —CH=CH— |
| —nV— | —$C_nH_{2n}$—CH=CH— |
| —Vn— | —CH=CH—$C_nH_{2n}$— |
| —T— | —C≡C— |
| —CF2O— | —$CF_2$—O— |
| —OCF2— | —O—$CF_2$— |
| —Az— | —N=N— |

(In the table, n is a natural number.)

Examples

<Preparation or Provision of Liquid Crystal Material>

Liquid crystal materials (a) and (b), which had the composition ratio shown in Table 3 below, were prepared as the liquid crystal materials.

Note that both of the liquid crystal materials (a) and (b) were liquid and exhibited a nematic phase at 25° C.

TABLE 3

| | Liquid crystal material (a) | Liquid crystal material (b) |
| --- | --- | --- |
| 5-Ph—Ph—CN | 100 | 95 |
| 3-Tet3-T—Ph—T—Ph1—NCS | 0 | 5 |
| Total [mass %] | 100 | 100 |

<Measurement of Delta Delay Value>

—Measurement of Delta Delay Value of Liquid Crystal Material (a)—

Next, a delta delay measurement system (measurement mechanism) was formed by positioning and connecting the devices described above in the "Devices Used" section except for the cylindrical coaxial tube 6, in a manner such that a network similar to that illustrated in FIG. 1 was obtained. Subsequently, the liquid crystal material (a) was loaded into the space of the coaxial tube 6, in which a central conducting wire 8 having a diameter of 1 mm was internally disposed in a tubular outer conductor 9, which had an inside diameter of 3 mm and a longitudinal length of the liquid-crystal-material-loading section of the coaxial tube main body of 30 mm. The loading was carried out in a manner that prevented the introduction of gas bubbles. Subsequently, the coaxial tube 6 loaded with the liquid crystal material (a) was connected to the vector network analyzer 2, and subsequently, first, the transmission delay time ($t_0$) under no bias, which was an amount of group delay in a state in which no voltage was applied, was measured. In this instance, the transmission delay time ($t_0$) under no bias at 13 GHz was 0.3211 (nsec).

Subsequently, an effective voltage (a direct current of 100 V) was applied between the coaxial components (bias Ts) 4a and 4b, and, accordingly, the transmission delay time ($t_v$) under the effective voltage, which was an amount of group delay under a direct current of 100 V, was likewise measured. It was found that the transmission delay time ($t_v$) under the effective voltage at 13 GHz was 0.3290 nsec.

Subsequently, the same measurements were performed two more times. In this manner, total three rounds of measurements of the transmission delay time ($t_0$) under no bias and the transmission delay time ($t_v$) under the effective voltage were carried out.

Subsequently, the obtained values of the transmission delay time ($t_0$) under no bias and the transmission delay time ($t_v$) under the effective voltage were computed and analyzed with the personal computer that was the processing device 1. In this manner, the delta delay value ($\Delta t=|t_v-t_0|$) of the liquid crystal material (a) was calculated. Note that the measurements of the transmission delay time ($t_v$) and the transmission delay time ($t_0$) were performed under conditions in which the liquid crystal material was at room temperature (25° C.). After the coaxial tube 6 loaded with the liquid crystal material (a) was connected to the vector network analyzer 2 for the measurement of the delta delay value, electromagnetic waves (incident signals) having frequencies ranging from 0.1 to 26.5 GHz were constantly propagated from the vector network analyzer 2 through the liquid crystal material (the process of successively increasing the frequency from 0.1 to 26.5 GHz and then, when the 26.5 GHz is reached, successively increasing again the frequency from 0.1 to 26.5 GHz was repeated). The results are shown in "Example 1" in Table 4.

—Measurement of Delta Delay Value of Liquid Crystal Material (b)—

Total three rounds of measurements of the transmission delay time ($t_0$) under no bias and the transmission delay time ($t_v$) under the effective voltage were carried out in a manner similar to that of the measurement of the delta delay value of the liquid crystal material (a), except that the liquid crystal material (b) was loaded into the space of the coaxial tube 6 in a manner that prevented the introduction of gas bubbles. Subsequently, the delta delay value ($\Delta t=|t_v-t_0|$) of the liquid crystal material (b) was calculated. The results are shown in "Example 2" in Table 5.

Comparative Examples

—Method for Measuring Dielectric Anisotropy (Ae) of Liquid Crystal Material (a)—

The dielectric anisotropy (at) measurement mechanism used in Comparative Examples was the same as the delta delay value measurement mechanism used in the Examples, except for the coaxial tube 6. The dielectric anisotropy (As) of the liquid crystal material (a) was measured with two cylindrical coaxial tubes. One of the coaxial tubes used was a coaxial tube having a length of 30 mm that served as a reference coaxial tube, and the other of the coaxial tubes used was a coaxial tube having the same diameter as the reference coaxial tube and a length of 80 mm that served as a comparative coaxial tube. The liquid crystal material (a) was loaded into each of the two coaxial tubes, and subsequently, the dielectric anisotropy was calculated in accordance with the coaxial tube method described in special issue paper "Current Status and Future Prospects of Organic Molecule Electronics (measurements of dielectric properties of nematic liquid crystals at 10 kHz to 40 GHz and their application to variable delay lines)", by Toshihisa Kamei, pp. 1150-1151). Specifically, the measurement of the dielectric anisotropy was performed as follows. First, $\Delta\tau_g$ and L ($\Delta$L) at 13 GHz were determined from the results of the measurements with the 30-mm coaxial tube and the 80-mm coaxial tube, which were performed in a state in which no voltage was applied to the central conducting wire. Next, $\Delta\tau_g$ and L ($\Delta$L) at 13 GHz associated with a state in which a DC voltage of 100 V was applied to the central conducting wire were likewise determined to calculate the dielectric anisotropy ($\Delta\varepsilon$) of the liquid crystal material (a). Note that the measurement of the dielectric anisotropy ($\Delta\varepsilon$) was performed under conditions in which the liquid crystal material was at room temperature (25° C.). The results are shown in "Comparative Example 1" in Table 4. The measurement of the dielectric anisotropy ($\Delta\varepsilon$) of the liquid crystal material (a) was performed three times.

—Method for Measuring Dielectric Anisotropy ($\Delta\varepsilon$) of Liquid Crystal Material (b)—

Total three rounds of measurements of the dielectric anisotropy ($\Delta\varepsilon$) were carried out in a manner similar to that of the measurement of the dielectric anisotropy ($\Delta\varepsilon$) of the liquid crystal material (a), except that the liquid crystal material (b) was loaded into the space of the coaxial tube 6 in a manner that prevented the introduction of gas bubbles. The results are shown in "Comparative Example 2" in Table 5.

TABLE 4

| | Evaluation category | 1st round | 2nd round | 3rd round | Ave. | Standard deviation | Coefficient of variation |
|---|---|---|---|---|---|---|---|
| Example 1 (Liquid crystal material (a)) | Delta delay (delay time/ns) | 0.0080 | 0.0077 | 0.0078 | 0.0078 | 0.0001 | 0.0147 |
| Comparative Example 1 (Liquid crystal material (a)) | $\Delta\varepsilon$ | 0.4135 | 0.4073 | 0.4384 | 0.4197 | 0.0165 | 0.0393 |

TABLE 5

| | Evaluation category | 1st round | 2nd round | 3rd round | Ave. | Standard deviation | Coefficient of variation |
|---|---|---|---|---|---|---|---|
| Example 2 (Liquid crystal material (b)) | Delta delay (delay time/ns) | 0.0102 | 0.0099 | 0.0101 | 0.0101 | 0.0002 | 0.0165 |
| Comparative Example 2 (Liquid crystal material (b)) | $\Delta\varepsilon$ | 0.4881 | 0.4950 | 0.4460 | 0.4764 | 0.0265 | 0.0557 |

<Confirmation of Delta Delay Value>

The results shown in Tables 2 and 3 above confirm that the coefficient of variation of the delta delay value was much lower than that of the dielectric anisotropy ($\Delta\varepsilon$) value. Accordingly, it is confirmed that when a liquid crystal material has a specific delta delay value, the liquid crystal material is electrically uniform compared with a liquid crystal material having a specific dielectric anisotropy ($\Delta\varepsilon$) value. In particular, the liquid crystal material (b) of Example 2 had a low coefficient of variation of the delta delay value despite having a higher delta delay value than the liquid crystal material (a) of Example 1, and, therefore, it was confirmed that a liquid crystal material that was electrically more uniform was successfully provided.

Furthermore, liquid crystal materials (c) to (h), which had the composition ratio shown in Table 6 below, were prepared as the liquid crystal materials. Note that all of the liquid crystal materials (c) to (h) were liquid and exhibited a nematic phase at 25° C.

The delta delay value and the dielectric anisotropy (E) of the liquid crystal materials (C) to (h) were measured in a manner similar to that of the liquid crystal materials (a) and (b). The results are shown in Tables 6 to 12.

TABLE 6

|  | Liquid crystal material (c) | Liquid crystal material (d) | Liquid crystal material (e) | Liquid crystal material (f) | Liquid crystal material (g) | Liquid crystal material (h) |
| --- | --- | --- | --- | --- | --- | --- |
| $T_{ni}$ [° C.] | 149.5 | 154.8 | 71.1 | 157.3 | 153.7 | 156.8 |
| $T_{-N}$ [° C.] | G-39 | G-35 | G-43 | G-39 | G-35 | G-35 |
| $\Delta n$ | 0.3679 | 0.3827 | 0.2975 | 0.3806 | 0.3670 | 0.3877 |
| $\Delta\varepsilon$ (1 kHz) | 12.88 | 13.31 | 11.14 | 12.92 | 12.85 | 13.40 |
| $\gamma_1 \cdot$ [mPa·s] | 512 | 529 | 216 | 600 | 549 | 606 |
| $V_{th} \cdot$ [V] | 2.051 | 2.063 | 1.605 | 2.096 | 2.058 | 2.059 |
| 5-Cy-Ph-NCS | 6 | 5.4 | 21 | 5.4 | 5.4 | 5.4 |
| 4-Ph-T-Pc1-NCS | 11 | 9.9 | 11 | 9.9 | 9.9 | 9.9 |
| 5-Ph-T-Ph1-NCS | 5 | 4.5 | 20 | 4.5 | 4.5 | 4.5 |
| 4O-Ph2-T-Ph-NCS | 5 | 4.5 | 10 | 4.5 | 4.5 | 4.5 |
| 5O-Ph2-T-Ph-NCS | 5 | 4.5 | 10 | 4.5 | 4.5 | 4.5 |
| 4-Cy-Ph-T-Ph1-NCS | 16 | 14.4 |  | 14.4 | 14.4 | 14.4 |
| 5-Cy-Ph-T-Ph1-NCS | 13 | 11.7 |  | 11.7 | 11.7 | 11.7 |
| 5-Ph-Ph5-T-Ph1-NCS | 15 | 13.5 |  | 13.5 | 13.5 | 13.5 |
| 4-Ph-Ph-T-Ph3-NCS |  | 10 |  |  |  |  |
| 2-Cy-Ph-Ph3-NCS | 12 | 10.8 | 14 | 10.8 | 10.8 | 10.8 |
| 4-Cy-Ph-Ph3-NCS | 12 | 10.8 | 14 | 10.8 | 10.8 | 10.8 |
| 4-Cy-T-Ph-Ph3-NCS |  |  |  |  | 10 |  |
| 4-T-Ph-T-Ph-Ph3-NCS |  |  |  |  |  | 10 |
| 3-Tet3-T-Ph-T-Ph1-NCS |  |  |  | 10 |  |  |
| Total [mass %] | 100 | 100 | 100 | 100 | 100 | 100 |

TABLE 7

|  | Evaluation category | 1st round | 2nd round | 3rd round | Ave. | Standard deviation | Coefficient of variation |
| --- | --- | --- | --- | --- | --- | --- | --- |
| Example 3 (Liquid crystal material (c)) | Delta delay (delay time/ns) | 0.0281 | 0.0286 | 0.0279 | 0.0282 | 0.0004 | 0.0128 |
| Comparative Example 3 (Liquid crystal material (c)) | $\Delta\varepsilon$ | 1.4102 | 1.3927 | 1.4389 | 1.4139 | 0.0233 | 0.0165 |

TABLE 8

|  | Evaluation category | 1st round | 2nd round | 3rd round | Ave. | Standard deviation | Coefficient of variation |
| --- | --- | --- | --- | --- | --- | --- | --- |
| Example 4 (Liquid crystal material (d)) | Delta delay (delay time/ns) | 0.0292 | 0.0298 | 0.0292 | 0.0294 | 0.0003 | 0.0116 |
| Comparative Example 4 (Liquid crystal material (d)) | $\Delta\varepsilon$ | 1.5031 | 1.4762 | 1.5234 | 1.5009 | 0.0237 | 0.0158 |

TABLE 9

|  | Evaluation category | 1st round | 2nd round | 3rd round | Ave. | Standard deviation | Coefficient of variation |
| --- | --- | --- | --- | --- | --- | --- | --- |
| Example 5 (Liquid crystal material (e)) | Delta delay (delay time/ns) | 0.0227 | 0.0225 | 0.0231 | 0.0227 | 0.0003 | 0.0134 |
| Comparative Example 5 (Liquid crystal material (e)) | $\Delta\varepsilon$ | 1.2042 | 1.2342 | 1.1722 | 1.2035 | 0.0310 | 0.0258 |

TABLE 10

|  | Evaluation category | 1st round | 2nd round | 3rd round | Ave. | Standard deviation | Coefficient of variation |
| --- | --- | --- | --- | --- | --- | --- | --- |
| Example 6 (Liquid crystal material (f)) | Delta delay (delay time/ns) | 0.0285 | 0.0281 | 0.0288 | 0.0285 | 0.0004 | 0.0123 |
| Comparative Example 6 (Liquid crystal material (f)) | $\Delta\varepsilon$ | 1.4455 | 1.4677 | 1.4276 | 1.4469 | 0.0201 | 0.0139 |

TABLE 11

|  | Evaluation category | 1st round | 2nd round | 3rd round | Ave. | Standard deviation | Coefficient of variation |
|---|---|---|---|---|---|---|---|
| Example 7 (Liquid crystal material (g)) | Delta delay (delay time/ns) | 0.0281 | 0.0284 | 0.0277 | 0.0281 | 0.0003 | 0.0115 |
| Comparative Example 7 (Liquid crystal material (g)) | Δε | 1.4689 | 1.4889 | 1.4449 | 1.4675 | 0.0220 | 0.0150 |

TABLE 12

|  | Evaluation category | 1st round | 2nd round | 3rd round | Ave. | Standard deviation | Coefficient of variation |
|---|---|---|---|---|---|---|---|
| Example 8 (Liquid crystal material (h)) | Delta delay (delay time/ns) | 0.0284 | 0.0289 | 0.0282 | 0.0285 | 0.0004 | 0.0126 |
| Comparative Example 8 (Liquid crystal material (h)) | Δε | 1.4763 | 1.4993 | 1.4523 | 1.4760 | 0.0235 | 0.0159 |

The results shown in Tables 6 to 12 confirm that even in the case of compositions in which more than one compound was used, the coefficient of variation of the delta delay value was much lower than that of the dielectric anisotropy (Δε) value. Accordingly, it is confirmed that when a liquid crystal material has a specific delta delay value, the liquid crystal material is electrically uniform compared with a liquid crystal material having a specific dielectric anisotropy (Δε) value. In particular, the liquid crystal materials (c) to (h) of Examples 3 to 8 had a low coefficient of variation of the delta delay value despite having a high delta delay value, and, therefore, it was confirmed that liquid crystal materials that were electrically more uniform were successfully provided. Furthermore, the high delta delay values (the long delay times) indicate a possibility that a wide range of electromagnetic wave transmission and reception angles can be ensured.

INDUSTRIAL APPLICABILITY

The method of the present invention for producing a liquid crystal material can be used for liquid crystal display devices, sensors, liquid crystal lenses, optical communication devices, antennas, and the like. In particular, the method is suitable for microwave-band antenna applications.

REFERENCE SIGNS LIST

1 Processing device
2 Vector network analyzer
3a, 3b DC blocking capacitor
4a, 4b Coaxial component
5a, 5b Adapter
6 Coaxial tube
7 DC power supply
8 Inner conductor
9 Outer conductor
10 Liquid crystal molecule
100 Delta delay measurement system

The invention claimed is:

1. A method for producing a liquid crystal material comprising:
a step (I) of preparing a liquid crystal material; and
a step (II) of measuring the liquid crystal material with a delta delay measurement mechanism that measures a delta delay value of the liquid crystal material, wherein
the delta delay measurement mechanism includes a single coaxial tube and a mechanism that calculates the delta delay value of the liquid crystal material,
the single coaxial tube includes a linear inner conductor and an outer conductor having a space through which the inner conductor extends,
the delta delay value is a difference between a transmission delay time to and a transmission delay time $t_v$,
the transmission delay time to is measured by propagating electromagnetic waves through the liquid crystal material in a state in which a reference voltage $V_0$ is applied between the inner conductor and the outer conductor, the electromagnetic waves having successively varying frequencies, the liquid crystal material being loaded in the space between the inner conductor and the outer conductor, and
the transmission delay time $t_v$ is measured by propagating the electromagnetic waves through the liquid crystal material in a state in which an effective voltage V, which is greater than the reference voltage $V_0$, is applied between the inner conductor and the outer conductor.

2. The method for producing a liquid crystal material according to claim 1, wherein the electromagnetic waves have successively varying frequencies ranging from 0.1 to 26.5 GHz.

3. The method for producing a liquid crystal material according to claim 1, wherein the transmission delay time to is measured by propagating electromagnetic waves through the liquid crystal material between the inner conductor and the outer conductor in an unbiased state, the electromagnetic waves having successively varying frequencies.

4. The method for producing a liquid crystal material according to claim 1, wherein the liquid crystal material includes a liquid crystal compound having an NCS group.

5. A method for measuring a delta delay comprising using a single coaxial tube that includes a linear inner conductor and an outer conductor having a space through which the inner conductor extends, the delta delay being an amount of change in a transmission delay time associated with electromagnetic waves propagating through a liquid crystal material loaded in the space, the method comprising:
a step of providing the liquid crystal material;
a step of loading the liquid crystal material between the inner conductor and the outer conductor; and a step of calculating a delta delay value of the liquid crystal material, the delta delay value being a difference between a transmission delay time to and a transmission delay time $t_v$, wherein the transmission delay time $t_0$ is measured by propagating electromagnetic waves through the liquid crystal material in a state in which a reference voltage $V_0$ is applied between the inner conductor and the outer conductor, the electromagnetic waves having successively varying frequencies, and the transmission delay time $t_v$ is measured by propagating the electromagnetic waves through the liquid crystal material in a state in which an effective voltage V, which is greater than the reference voltage $V_0$, is applied between the inner conductor and the outer conductor.

6. An apparatus for measuring a delta delay value comprising:

a single coaxial tube including a linear inner conductor, an outer conductor through which the inner conductor internally extends, and a space that is located between the inner conductor and the outer conductor and in which a liquid crystal material is loadable;

an electrical signal transmitting and receiving unit that inputs electrical signals that are electromagnetic waves to the single coaxial tube and receives output signals that are electromagnetic waves output in response to the electrical signals; and an analysis and processing unit that analyzes and processes the electrical signals and the output signals transmitted or received by the electrical signal transmitting and receiving unit, wherein the analysis and processing unit calculates the delta delay value of the liquid crystal material, the delta delay value is a difference between a transmission delay time to and a transmission delay time $t_v$, the transmission delay time to is a time measured by propagating electromagnetic waves through the liquid crystal material in a state in which a reference voltage $V_0$ is applied between the inner conductor and the outer conductor, the electromagnetic waves having successively varying frequencies, and the transmission delay time $t_v$ is a time measured by propagating the electromagnetic waves through the liquid crystal material in a state in which an effective voltage V, which is greater than the reference voltage $V_0$, is applied between the inner conductor and the outer conductor.

* * * * *